(12) United States Patent
Tokunaga

(10) Patent No.: US 7,957,593 B2
(45) Date of Patent: Jun. 7, 2011

(54) METHOD AND APPARATUS FOR PROCESSING IMAGE, RECORDING MEDIUM, AND COMPUTER PROGRAM

(75) Inventor: Nodoka Tokunaga, Tokyo (JP)

(73) Assignee: Sony Corporation, Tokyo (JP)

( * ) Notice: Subject to any disclaimer, the term of this patent is extended or adjusted under 35 U.S.C. 154(b) by 1107 days.

(21) Appl. No.: 11/691,019

(22) Filed: Mar. 26, 2007

(65) Prior Publication Data

US 2007/0286452 A1 Dec. 13, 2007

(30) Foreign Application Priority Data

Apr. 12, 2006 (JP) ................................. 2006-109369

(51) Int. Cl.
*G06K 9/46* (2006.01)
(52) U.S. Cl. ........ 382/190; 382/192; 382/193; 382/194; 382/195; 382/199
(58) Field of Classification Search .................. 382/190, 382/192, 193, 194, 195, 199
See application file for complete search history.

(56) References Cited

U.S. PATENT DOCUMENTS 5,872,864 A * 2/1999 Imade et al. .................. 382/176
6,208,385 B1 3/2001 Konishi et al.

FOREIGN PATENT DOCUMENTS

| JP | 09-191430 | 7/1997 |
|---|---|---|
| JP | 10-178598 | 6/1998 |
| JP | 11-234631 | 8/1999 |
| JP | 2002-142084 | 5/2002 |
| JP | 2002-197449 | 7/2002 |
| JP | 2003-224718 | 8/2003 |
| JP | 2004-163809 | 6/2004 |

* cited by examiner

*Primary Examiner* — Mike Rahmjoo
(74) *Attorney, Agent, or Firm* — Oblon, Spivak, McClelland, Maier & Neustadt, L.L.P.

(57) ABSTRACT

An image processing apparatus for processing an image composed of an effective area as a meaningful area and an ineffective area as a remaining area, includes a left coordinate position detecting unit for detecting a coordinate position of a left-end pixel of pixels that are determined to be out of the ineffective area from among pixels arranged in a vertical line in the image by comparing a pixel value of each pixel with a first threshold value, a right coordinate position detecting unit for detecting a coordinate position of a right-end pixel of the pixels, an upper coordinate position detecting unit for detecting a coordinate position of an upper-end pixel of the pixels, and a lower coordinate position detecting unit for detecting a coordinate position of a lower-end pixel of the pixels.

9 Claims, 40 Drawing Sheets

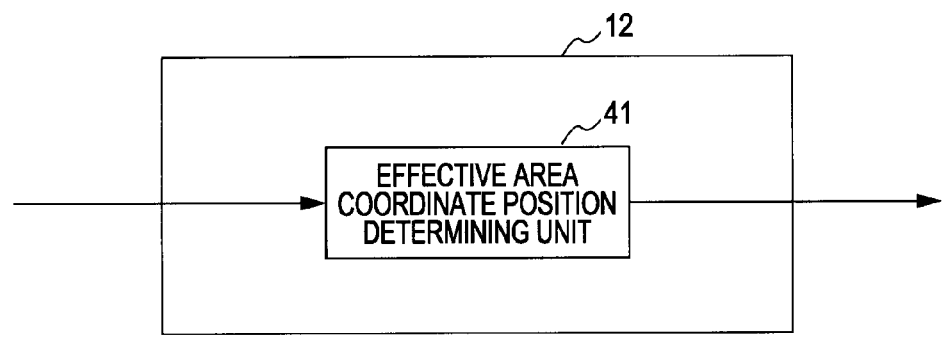
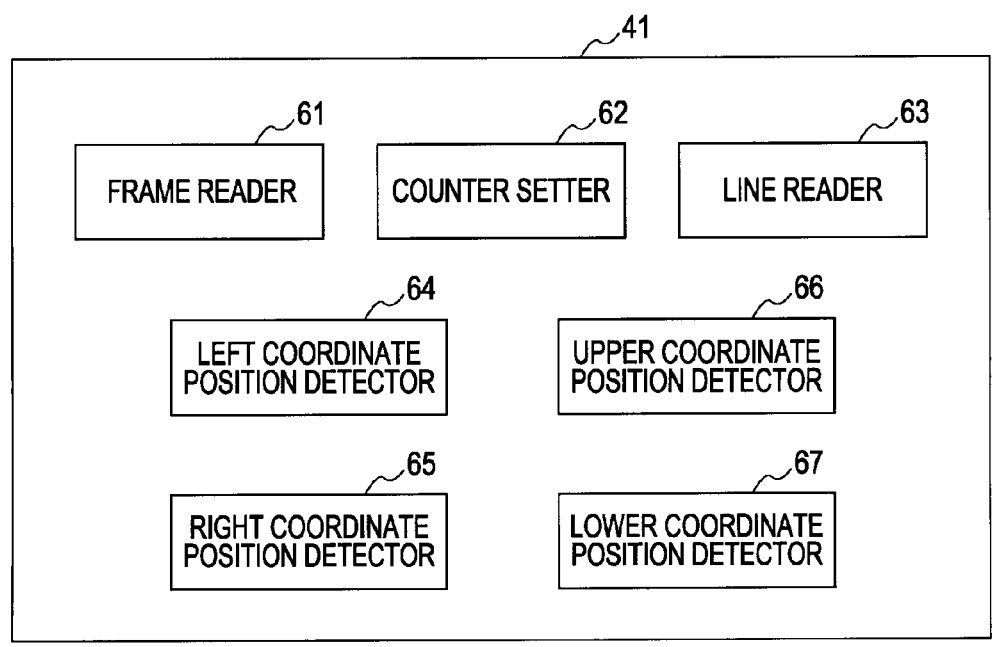

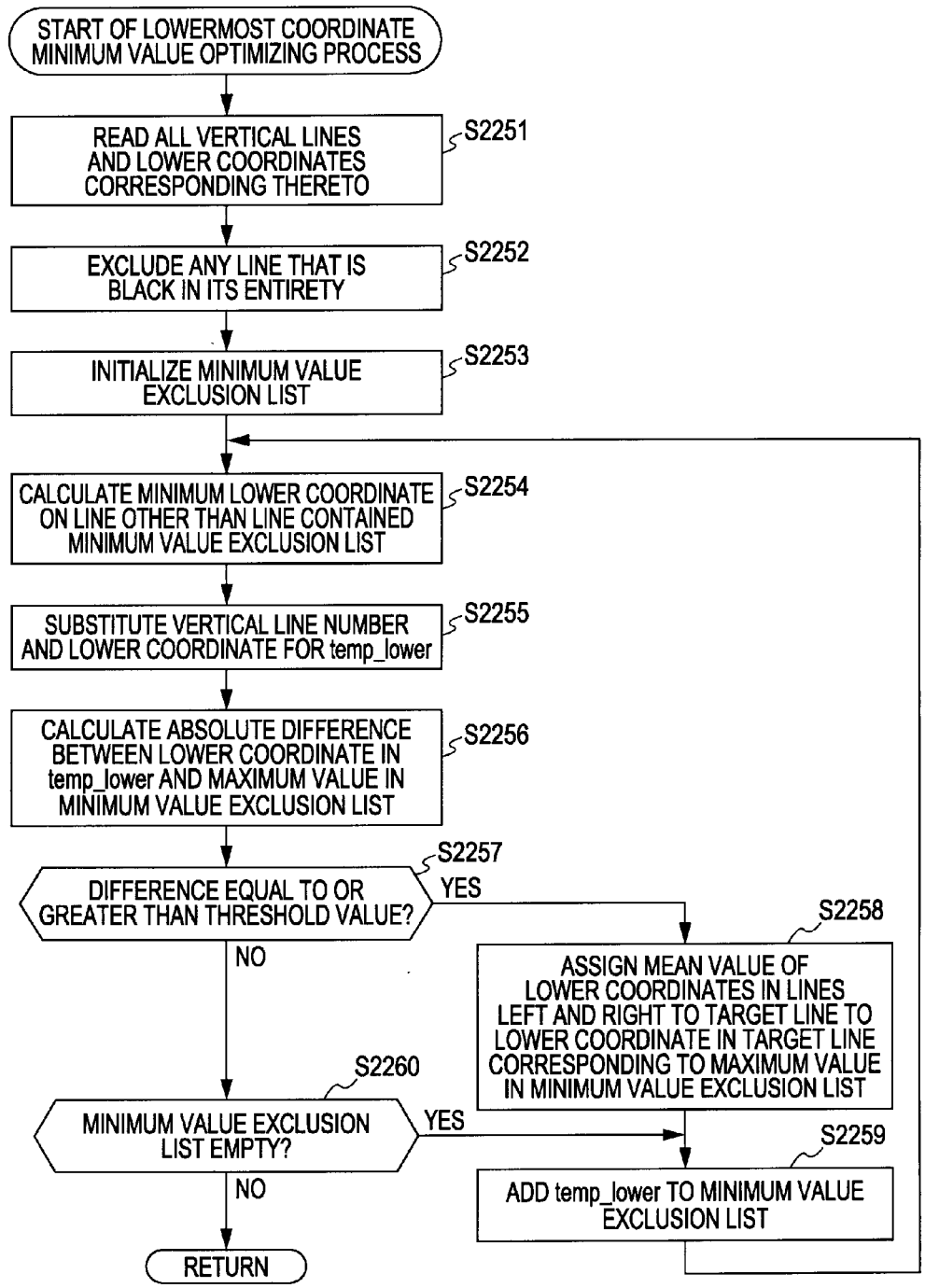

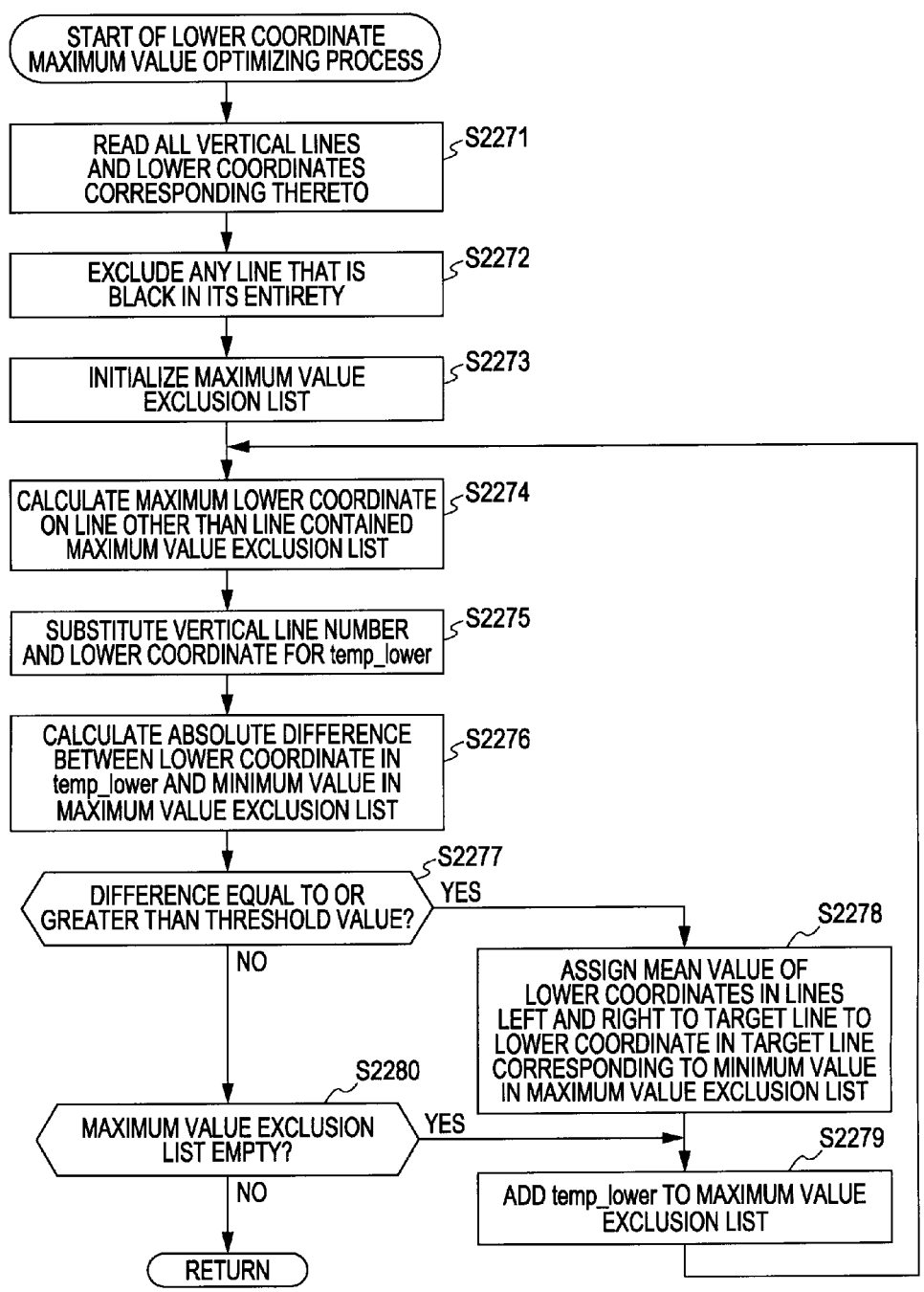

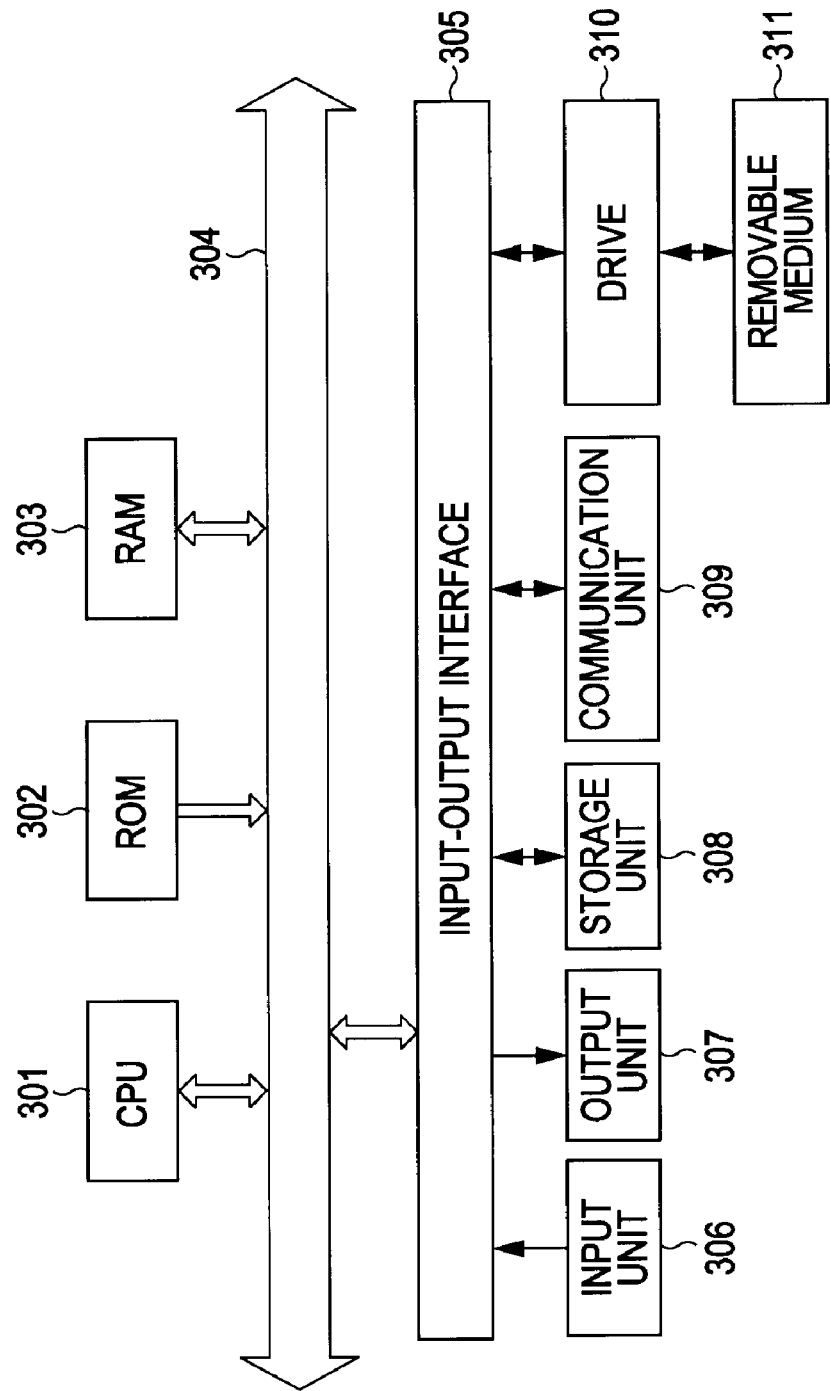

METHOD AND APPARATUS FOR PROCESSING IMAGE, RECORDING MEDIUM, AND COMPUTER PROGRAM

CROSS REFERENCES TO RELATED APPLICATIONS

The present invention contains subject matter related to Japanese Patent Application JP 2006-109369 filed in the Japanese Patent Office on Apr. 12, 2006, the entire contents of which are incorporated herein by reference.

BACKGROUND OF THE INVENTION

1. Field of the Invention

The present invention relates to an image processing method, an image processing apparatus, a recording medium, and a computer program and, in particular, to an image processing method, an image processing apparatus, a recording medium, and a computer program for detecting an effective area of an image that contains the effective area and an ineffective area.

2. Description of the Related Art

Techniques for detecting a black band (letter box) are used to display a 16:9 aspect-ratio wide television screen signal on a standard 4:3 aspect-ratio television screen. Since black bands appear on the television screen, black band detection is performed with reference to the position of the black bands. In this technique, however, the position of the black bands is not detected. Techniques for detecting accurately the black band position have been proposed, but the black band detection is performed on the premise that the black band is rectangular.

Japanese Unexamined Patent Application Publication No. 2004-163809 discloses one technique. In accordance with the disclosed technique, video data of one line is added to a current frame to detect an area of a rectangular black band in one frame of screen. The sum is used to determine on a line by line base whether the line falls within the black band.

Japanese Unexamined Patent Application Publication No. 10-178598 discloses another technique. In accordance with the disclosed technique, a horizontal area is segmented into blocks, and an edge is detected according to a representative value such as a mean value to detect an effective area.

In accordance with Japanese Unexamined Patent Application Publication No. 11-234631, a black band is detected using a mean luminance value over a horizontal period.

SUMMARY OF THE INVENTION

A cross-hatch signal such as the one shown in FIG. 1 may be now input. In accordance with the technique disclosed by Japanese Unexamined Patent Application Publication No. 2004-163809, an edge portion of the screen can be erroneously detected as a black band because of small white areas. If a detection threshold level is raised, an effective area at a gray level can be erroneously detected as a black band.

In accordance with the technique disclosed in Japanese Unexamined Patent Application Publication No. 10-178598 as in Japanese Unexamined Patent Application Publication No. 2004-163809, a black band is erroneously detected in the calculation of a representative value of each block in response to the cross-hatch signal of FIG. 1 because of a small quantity of white area. Depending on a segmented block, a block of black portion only can be present. Not only the edge portion of the cross-hatch signal but also such segmented block can be erroneously detected as a black band.

In accordance with the technique disclosed in Japanese Unexamined Patent Application Publication No. 11-234631, as in the above-described techniques, a black band can be erroneously detected in response to a signal having a small non-black area, such as the cross-hatch signal. If a threshold level is raised to prevent erroneous detection, an effective area at a gray level is also erroneously detected as a black band.

A video of a heart-mark inset in a recall scene in a movie or a rectangular speech balloon inset of FIG. 2 might be input. The heart-mark inset section cannot be expanded to the same size as the entire recall scene or the speech balloon inset cannot be expanded to a full rectangular panel. In an attempt to expand such video to a rectangular shape in an auto-wide function, the video cannot be expanded accurately with an erroneous detection occurring.

More specifically, as shown in FIG. 3, edge sections of a cross-hatch are erroneously detected as a black band in response to the cross-hatch signal of FIG. 1. In FIG. 3, a blank surrounding outline is the section erroneously detected as a blank band. In response to a video signal of the rectangular speech balloon of FIG. 2, a mouth portion of the balloon shown in a bottom left portion of the screen is erroneously detected as a black band. As shown in FIG. 4, a surrounding blank outline is the portion erroneously detected as a black area.

It is thus desirable to detect an effective area other than an ineffective area in an image composed of the ineffective area as a black area and an effective area in any form.

In accordance with one embodiment of the present invention, an image processing apparatus for processing an image composed of an effective area as a meaningful area and an ineffective area as a remaining area, includes a left coordinate position detecting unit for detecting a coordinate position of a left-end pixel of pixels that are determined to be out of the ineffective area from among pixels arranged in a horizontal line in the image by comparing a pixel value of each pixel with a first threshold value, a right coordinate position detecting unit for detecting a coordinate position of a right-end pixel of pixels that are determined to be out of the ineffective area from among pixels arranged in a horizontal line in the image by comparing a pixel value of each pixel with the first threshold value, an upper coordinate position detecting unit for detecting a coordinate position of an upper-end pixel of pixels that are determined to be out of the ineffective area from among pixels arranged in a vertical line in the image by comparing a pixel value of each pixel with the first threshold value, and a lower coordinate position detecting unit for detecting a coordinate position of a lower-end pixel of pixels that are determined to be out of the ineffective area from among pixels arranged in a vertical line in the image by comparing a pixel value of each pixel with the first threshold value.

The image processing apparatus may further include an effective area coordinate position determining unit for determining a coordinate position of the effective area in the image from the coordinate position of the left-end pixel and the coordinate position of the right-end pixel in each horizontal line, and the coordinate position of the upper-end pixel and the coordinate position of the lower-end pixel in each vertical line.

The left coordinate position detecting unit may detect the coordinate position of the left-end pixel of the pixels that are determined to be out of the ineffective area from among the pixels arranged in the horizontal line in the image by comparing the pixel value of each pixel with the first threshold value and comparing an absolute difference between pixel values of adjacent pixels with a second threshold value. The right coordinate position detecting unit may detect the coordinate position of the right-end pixel of the pixels that are determined to be out of the ineffective area from among the pixels arranged in the horizontal line in the image by comparing the pixel value of each pixel with the first threshold value, and comparing an absolute difference between pixel values of adjacent pixels with the second threshold value. The upper coordinate position detecting unit may detect the coordinate position of the upper-end pixel of the pixels that are determined to be out of the ineffective area from among the pixels arranged in the vertical line in the image by comparing the pixel value of each pixel with the first threshold value and comparing an absolute difference between pixel values of adjacent pixels with the second threshold value. The lower coordinate position detecting unit may detect the coordinate position of the lower-end pixel of the pixels that are determined to be out of the ineffective area from among the pixels arranged in the vertical line in the image by comparing the pixel value of each pixel with the first threshold value and comparing an absolute difference between pixel values of adjacent pixels with the second threshold value.

The image processing apparatus may further include a leftmost coordinate position determining unit for determining a position of the leftmost pixel from the positions of the left-end pixels, each left-end pixel detected on a per horizontal line basis, a rightmost coordinate position determining unit for determining a position of the rightmost pixel from the positions of the right-end pixels, each right-end pixel detected on a per horizontal line basis, an uppermost coordinate position determining unit for determining a position of the uppermost pixel from the positions of the upper-end pixels, each upper-end pixel detected on a per vertical line basis, a lowermost coordinate position determining unit for determining a position of the lowermost pixel from the positions of the lower-end pixels, each lower-end pixel detected on a per vertical line basis, and a rectangular effective area coordinate determining unit for determining the effective area having a rectangular shape in the image from the position of the leftmost pixel, the position of the rightmost pixel, the position of the uppermost pixel, and the position of the lowermost pixel.

The leftmost coordinate position determining unit may determine as a leftmost position a position of a second pixel from the leftmost pixel if a difference between the position of the leftmost pixel and the position of the second pixel from the leftmost pixel is greater than a second threshold value. The rightmost coordinate position determining unit may determine as a rightmost position a position of a second pixel from the rightmost pixel if a difference between the position of the rightmost pixel and the position of the second pixel from the rightmost pixel is greater than the second threshold value. The uppermost coordinate position determining unit may determine as an uppermost position a position of a second pixel from the uppermost pixel if a difference between the position of the uppermost pixel and the position of the second pixel from the uppermost pixel is greater than the second threshold value. The lowermost coordinate position determining unit may determine as a lowermost position a position of a second pixel from the lowermost pixel if a difference between the position of the lowermost pixel and the position of the second pixel from the lowermost pixel is greater than the second threshold value.

The image processing apparatus may further include a left coordinate position optimizing unit for setting, as a leftmost position of positions of left-end pixels, each left-end pixel detected on per a horizontal line basis, the mean value of positions of two left-end pixels in two respective horizontal lines adjacent to the horizontal line from which a leftmost pixel is detected if a difference between the position of the leftmost pixel and the position of the second pixel from the leftmost pixel is greater than a second threshold, and setting, as a rightmost position of the positions of the left-end pixels, the mean value of positions of two left-end pixels in two respective horizontal lines adjacent to the horizontal line from which a rightmost pixel is detected if a difference between the position of the rightmost pixel and the position of the second pixel from the rightmost pixel is greater than the second threshold, a right coordinate position optimizing unit for setting, as a leftmost position of positions of right-end pixels, each right-end pixel detected on per a horizontal line basis, the mean value of positions of two right-end pixels in two respective horizontal lines adjacent to the horizontal line from which a leftmost pixel is detected if a difference between the position of the leftmost pixel and the position of the second pixel from the leftmost pixel is greater than the second threshold, and setting, as a rightmost position of the positions of the right-end pixels, the mean value of positions of two right-end pixels in two respective horizontal lines adjacent to the horizontal line from which a rightmost pixel is detected if a difference between the position of the rightmost pixel and the position of the second pixel from the rightmost pixel is greater than the second threshold, an upper coordinate position optimizing unit for setting, as an uppermost position of positions of upper-end pixels, each upper-end pixel detected on per a vertical line basis, the mean value of positions of two upper-end pixels in two respective vertical lines adjacent to the vertical line from which an uppermost pixel is detected if a difference between the position of the uppermost pixel and the position of the second pixel from the uppermost pixel is greater than the second threshold, and setting, as a lowermost position of the positions of the upper-end pixels, the mean value of positions of two upper-end pixels in two respective vertical lines adjacent to the vertical line from which a lowermost pixel is detected if a difference between the position of the lowermost pixel and the position of the second pixel from the lowermost pixel is greater than the second threshold, and a lower coordinate position optimizing unit for setting, as an uppermost position of positions of lower-end pixels, each lower-end pixel detected on per a vertical line basis, the mean value of positions of two lower-end pixels in two respective vertical lines adjacent to the vertical line from which an uppermost pixel is detected if a difference between the position of the uppermost pixel and the position of the second pixel from the uppermost pixel is greater than the second threshold, and setting, as a lowermost position of the positions of lower-end pixels, the mean value of positions of two lower-end pixels in two respective vertical lines adjacent to the vertical line from which a lowermost pixel is detected if a difference between the position of the lowermost pixel and the position of the second pixel from the lowermost pixel is greater than the second threshold.

In accordance with one embodiment of the present invention, an information processing method for processing an image composed of an effective area as a meaningful area and an ineffective area as a remaining area, includes steps of detecting a coordinate position of a left-end pixel of pixels that are determined to be out of the ineffective area from among pixels arranged in a horizontal line in the image by comparing a pixel value of each pixel with a first threshold value, detecting a coordinate position of a right-end pixel of pixels that are determined to be out of the ineffective area from among pixels arranged in a horizontal line in the image by comparing a pixel value of each pixel with the first threshold value, detecting a coordinate position of an upper-end pixel of pixels that are determined to be out of the ineffective area from among pixels arranged in a vertical line in the image by comparing a pixel value of each pixel with the first threshold value, and detecting a coordinate position of a lower-end pixel of pixels that are determined to be out of the ineffective area from among pixels arranged in a vertical line in the image by comparing a pixel value of each pixel with the first threshold value.

One embodiment of the present invention relates to one a computer program and a recording medium storing the computer program. The computer program for causing a computer to process an image composed of an effective area as a meaningful area and an ineffective area as a remaining area, includes steps of detecting a coordinate position of a left-end pixel of pixels that are determined to be out of the ineffective area from among pixels arranged in a horizontal line in the image by comparing a pixel value of each pixel with a first threshold value, detecting a coordinate position of a right-end pixel of pixels that are determined to be out of the ineffective area from among pixels arranged in a horizontal line in the image by comparing a pixel value of each pixel with the first threshold value, detecting a coordinate position of an upper-end pixel of pixels that are determined to be out of the ineffective area from among pixels arranged in a vertical line in the image by comparing a pixel value of each pixel with the first threshold value, and detecting a coordinate position of a lower-end pixel of pixels that are determined to be out of the ineffective area from among pixels arranged in a vertical line in the image by comparing a pixel value of each pixel with the first threshold value.

In accordance with embodiments of the present invention, the coordinate position of the left-end pixel of the pixels that are determined to be out of the ineffective area from among pixels arranged in a horizontal line in the image is detected by comparing a pixel value of each pixel with a first threshold value to determine whether the pixel falls within the ineffective area. The coordinate position of the right-end pixel of the pixels that are determined to be out of the ineffective area from among pixels arranged in a horizontal line in the image is detected by comparing a pixel value of each pixel with the first threshold value. The coordinate position of the upper-end pixel of the pixels that are determined to be out of the ineffective area from among pixels arranged in a vertical line in the image is detected by comparing a pixel value of each pixel with the first threshold value. The coordinate position of the lower-end pixel of pixels that are determined to be out of the ineffective area from among pixels arranged in a vertical line in the image is detected by comparing a pixel value of each pixel with the first threshold value.

In accordance with embodiments of the present invention, an input image composed of the ineffective area and the effective area having any shape is processed so that the effective area is accurately detected.

BRIEF DESCRIPTION OF THE DRAWINGS

FIG. 8 is a block diagram illustrating an in-frame coordinate position determining unit of FIG. 5;
FIG. 9 is a block diagram illustrating an effective area coordinate position determining unit.

FIG. 44 is a flowchart illustrating in detail an optimizing process of optimizing a lower coordinate minimum value;

FIG. 45 is a flowchart illustrating in detail an optimizing process of optimizing a lower coordinate maximum value; and FIG. 46 is a block diagram of a personal computer.

DESCRIPTION OF THE PREFERRED EMBODIMENTS

Figure 1:
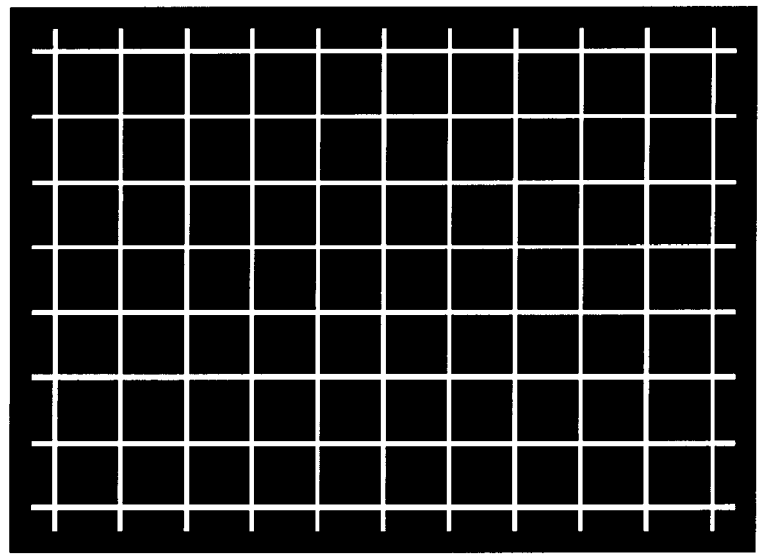
FIG. 1 illustrates an example of cross-hatch signal.

Before describing an embodiment of the present invention, the correspondence between the features of the invention and the specific elements disclosed in an embodiment of the present invention is discussed below. This description is intended to assure that embodiments supporting the invention are described in this specification. Thus, even if an element in the following embodiments is not described as relating to a certain feature of the present invention, that does not necessarily mean that the element does not relate to that feature of the invention. Conversely, even if an element is described herein as relating to a certain feature of the invention, that does not necessarily mean that the element does not relate to other features of the invention.

In accordance with one embodiment of the present invention, an image processing apparatus for processing an image composed of an effective area as a meaningful area and an ineffective area as a remaining area, includes a left coordinate position detecting unit (for example, left coordinate position detector 64 of FIG. 9) for detecting a coordinate position of a left-end pixel of pixels that are determined to be out of the ineffective area from among pixels arranged in a horizontal line in the image by comparing a pixel value of each pixel with a first threshold value, a right coordinate position detecting unit (for example, right coordinate position detector 65 of FIG. 9) for detecting a coordinate position of a right-end pixel of pixels that are determined to be out of the ineffective area from among pixels arranged in a horizontal line in the image by comparing a pixel value of each pixel with the first threshold value, an upper coordinate position detecting unit (for example, upper coordinate position detector 66 of FIG. 9) for detecting a coordinate position of an upper-end pixel of pixels that are determined to be out of the ineffective area from among pixels arranged in a vertical line in the image by comparing a pixel value of each pixel with the first threshold value, and a lower coordinate position detecting unit (for example, lower coordinate position detector 67 of FIG. 9) for detecting a coordinate position of a lower-end pixel of pixels that are determined to be out of the ineffective area from among pixels arranged in a vertical line in the image by comparing a pixel value of each pixel with the first threshold value.

The image processing apparatus may further include an effective area coordinate position determining unit (for example, effective area coordinate position determining unit 41 of FIG. 8) for determining a coordinate position of the effective area in the image from the coordinate position of the left-end pixel and the coordinate position of the right-end pixel in each horizontal line, and the coordinate position of the upper-end pixel and the coordinate position of the lower-end pixel in each vertical line.

The left coordinate position detecting unit (for example, left coordinate position detector 64 of FIG. 9) may detect the coordinate position of the left-end pixel of the pixels that are determined to be out of the ineffective area from among the pixels arranged in the horizontal line in the image by comparing the pixel value of each pixel with the first threshold value and comparing an absolute difference between pixel values of adjacent pixels with a second threshold value. The right coordinate position detecting unit (for example, right coordinate position detector 65 of FIG. 9) may detect the coordinate position of the right-end pixel of the pixels that are determined to be out of the ineffective area from among the pixels arranged in the horizontal line in the image by comparing the pixel value of each pixel with the first threshold value, and comparing an absolute difference between pixel values of adjacent pixels with the second threshold value. The upper coordinate position detecting unit (for example, upper coordinate position detector 66 of FIG. 9) may detect the coordinate position of the upper-end pixel of the pixels that are determined to be out of the ineffective area from among the pixels arranged in the vertical line in the image by comparing the pixel value of each pixel with the first threshold value and comparing an absolute difference between pixel values of adjacent pixels with the second threshold value. The lower coordinate position detecting unit (for example, lower coordinate position detector 67 of FIG. 9) may detect the coordinate position of the lower-end pixel of the pixels that are determined to be out of the ineffective area from among the pixels arranged in the vertical line in the image by comparing the pixel value of each pixel with the first threshold value and comparing an absolute difference between pixel values of adjacent pixels with the second threshold value.

Figure 24:
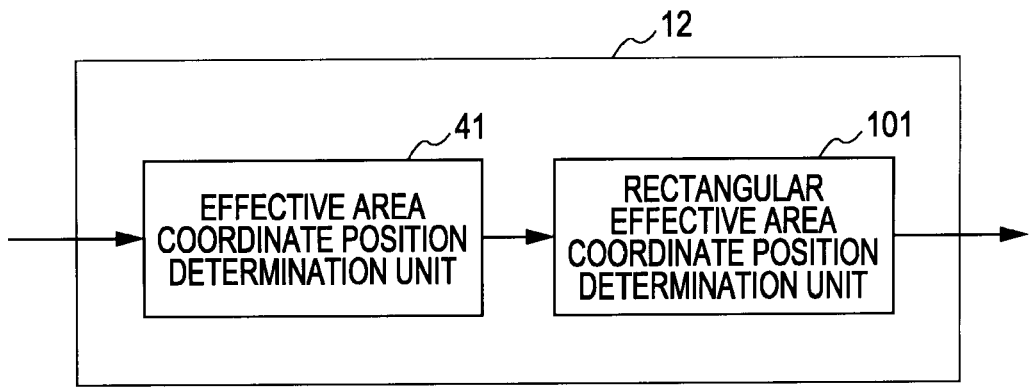
FIG. 24 is a block diagram illustrating another example of the in-frame coordinate position determining unit of FIG. 5.
Figure 25:
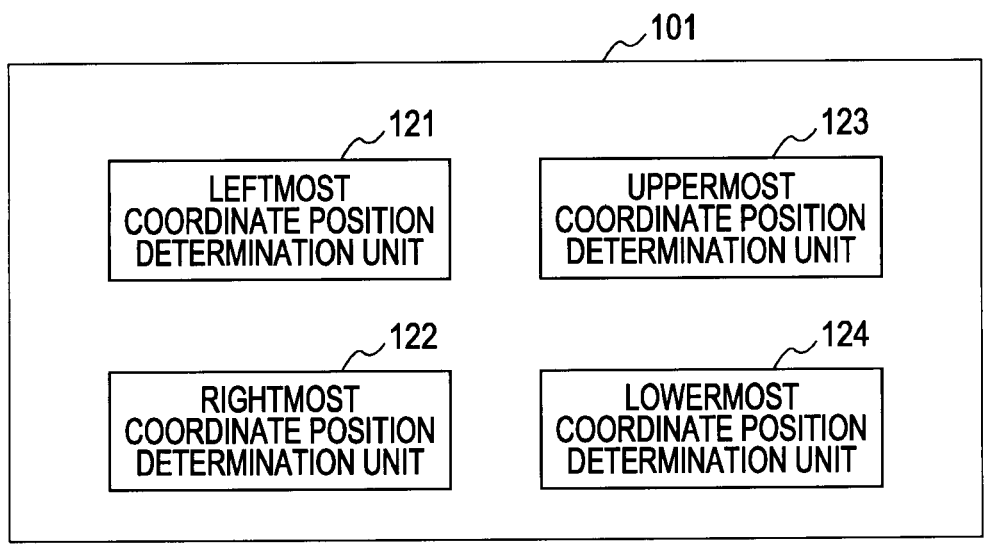
FIG. 25 is a block diagram illustrating a rectangular effective area coordinate position determination unit of FIG. 24.

The image processing apparatus may further include a leftmost coordinate position determining unit (for example, leftmost coordinate position determination unit 121 of FIG. 25) for determining a position of the leftmost pixel from the positions of the left-end pixels, each left-end pixel detected on a per horizontal line basis, a rightmost coordinate position determining unit (for example, rightmost coordinate position determination unit 122 of FIG. 25) for determining a position of the rightmost pixel from the positions of the right-end pixels, each right-end pixel detected on a per horizontal line basis, an uppermost coordinate position determining unit (for example, uppermost coordinate position determination unit 123 of FIG. 25) for determining a position of the uppermost pixel from the positions of the upper-end pixels, each upper-end pixel detected on a per vertical line basis, a lowermost coordinate position determining unit (for example, lowermost coordinate position determination unit 124 of FIG. 25) for determining a position of the lowermost pixel from the positions of the lower-end pixels, each lower-end pixel detected on a per vertical line basis, and a rectangular effective area coordinate determining unit (for example, rectangular effective area coordinate position determination unit 101 of FIG. 24) for determining the rectangular effective area having a rectangular shape in the image from the position of the leftmost pixel, the position of the rightmost pixel, the position of the uppermost pixel, and the position of the lowermost pixel.

The leftmost coordinate position determining unit (for example, leftmost coordinate position determination unit 121 of FIG. 25) may determine as a leftmost position a position of a second pixel from the leftmost pixel if a difference between the position of the leftmost pixel and the position of the second pixel from the leftmost pixel is greater than a second threshold value. The rightmost coordinate position determining unit (for example, rightmost coordinate position determination unit 122 of FIG. 25) may determine as a rightmost position a position of a second pixel from the rightmost pixel if a difference between the position of the rightmost pixel and the position of the second pixel from the rightmost pixel is greater than the second threshold value. The uppermost coordinate position determining unit (for example, uppermost coordinate position determination unit 123 of FIG. 25) may determine as an uppermost position a position of a second pixel from the uppermost pixel if a difference between the position of the uppermost pixel and the position of the second pixel from the uppermost pixel is greater than the second threshold value. The lowermost coordinate position determining unit (for example, lowermost coordinate position determination unit 124 of FIG. 25) may determine as a lowermost position a position of a second pixel from the lowermost pixel if a difference between the position of the lowermost pixel and the position of the second pixel from the lowermost pixel is greater than the second threshold value.

The image processing apparatus may further include a left coordinate position optimizing unit (for example, left coordinate position optimizer 181 of FIG. 35) for setting, as a leftmost position of positions of left-end pixels, each left-end pixel detected on per a horizontal line basis, the mean value of positions of two left-end pixels in two respective horizontal lines adjacent to the horizontal line from which a leftmost pixel is detected if a difference between the position of the leftmost pixel and the position of the second pixel from the leftmost pixel is greater than a second threshold, and setting, as a rightmost position of the positions of the left-end pixels, the mean value of positions of two left-end pixels in two respective rows adjacent to the horizontal line from which a rightmost pixel is detected if a difference between the position of the rightmost pixel and the position of the second pixel from the rightmost pixel is greater than the second threshold, a right coordinate position optimizing unit (for example, right coordinate position optimizer 182 of FIG. 35) for setting, as a leftmost position of positions of right-end pixels, each right-end pixel detected on per a horizontal line basis, the mean value of positions of two right-end pixels in two respective horizontal lines adjacent to the horizontal line from which a leftmost pixel is detected if a difference between the position of the leftmost pixel and the position of the second pixel from the leftmost pixel is greater than the second threshold, and setting, as a rightmost position of the positions of the right-end pixels, the mean value of positions of two right-end pixels in two respective horizontal lines adjacent to the horizontal line from which a rightmost pixel is detected if a difference between the position of the rightmost pixel and the position of the second pixel from the rightmost pixel is greater than the second threshold, an upper coordinate position optimizing unit (for example, upper coordinate position optimizer 183 of FIG. 35) for setting, as an uppermost position of positions of upper-end pixels, each upper-end pixel detected on per a vertical line basis, the mean value of positions of two upper-end pixels in two respective vertical lines adjacent to the vertical line from which an uppermost pixel is detected if a difference between the position of the uppermost pixel and the position of the second pixel from the uppermost pixel is greater than the second threshold, and setting, as a lowermost position of the positions of the upper-end pixels, the mean value of positions of two upper-end pixels in two respective vertical lines adjacent to the vertical line from which a lowermost pixel is detected if a difference between the position of the lowermost pixel and the position of the second pixel from the lowermost pixel is greater than the second threshold, and a lower coordinate position optimizing unit (for example, lower coordinate position optimizer 184 of FIG. 35) for setting, as an uppermost position of positions of lower-end pixels, each lower-end pixel detected on per a vertical line basis, the mean value of positions of two lower-end pixels in two respective vertical lines adjacent to the vertical line from which an uppermost pixel is detected if a difference between the position of the uppermost pixel and the position of the second pixel from the uppermost pixel is greater than the second threshold, and setting, as a lowermost position of the positions of lower-end pixels, the mean value of positions of two lower-end pixels in two respective vertical lines adjacent to the vertical line from which a lowermost pixel is detected if a difference between the position of the lowermost pixel and the position of the second pixel from the lowermost pixel is greater than the second threshold.

Figure 11:
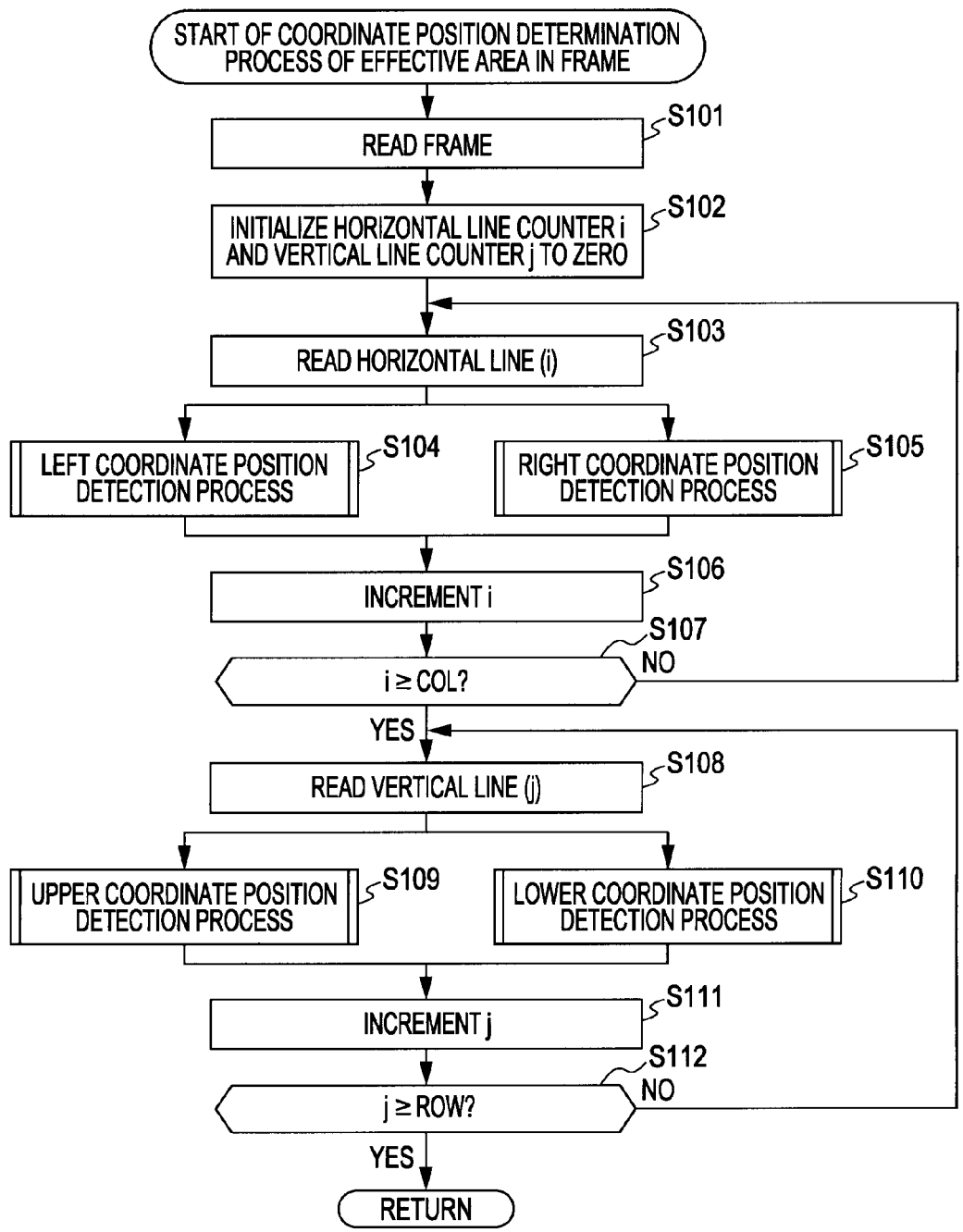
FIG. 11 is a flowchart illustrating a coordinate position determination process of determining a coordinate position in the effective area in a frame.

In accordance with one embodiment of the present invention, an information processing method for processing an image composed of an effective area as a meaningful area and an ineffective area as a remaining area, includes steps of detecting a coordinate position of a left-end pixel of pixels that are determined to be out of the ineffective area from among pixels arranged in a horizontal line in the image by comparing a pixel value of each pixel with a first threshold value (for example, in step S104 of FIG. 11), detecting a coordinate position of a right-end pixel of pixels that are determined to be out of the ineffective area from among pixels arranged in a horizontal line in the image by comparing a pixel value of each pixel with the first threshold value (for example, in step S105 of FIG. 11), detecting a coordinate position of an upper-end pixel of pixels that are determined to be out of the ineffective area from among pixels arranged in a vertical line in the image by comparing a pixel value of each pixel with the first threshold value (for example, in step S109 of FIG. 11), and detecting a coordinate position of a lower-end pixel of pixels that are determined to be out of the ineffective area from among pixels arranged in a vertical line in the image by comparing a pixel value of each pixel with the first threshold value (for example, in step S110 of FIG. 11).

One embodiment of the present invention relates to one a computer program and a recording medium storing the computer program. The computer program for causing a computer to process an image composed of an effective area as a meaningful area and an ineffective area as a remaining area, includes steps of detecting a coordinate position of a left-end pixel of pixels that are determined to be out of the ineffective area from among pixels arranged in a horizontal line in the image by comparing a pixel value of each pixel with a first threshold value (for example, in step S104 of FIG. 11), detecting a coordinate position of a right-end pixel of pixels that are determined to be out of the ineffective area from among pixels arranged in a horizontal line in the image by comparing a pixel value of each pixel with the first threshold value (for example, in step S105 of FIG. 11), detecting a coordinate position of an upper-end pixel of pixels that are determined to be out of the ineffective area from among pixels arranged in a vertical line in the image by comparing a pixel value of each pixel with the first threshold value (for example, in step S109 of FIG. 11), and detecting a coordinate position of a lower-end pixel of pixels that are determined to be out of the ineffective area from among pixels arranged in a vertical line in the image by comparing a pixel value of each pixel with the first threshold value (for example, in step S110 of FIG. 11).

Figure 5:
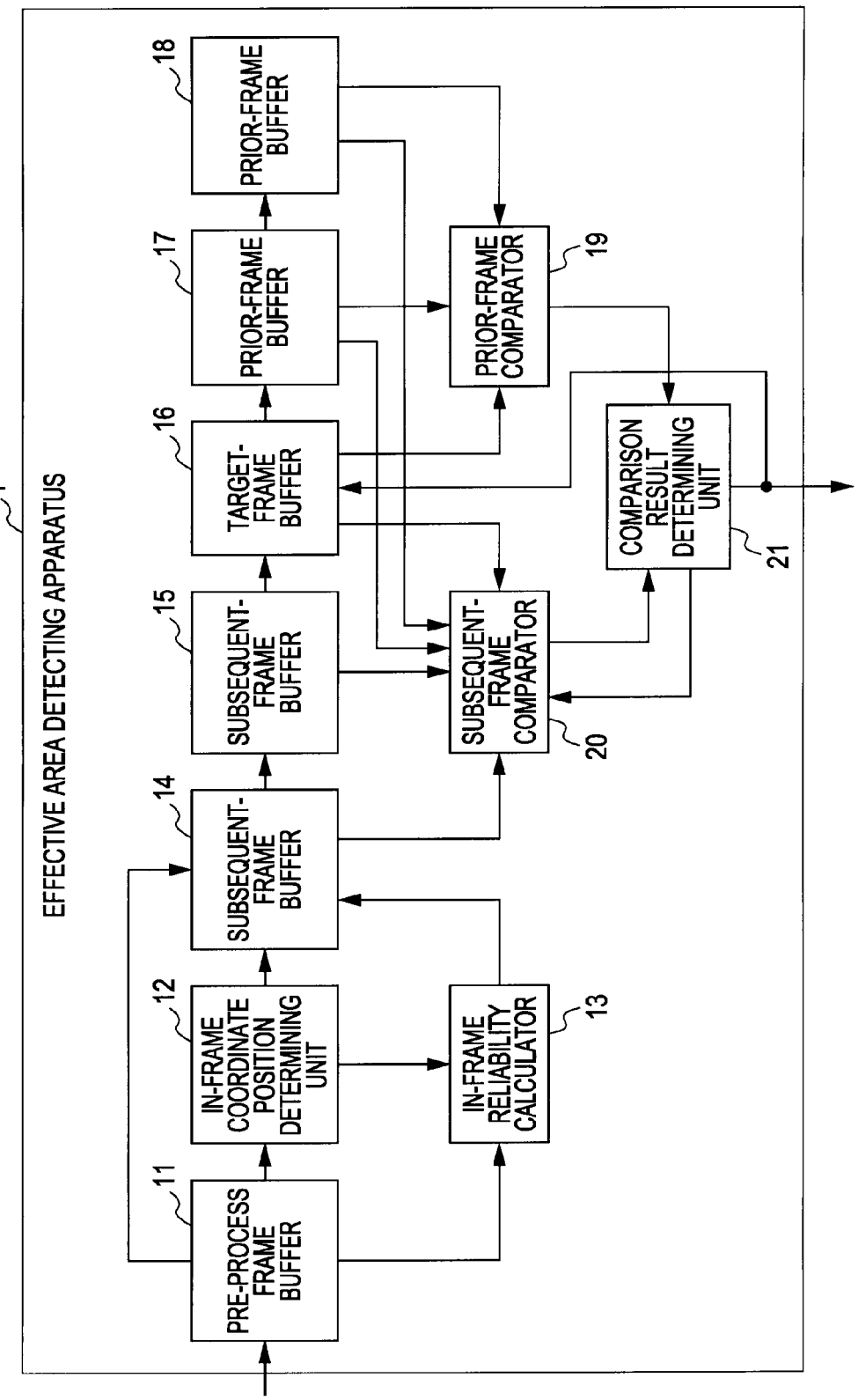
FIG. 5 illustrates an effective area detecting apparatus in accordance with one embodiment of the present invention.

FIG. 5 illustrates an effective area detecting apparatus 1 in accordance with one embodiment of the present invention.

The effective area detecting apparatus 1 detects an effective area of an image, containing a black area as an ineffective area and the effective area, with respect to video data of one frame using information regarding prior and subsequent frames.

The effective area is a meaningful area where a meaningful image is displayed therewithin. Any image in the ineffective area is not meaningful. For example, the ineffective area is a black area where black is displayed. If an outline of the effective area has a particular shape, the ineffective area has also the particular shape. In that sense, the ineffective area is meaningful. But since no meaningful image is displayed in the effective area anyway, the ineffective area is not meaningful.

The effective area detecting apparatus 1 includes a pre-process frame buffer 11, an in-frame coordinate position determining unit 12, an in-frame reliability calculator 13, subsequent-frame buffers 14 and 15, a target frame buffer 16, prior-frame buffers 17 and 18, a prior-frame comparator 19, a subsequent-frame comparator 20, and a comparison result determining unit 21.

The pre-process frame buffer 11 temporarily stores video data composed of pixel values of pixels forming a supplied one frame, and then supplies the video data to each of the in-frame coordinate position determining unit 12 and the in-frame reliability calculator 13. After processing one frame, the pre-process frame buffer 11 outputs the video data to the subsequent-frame buffer 14.

The in-frame coordinate position determining unit 12 determines a coordinate position representing an effective area based on the information of the pixel values of the pixels of the one frame stored on the pre-process frame buffer 11. More specifically, the in-frame coordinate position determining unit 12 determines a left coordinate position and a right coordinate position of pixels in the effective area on a per horizontal line basis, serving as a border between a black area and the effective area, from the horizontal line of pixels in the frame. The in-frame coordinate position determining unit 12 also determines an upper coordinate position and a lower coordinate position of the effective area on a per vertical line basis, serving as a border between the black area and the effective area, from the vertical line of pixels of the frame. The in-frame coordinate position determining unit 12 then supplies coordinates representing the effective area to each of the in-frame reliability calculator 13 and the subsequent-frame buffer 14.

The in-frame reliability calculator 13 calculates reliability of information of the coordinates of the effective area determined by the in-frame coordinate position determining unit 12. More specifically, the in-frame reliability calculator 13 calculates the reliability along the coordinate position of the pixels of the effective area supplied from the in-frame coordinate position determining unit 12 based on a ratio of black pixels in the black area and a ratio of pixels other than black pixels in the effective area in the border between the black area and the effective area. The in-frame reliability calculator 13 supplies the calculated reliability to the subsequent-frame buffer 14.

The subsequent-frame buffer 14 stores the video data of one frame supplied from the pre-process frame buffer 11 as information regarding a pixel value of each pixel. Upon receiving video data of a new one frame, the subsequent-frame buffer 14 supplies the video data of one frame heretofore stored to the subsequent-frame buffer 15.

Each of the subsequent-frame buffer 15, the target frame buffer 16, and the prior-frame buffers 17 and 18 is identical in structure to the subsequent-frame buffer 14, and successively relays the video data of one frame. The prior-frame buffer 18 deletes the video data of one heretofore stored when the video data of a new one frame is supplied. The target frame buffer 16 might store n-th frame (hereinafter referred to as frame (n)). The subsequent-frame buffers 14 and 15 store video data, coordinates of the effective area, and the reliability of the effective area of frame (n+2) and frame (n+1), respectively. Similarly, the prior-frame buffers 17 and 18 store video data, coordinates of the effective area, and the reliability of the effective area in frame (n−1) and frame (n−2), respectively.

When processing of one frame is completed, the subsequent-frame buffer 14 receives the video data of one frame from the pre-process frame buffer 11 while also receiving the coordinates of the effective area from the in-frame coordinate position determining unit 12 and the reliability of the coordinates of the effective area from the in-frame reliability calculator 13. At the same time, the subsequent-frame buffer 15, the target frame buffer 16, and the prior-frame buffers 17 and 18 respectively receive the video data of the one frame, the coordinates of the effective area, and the information regarding reliability of the effective area from the subsequent-frame buffers 14 and 15, the target frame buffer 16, and the prior-frame buffer 17 at immediately preceding timings. The received information overwrites the information heretofore stored on each of the subsequent-frame buffer 15, the target frame buffer 16, and the prior-frame buffers 17 and 18.

To determine the coordinates in the effective area in the video data of one frame stored on the target frame buffer 16, video data of five frames, namely, a target frame, and two prior frames and two subsequent frames, is always used.

The prior-frame comparator 19 compares the video data, the coordinates of the effective area, and the information regarding reliability of the effective area of the three frames respectively stored on the target frame buffer 16 and the prior-frame buffers 17 and 18, and identifies the coordinates of the correct effective area, and then supplies the identified effective area to the comparison result determining unit 21. More specifically, the prior-frame comparator 19 compares the reliability of the video data of a target frame with the reliability of the video data of the frame earlier than the target frame by one frame, or of the frame earlier than the target frame by two frames, and compares, in terms of similarity, the coordinates of the effective area of the target frame with the coordinates of the effective area of the frame earlier than the target frame by one frame, or of the frame earlier than the target frame by two frames. The prior-frame comparator 19 identifies the coordinates of the effective area based on the comparison results of the reliability and the degree of similarity of the coordinates, and then supplies the identified coordinates of the effective area to the comparison result determining unit 21. The prior-frame comparator 19 cannot always identify a correct effective area.

When the prior-frame comparator 19 cannot determine the position of the effective area, the comparison result determining unit 21 outputs the process result from the prior-frame comparator 19 as the coordinates of the effective area in the correct target frame and the reliability of the effective area. The comparison result determining unit 21 also updates the coordinates of the effective area and the reliability of the effective area stored on the target frame buffer 16 with the determined values. When the prior-frame comparator 19 cannot determine the position of the effective area, the comparison result determining unit 21 requests the subsequent-frame comparator 20 to determine an effective area based on the video data, the coordinates of the effective area, and the reliability of the effective area for the three frames in the subsequent-frame buffers 14 and 15, and the target frame buffer 16. The comparison result determining unit 21 outputs thus determined coordinates of the effective area and the reliability of the effective area while updating the coordinates of the effective area and the reliability of the effective area stored on the target frame buffer 16 with the determined values.

When the prior-frame comparator 19 cannot determine an appropriate effective area, the subsequent-frame comparator 20 compares the video data, the coordinates of the effective area, and the information regarding the reliability of the effective area in the three frames respectively stored on the target frame buffer 16, and the subsequent-frame buffers 14 and 15 to identify the coordinates of a correct effective area in response to an instruction from the comparison result determining unit 21. When the coordinates of the correct effective area are identified, the subsequent-frame comparator 20 supplies the identification results to the comparison result determining unit 21. When the coordinates of the correct effective area cannot be identified, the subsequent-frame comparator 20 compares the reliabilities of the effective areas of the five frames respectively stored on the subsequent-frame buffer 14 through the prior-frame buffer 18 and outputs the coordinates of the effective area having the highest reliability as process results to the comparison result determining unit 21. More specifically, the subsequent-frame comparator 20 identifies any of the effective areas as an appropriate one. More specifically, the subsequent-frame comparator 20 compares the reliability of the video data of the target frame with the reliability of the video data of the frame later than the target frame by one frame, or of the frame later than the target frame by two frames, and compares, in terms of similarity, the coordinates of the effective area of the target frame with the coordinates of the effective area of the frame later than the target frame by one frame, or of the frame later than the target frame by two frames. The subsequent-frame comparator 20 identifies the coordinates of the effective area based on the comparison results of the reliability and the degree of similarity of the coordinates, and then supplies the identified coordinates of the effective area to the comparison result determining unit 21. If the subsequent-frame comparator 20 cannot determine the effective area, the subsequent-frame comparator 20 reads the reliabilities of the video data of the frame one frame earlier, the video data of the frame two frame earlier from the prior-frame buffer 17 and the prior-frame buffer 18 and supplies to the comparison result determining unit 21 the coordinates of the effective area having the highest reliability out of the reliabilities of the coordinates of the effective areas of the five frames from two frame earlier than the target frame to the two frames later than the target frame.

Figure 6:
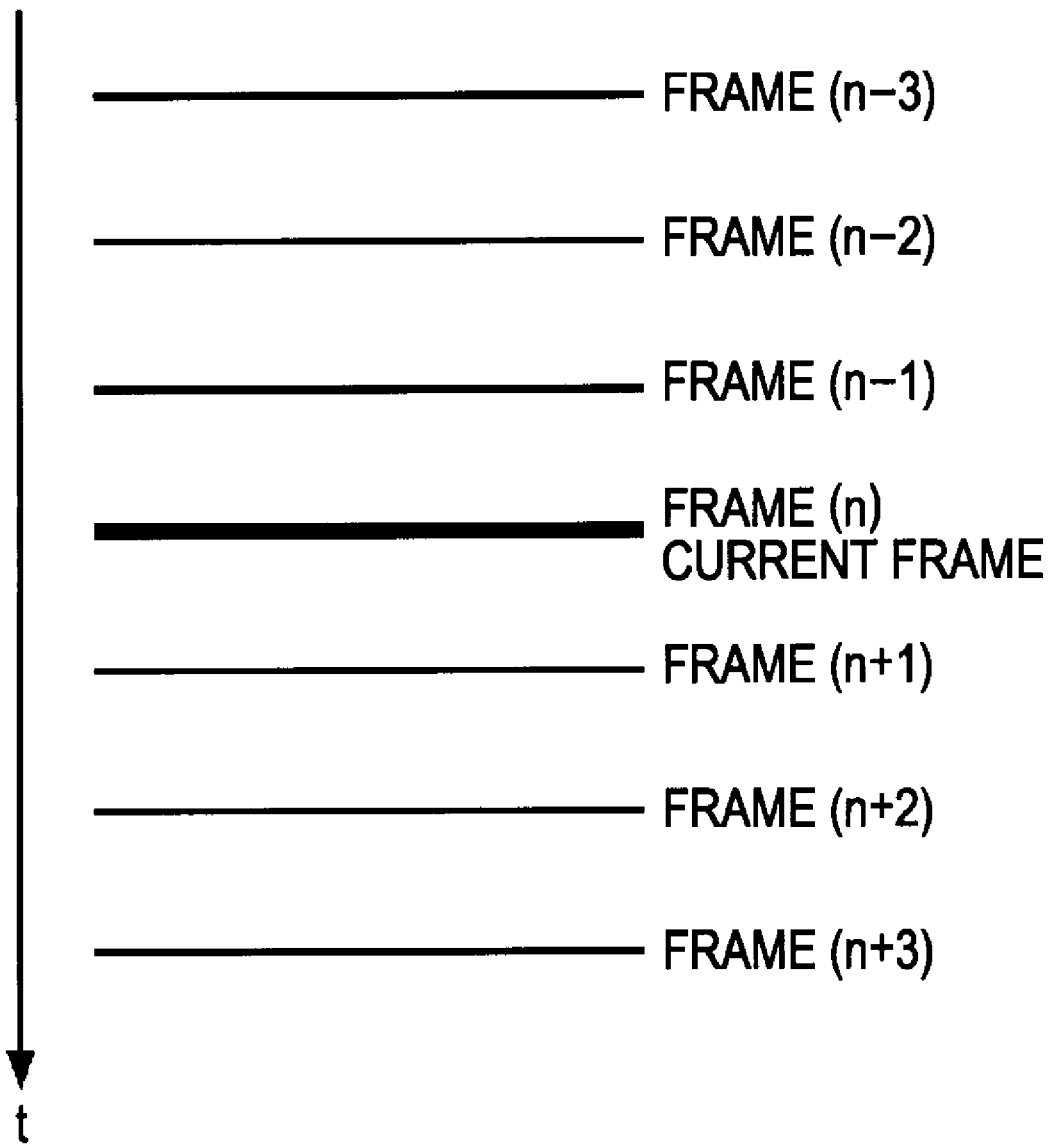
FIG. 6 illustrates a frame denotation method.

In the above discussion, the target frame is the n-th frame, and simply denoted as the frame (n) as shown in FIG. 6. The frames from one frame earlier than the target frame through three frames earlier than the target frame are respectively denoted as frame (n−1), frame (n−2), and frame (n−3). Similarly, the frames from one frame later than the target frame through three frames later than the target frame are respectively referred to as frame (n+1), frame (n+1), and frame (n+3). The frame to be stored on the pre-process frame buffer 11 is denoted as frame (n+3) when the target frame is denoted as frame (n).

An effective area detection process is now described with reference to a flowchart of FIG. 7.

In step S1, the pre-process frame buffer 11 reads a new frame (n+3) while supplying the video data of one frame heretofore stored thereon to the subsequent-frame buffer 14. Similarly, the subsequent-frame buffer 14 through the prior-frame buffer 17 supply the video data, the coordinates of the effective areas, and the information of the reliabilities of the effective areas of the frames stored heretofore thereon to the subsequent-frame buffer 15 through the prior-frame buffer 18, respectively. The subsequent-frame buffer 14 through the subsequent-frame buffer 15 stores video data, coordinates of the effective areas, and information regarding the reliabilities of the effective areas, each newly respectively supplied thereto. The prior-frame buffer 18 deletes and updates the video data, the coordinates of the effective area, and the information regarding the reliability of the effective area of one frame heretofore stored, with the video data, the coordinates of the effective area, and the information regarding the reliability of the effective area of a new one frame supplied from the prior-frame buffer 17. The in-frame coordinate position determining unit 12 outputs coordinate information of the effective area requested in an immediately preceding process to the subsequent-frame buffer 14. The in-frame reliability calculator 13 outputs the reliability requested in the immediately preceding process to the subsequent-frame buffer 14. In a first process, default coordinates of the effective area and a default reliability are output.

In step S2, the in-frame coordinate position determining unit 12 performs a coordinate position determination process of determining an effective area in a frame, thereby determining a coordinate position of the effective area. The in-frame effective area coordinate position determination process will be described in detail later.

In step S3, the in-frame reliability calculator 13 calculates the reliability of the information of the coordinates of the effective area determined by the in-frame coordinate position determining unit 12. More specifically, the in-frame reliability calculator 13 calculates the reliability along the coordinate position of the pixels of the effective area supplied from the in-frame coordinate position determining unit 12 based on a ratio of black pixels in the black area and a ratio of pixels other than black pixels in the effective area in the border between the black area and the effective area. The in-frame reliability calculator 13 supplies the calculated reliability to the subsequent-frame buffer 14.

In steps S2 and S3, the coordinates of the effective area and the reliability of the coordinates of the effective area are determined at the moment the video data of one frame is supplied to the pre-process frame buffer 11. When the video data stored on the pre-process frame buffer 11 is supplied to the subsequent-frame buffer 14 in step S1, the coordinates of the effective area and the reliability of the coordinates of the effective area are also supplied to the subsequent-frame buffer 14. The subsequent-frame buffer 14 through the prior-frame buffer 17 supplies the video data, the coordinates of the effective areas, and the reliabilities of the coordinates of the effective areas to the subsequent-frame buffer 15 through the prior-frame buffer 18, respectively. As a result, the subsequent-frame buffer 14 through the prior-frame buffer 18 always store the video data, the coordinates of the effective areas, and the reliabilities of the coordinates of the effective areas of frame (n+2) through frame (n−2), respectively when the target frame is frame (n).

In step S4, the prior-frame comparator 19 compares the video data, the coordinates of the effective areas, and the information of the reliabilities of the effective areas of the three frames respectively stored on the target frame buffer 16, and the prior-frame buffers 17 and 18. The prior-frame comparator 19 thus determines the coordinates of the correct effective area and then supplies the determined coordinates of the correct effective area to the comparison result determining unit 21.

More specifically, the prior-frame comparator 19 compares the reliability of the video data of a target frame with the reliability of the video data of the frame earlier than the target frame by one frame, or of the frame earlier than the target frame by two frames, and compares, in terms of similarity, the coordinates of the effective area of the target frame with the coordinates of the effective area of the frame earlier than the target frame by one frame, or of the frame earlier than the target frame by two frames. The prior-frame comparator 19 identifies the coordinates of the effective area based on the comparison results of the reliability and the degree of similarity of the coordinates, and then supplies the identified coordinates of the effective area to the comparison result determining unit 21.

In step S5, the comparison result determining unit 21 determines whether the coordinates of the effective area has been determined. If the prior-frame comparator 19 cannot identify the correct effective area in step S5, more specifically, if the prior-frame comparator 19 notifies the comparison result determining unit 21 that the coordinates of the appropriate effective area cannot be determined, the comparison result determining unit 21 instructs in step S6 the subsequent-frame comparator 20 to perform a subsequent-frame comparison process.

In response to the instruction from the comparison result determining unit 21, the subsequent-frame comparator 20 compares in step S6 the video data, the coordinates of the effective area, and the information regarding the reliability of the effective area in the three frames respectively stored on the target frame buffer 16, and the subsequent-frame buffers 14 and 15 to identify the coordinates of a correct effective area. When the coordinates of the correct effective area are identified, the subsequent-frame comparator 20 supplies the identification results to the comparison result determining unit 21. When the coordinates of the correct effective area cannot be identified, the subsequent-frame comparator 20 compares the reliabilities of the effective areas of the five frames respectively stored on the subsequent-frame buffer 14 through the prior-frame buffer 18 and outputs the coordinates of the effective area having the highest reliability as process results to the comparison result determining unit 21. More specifically, the subsequent-frame comparator 20 identifies any of the effective areas as an appropriate one.

More specifically, the subsequent-frame comparator 20 compares the reliability of the video data of the target frame with the reliability of the video data of the frame later than the target frame by one frame, or of the frame later than the target frame by two frames, and compares, in terms of similarity, the coordinates of the effective area of the target frame with the coordinates of the effective area of the frame later than the target frame by one frame, or of the frame later than the target frame by two frames. The subsequent-frame comparator 20 identifies the coordinates of the effective area based on the comparison results of the reliability and the degree of similarity of the coordinates, and then supplies the identified coordinates of the effective area to the comparison result determining unit 21. If the subsequent-frame comparator 20 cannot determine the effective area, the subsequent-frame comparator 20 reads the reliabilities of the video data of the frame earlier than the target frame by one frame, and the video data of the frame earlier than the target frame by two frame, and supplies to the comparison result determining unit 21 the coordinates of the effective area having the highest reliability out of the reliabilities of the coordinates of the effective areas of the five frames from two frame earlier than the target frame to the two frames later than the target frame.

In step S7, the comparison result determining unit 21 outputs the process result from the prior-frame comparator 19 as the coordinates of the effective area in the correct target frame and the reliability of the effective area. The comparison result determining unit 21 also updates the coordinates of the effective area and the reliability of the effective area stored on the target frame buffer 16 with the determined values.

In step S8, the comparison result determining unit 21 determines whether an end command has been issued, i.e., whether a next frame is available. If it is determined in step S8 that the end command has not been issued, processing returns to step S1 to repeat step S1 and subsequent steps.

If it is determined in step S5 that the coordinates of the effective area have been determined, processing proceeds to step S7 with step S6 skipped. In step S7, the comparison result determining unit 21 outputs the information regarding the coordinates of a black band position supplied from the prior-frame comparator 19 as the coordinates of the black band position of the target frame while updating the coordinates of the black band position stored on the target frame buffer 16 with the determined values.

If it is determined in step S8 that an end command has been issued, processing ends.

Figure 2:
FIG. 2 illustrates a video signal containing an effective area in any shape.
Figure 3:
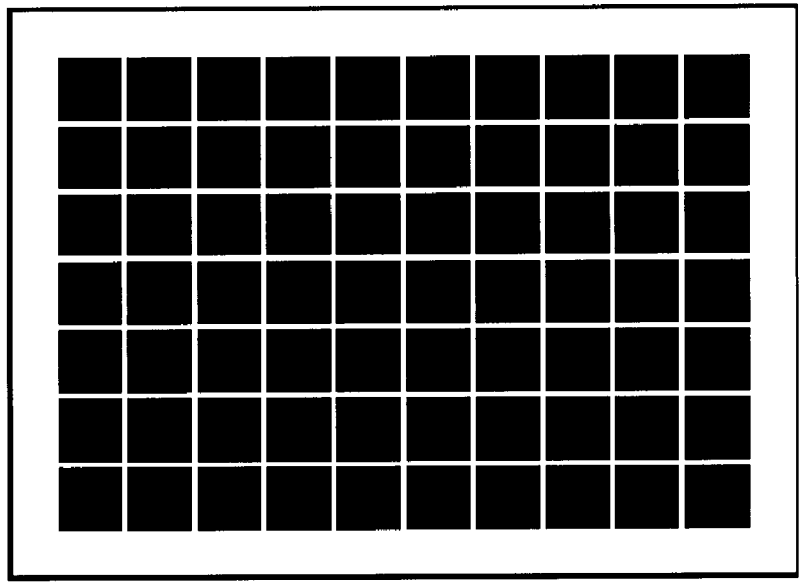
FIG. 3 illustrates a black band detected in response to a cross-hatch signal using a known art.
Figure 4:
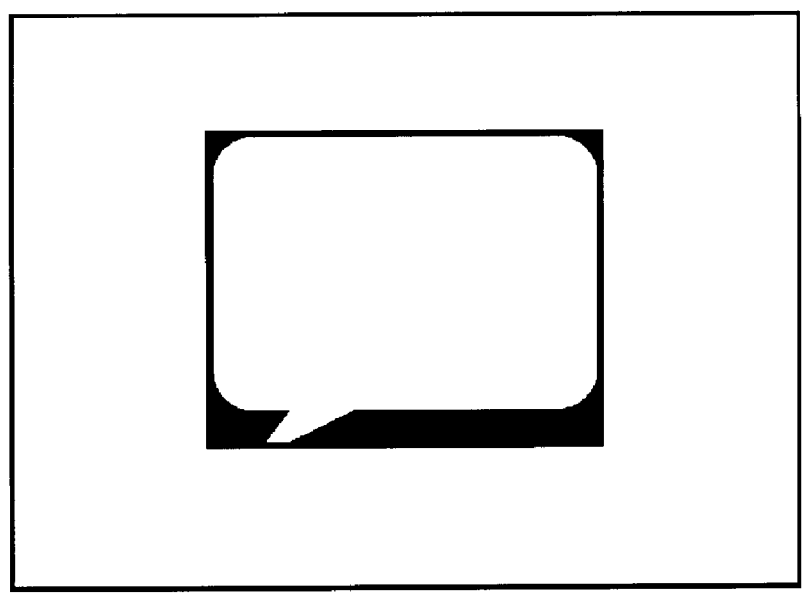
FIG. 4 illustrates a black band detected in response to a video signal having an effective area in any shape using a known art.

The effective area detecting apparatus 1 detects from the video data of one frame as a target the effective area of an image containing an ineffective area as a black area and the effective area using the information regarding the prior frames and subsequent frames. For example, the effective area detecting apparatus 1 processes the images of FIGS. 1 and 2 correctly in a manner free from erroneously detecting the edge portions of the cross-hatch signal and the end of the speech balloon as a black area as shown in FIGS. 3 and 4.

If in the above-described process, the target frame and the preceding frame are similar in the coordinates of the effective area and if a predetermined relationship is recognized between the reliabilities of the coordinates of the effective areas, the coordinates of the effective area in the preceding frame may be continuously used. If the effective area remains substantially unchanged, this method controls the flickering of the effective area or variations in the effective area due to noise.

The target frame and the preceding frame may not be similar in the coordinates of the effective area or no predetermined relationship may be recognized in the reliability of the coordinates of the effective areas between the target frame and the preceding frame. In this case, if the target frame and the subsequent frame are similar in the coordinates of the effective area and if a predetermined relationship is recognized in the reliability of the coordinates of the effective areas between the target frame and the subsequent frame, the coordinates of the effective area in the preceding frame is continuously used as they are. If the effective area is changed at the timing of the target frame, the effective area is accurately switched in accordance with the frame relationship with the subsequent frames.

If the target frame and the subsequent frame are not similar in the coordinates of the effective area or if no predetermined relationship is recognized between the reliabilities of the coordinates of the effective areas, it is considered that the effective area varies continuously. The coordinates of the effective area in one of the target frame and the subsequent frame are selected whichever have the highest reliability effective area. Even if the effective area varies continuously, the apparatus keeps track of the variations in the effective area, thereby accurately changing the coordinates of the effective area.

In the above discussion, the target frame and the two prior frames and the two subsequent frames are used. The number of frames in use are not limited to five. Frames other than the two prior frames and the two subsequent frames may be also used. The number of prior frames and the number of subsequent frames may be different from each other.

The selected effective area may be from one having the highest reliability among any number of frames, or may be one having the highest reliability from among frames similar to the current one.

The in-frame coordinate position determination process of the in-frame coordinate position determining unit 12 is described in detail below.

FIG. 8 is a block diagram illustrating the in-frame coordinate position determining unit 12 in the effective area detecting apparatus 1 of FIG. 5.

The in-frame coordinate position determining unit 12 includes an effective area coordinate position determining unit 41. The effective area coordinate position determining unit 41 determines the coordinate positions of the effective area in the image from the coordinate position of a left-end pixel and a right-end pixel in each horizontal line, and the coordinate positions of an upper-end pixel and a lower-end pixel in each vertical line.

FIG. 9 is a block diagram illustrating the configuration of the effective area coordinate position determining unit 41.

The effective area coordinate position determining unit 41 includes a frame reader 61, a counter setter 62, a liner reader 63, a left coordinate position detector 64, a right coordinate position detector 65, an upper coordinate position detector 66, and a lower coordinate position detector 67.

The frame reader 61 reads the video data of one frame supplied from the pre-process frame buffer 11.

The counter setter 62 initializes a variety of counters in the effective area coordinate position determining unit 41, increments or decrements each counter, and manages a count at each counter.

Figure 10:
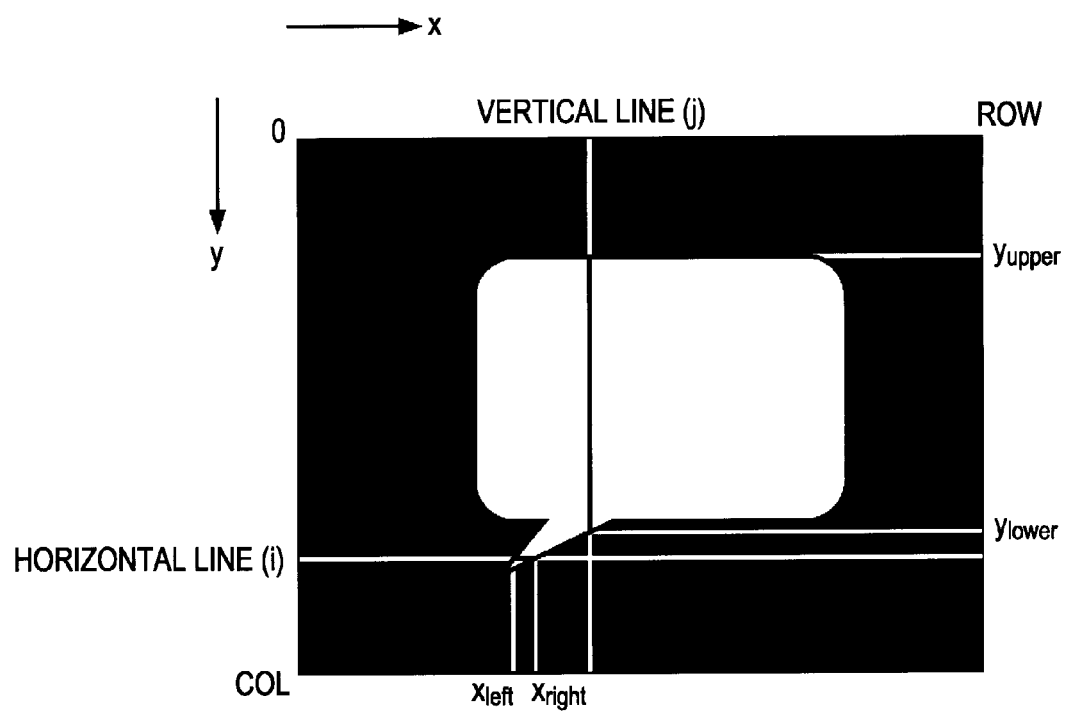
FIG. 10 illustrates a detection method of detecting a coordinate position of an effective area.

The liner reader 63 reads horizontal lines, each row arranged in a horizontal line, of the image of one frame, and stores pixel values of pixels in one line in the order of pixel arrangement. More specifically, the liner reader 63 reads horizontal lines (i) in the position direction of y axis from up to down on the image on the screen as shown in FIG. 10 while storing the pixel values of the pixels along one line in the order of the pixels. Here, i of (i) represents a coordinate in the y axis and any integer between zero and COL−1. A horizontal line (i) represents a horizontal line having a coordinate position i in the y axis. The same is true in the discussion that follows.

The liner reader 63 reads a vertical line of pixels of the image of one frame and stores the pixel values of the pixels in the vertical line in the order of pixel arrangement. More specifically, the liner reader 63 reads a vertical line (j) in the positive direction of the x axis from left to right on the image on the screen as shown in FIG. 10, and stores the pixel values of the pixels of one vertical line. Here j of (j) is a coordinate of the x axis and any integer between zero and ROW−1. A vertical line (j) represents a vertical line at a coordinate position j in the x axis. The same is true in the discussion that follows.

The left coordinate position detector 64 compares each pixel value of a pixel with a threshold value to determine whether the pixel is in a black area. The left coordinate position detector 64 thus detects the coordinate position of a left-end pixel out of pixels determined not to be in the black area in the horizontal line of the image.

More specifically, let P(k) represent a pixel value of a pixel at a coordinate value k along the x axis, the pixel being in the horizontal line (i) of FIG. 10. When the coordinate value k is successively changed from zero to ROW−1, the left coordinate position detector 64 successively compares the pixel value P(k) with a threshold value $C_{th}$ to determine whether the pixel is in the effective area. The left coordinate position detector 64 outputs a coordinate value k providing $P(k) > C_{th}$, namely, a coordinate value $x_{left}$ in the x axis of FIG. 10.

The pixel value of each pixel is compared with the threshold to determine whether the pixel is in the black area and an absolute difference between pixel values of adjacent pixels is compared with a predetermined threshold. The left coordinate position detector 64 thus detects a coordinate position of a left-end pixel out of pixels that are determined not to be one in the black area in the horizontal line of the pixels.

More specifically, let P(k) represent a pixel value of a pixel at a coordinate value k along the x axis, the pixel being in the horizontal line (i) of FIG. 10. When the coordinate value k is successively changed from zero to ROW−1, the left coordinate position detector 64 successively compares the pixel value P(k) with a threshold value $C_{th1}$ to determine whether the pixel is in the effective area. The left coordinate position detector 64 outputs a coordinate value k providing $P(k) > C_{th1}$, namely, a coordinate value $x_{left}$ in the x axis of FIG. 10. As for each pixel failing to satisfy $P(k) > C_{th1}$, the left coordinate position detector 64 compares a predetermined threshold value $C_{th2}$ with an absolute different |P(k)−P(k−1)| of adjacent pixels, and outputs a coordinate value k providing |P(k)−P(k−1)| > $C_{th2}$, namely a coordinate value $x_{left}$ in the x axis of FIG. 10.

The right coordinate position detector 65 compares a pixel value of a pixel with a threshold value to determine whether that pixel is one in the black area. The right coordinate position detector 65 thus detects the coordinate position of a right-end pixel out of pixels that are determined not to be one in the black area in the horizontal line of the image.

More specifically, let P(m) represent a pixel value of a pixel at a coordinate value m along the x axis, the pixel being in the horizontal line (i) of FIG. 10. When the coordinate value m is successively changed from ROW−1 to zero, the right coordinate position detector 65 successively compares the pixel value P(m) with a threshold value $C_{th}$ to determine whether the pixel is in the effective area. The right coordinate position detector 65 outputs a coordinate value m providing $P(m) > C_{th}$, namely, a coordinate value $x_{right}$ in the x axis of FIG. 10.

The pixel value of each pixel is compared with the threshold to determine whether the pixel is in the black area and an absolute difference between pixel values of adjacent pixels is compared with a predetermined threshold. The right coordinate position detector 65 thus detects a coordinate position of a right-end pixel out of pixels that are determined not to be one in the black area in the horizontal line of the image.

More specifically, let P(m) represent a pixel value of a pixel at a coordinate value m along the x axis, the pixel being in the horizontal line (i) of FIG. 10. When the coordinate value m is successively changed from ROW−1 to zero, the right coordinate position detector 65 successively compares the pixel value P(m) with a threshold value $C_{th1}$ to determine whether the pixel is in the effective area. The right coordinate position detector 65 outputs a coordinate value m providing $P(m) > C_{th1}$, namely, a coordinate value $x_{right}$ in the x axis of FIG. 10. As for each pixel failing to satisfy $P(m) > C_{th1}$, the right coordinate position detector 65 compares a predetermined threshold value $C_{th2}$ with an absolute different |P(m)−P(m+1)| of adjacent pixels, and outputs a coordinate value m providing |P(m)−P(m+1)|>$C_{th2}$, namely a coordinate value $x_{right}$ in the x axis of FIG. 10.

The upper coordinate position detector 66 compares a pixel value of a pixel with a threshold value to determine whether that pixel is one in the black area. The upper coordinate position detector 66 thus detects the coordinate position of an upper-end pixel out of pixels that are determined not to be one in the black area in the vertical line of the image.

More specifically, let P(r) represent a pixel value of a pixel at a coordinate value r along the y axis, the pixel being in the vertical line (j) of FIG. 10. When the coordinate value r is successively changed from zero to COL−1, the upper coordinate position detector 66 successively compares the pixel value P(r) with a threshold value $C_{th}$ to determine whether the pixel is in the effective area. The upper coordinate position detector 66 outputs a coordinate value r providing P(r)>$C_{th}$, namely, a coordinate value $y_{upper}$ in the y axis of FIG. 10.

The pixel value of each pixel is compared with the threshold to determine whether the pixel is in the black area and an absolute difference between pixel values of adjacent pixels is compared with a predetermined threshold. The upper coordinate position detector 66 thus detects a coordinate position of an upper-end pixel out of pixels that are determined not to be one in the black area in the vertical line of the image.

More specifically, let P(r) represent a pixel value of a pixel at a coordinate value r along the y axis, the pixel being in the vertical line (j) of FIG. 10. When the coordinate value r is successively changed from zero to COL−1, the upper coordinate position detector 66 successively compares the pixel value P(r) with a threshold value $C_{th1}$ to determine whether the pixel is in the effective area. The upper coordinate position detector 66 outputs a coordinate value s providing P(r)>$C_{th1}$, namely, a coordinate value $y_{upper}$ in the y axis of FIG. 10. As for each pixel failing to satisfy P(r)>$C_{th1}$, the upper coordinate position detector 66 compares a predetermined threshold value $C_{th2}$ with an absolute different |P(r)−P(r−1)| of adjacent pixels, and outputs a coordinate value r providing |P(r)−P(r−1)|>$C_{th2}$, namely a coordinate value $y_{upper}$ in the y axis of FIG. 10.

The lower coordinate position detector 67 compares a pixel value of a pixel with a threshold value to determine whether that pixel is one in the black area. The lower coordinate position detector 67 thus detects the coordinate position of a lower-end pixel out of pixels that are determined not to be one in the black area in the vertical line of the image.

More specifically, let P(s) represent a pixel value of a pixel at a coordinate value s along the y axis, the pixel being in the vertical line (j) of FIG. 10. When the coordinate value s is successively changed from COL−1 to zero, the lower coordinate position detector 67 successively compares the pixel value P(s) with a threshold value $C_{th}$ to determine whether the pixel is in the effective area. The lower coordinate position detector 67 outputs a coordinate value s providing P(s)>$C_{th}$, namely, a coordinate value $y_{lower}$ in the y axis of FIG. 10.

The pixel value of each pixel is compared with the threshold to determine whether the pixel is in the black area and an absolute difference between pixel values of adjacent pixels is compared with a predetermined threshold. The lower coordinate position detector 67 thus detects a coordinate position of a lower-end pixel out of pixels that are determined not to be one in the black area in the vertical line of the image.

More specifically, let P(s) represent a pixel value of a pixel at a coordinate value s along the y axis, the pixel being in the vertical line (j) of FIG. 10. When the coordinate value s is successively changed from COL−1 to zero, the lower coordinate position detector 67 successively compares the pixel value P(s) with a threshold value $C_{th1}$ to determine whether the pixel is in the effective area. The lower coordinate position detector 67 outputs a coordinate value s providing P(s)>$C_{th1}$, namely, a coordinate value $y_{lower}$ in the y axis of FIG. 10. As for each pixel failing to satisfy P(s)>$C_{th1}$, the lower coordinate position detector 67 compares a predetermined threshold value $C_{th2}$ with an absolute different |P(s)−P(s+1)| of adjacent pixels, and outputs a coordinate value r providing |P(s)−P(s+1)|>$C_{th2}$, namely a coordinate value $y_{lower}$ in the y axis of FIG. 10.

The in-frame effective area coordinate position determination process performed by the effective area coordinate position determining unit 41 in the in-frame coordinate position determining unit 12 is described below.

Figure 7:
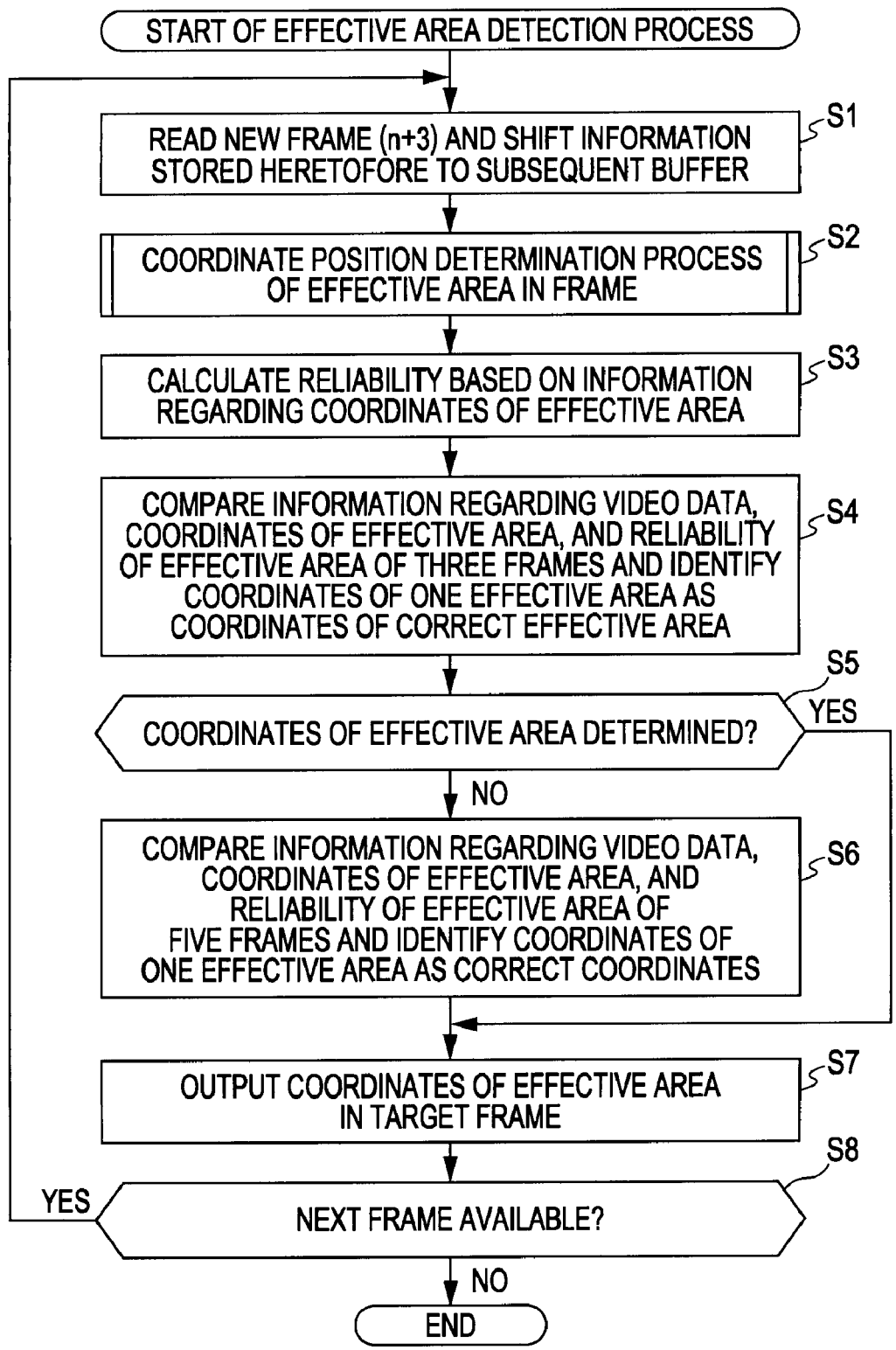
FIG. 7 is a flowchart illustrating an effective area detection process of the effective area detecting apparatus of FIG. 5.

FIG. 11 is a flowchart of the in-frame effective area coordinate position determination process corresponding to step S2 in the flowchart of FIG. 7.

In step S101, the frame reader 61 reads one frame. More specifically, the frame reader 61 reads the video data of one frame supplied from the pre-process frame buffer 11.

In step S102, the counter setter 62 initializes each of a horizontal counter i and a vertical counter j to zero. The count of the counter i is hereinafter simply referred to as a variable "i" and the count of the counter j is hereinafter simply referred to as a variable "j."

In step S103, the liner reader 63 reads a horizontal line (i). In step S103, the liner reader 63 reads a horizontal line (0), namely a top row on a screen. Subsequent to step S103, both step S104 and step S105 are concurrently performed.

In step S104, the left coordinate position detector 64 compares a pixel value of a pixel with a threshold value to determine whether that pixel is in the black area. The left coordinate position detector 64 then outputs the coordinate position of a left-end pixel out of the pixels that are determined not to be one in the black area. In other words, the left coordinate position detector 64 performs a left-end coordinate position detection process.

The left-end coordinate position detection process corresponding to step S104 is described below with reference to a flowchart of FIG. 12.

In step S131, the counter setter 62 initializes a counter k to zero. The counter k takes any value from a coordinate value 0 to a coordinate value ROW−1 along the x axis of FIG. 10. The count of the counter k is hereinafter simply referred to as a variable "k."

In step S132, the left coordinate position detector 64 compares the pixel value P(k) of the pixel at the coordinate value k in the x axis with the threshold value $C_{th}$ that is used to determine whether the pixel is in the effective area, thereby determining whether the relationship P(k)>$C_{th}$ holds. More specifically, the left coordinate position detector 64 determines whether the pixel value P(k) of the pixel at the coordinate k is the pixel value of a pixel in the effective area.

More specifically, the left coordinate position detector 64 determines whether any of R (red), G (green) and B (blue) components of the pixel value is greater than the threshold value $C_{th}$ (for example, $C_{th}$=25).

If it is determined in step S132 that the relationship P(k)>$C_{th}$ holds, i.e., that the pixel value P(k) of the pixel at the coordinate value k is the pixel value of a pixel in the effective area, processing proceeds to step S133.

In step S133, the left coordinate position detector 64 outputs the coordinate value k at which the relationship P(k)>$C_{th}$ holds, i.e., the pixel value P(k) is the pixel value of a pixel in the effective area.

If it is determined in step S132 that the relationship $P(k) > C_{th}$ does not hold, i.e., that the pixel value $P(k)$ of the pixel at the coordinate value k is not the pixel value of a pixel in the effective area but the pixel value of a pixel in the black area, processing proceeds to step S134.

In step S134, the counter setter 62 increments the coordinate value k by one. More specifically, a target pixel is set to be the pixel to the right of the current pixel in the horizontal line (i).

In step S135, the counter setter 62 determines whether the coordinate value k is equal to or greater than a maximum value in the x axis, i.e., whether a relationship $k \geq ROW$ holds. If it is determined in step S135 that the relationship $k \geq ROW$ does not hold, the horizontal line (i) still has a pixel that is to be determined as to whether the pixel is the one in the black area. Processing returns to step S132 to repeat step S132 and subsequent steps.

If it is determined in step S135 that the relationship $k \geq ROW$ holds, the determination of all pixels in the horizontal line (i) as to whether each pixel is in the black area or not is completed. Processing proceeds to step S136.

In step S136, the counter setter 62 decrements the coordinate value k by one. Processing proceeds to step S133. In step S133, the left coordinate position detector 64 outputs the coordinate value $k=ROW-1$. In this case, the pixels in the horizontal line (i) are all in the black area.

In this way, the left coordinate position detector 64 determines the pixels in the horizontal line (i), starting with the left side of the screen, as to whether each pixel is in the black area or in the effective area. The left coordinate position detector 64 thus detects a left-end pixel in the effective area.

In step S134, the coordinate value k is incremented by one. The target pixel to be processed is shifted to a pixel by one pixel to the right in the horizontal line (i). The incremental step may be any number of pixels. For example, the coordinate value k may be incremented by three. In this case, the determination process is performed every three pixels. The amount of computation involved is reduced.

Returning to FIG. 11, in step S105, the right coordinate position detector 65 compares the pixel value of a pixel with the threshold value to determine whether the pixel is one in the black area. The right coordinate position detector 65 thus detects a coordinate position of a right-end pixel out of the pixels that are determined not to be one in the black area. More specifically, the right coordinate position detector 65 performs a right coordinate position detection process.

The right coordinate position detection process corresponding to step S105 is described below with reference to a flowchart of FIG. 13.

In step S151, the counter setter 62 initializes a counter m to $ROW-1$. The counter m takes any value from a coordinate value $ROW-1$ to a coordinate value 0 along the x axis of FIG. 10. The count of the counter m is hereinafter simply referred to as a variable "m."

In step S152, the right coordinate position detector 65 compares the pixel value $P(m)$ of the pixel at the coordinate value m in the x axis with the threshold value $C_{th}$ that is used to determine whether the pixel is in the effective area, thereby determining whether the relationship $P(m) > C_{th}$ holds. More specifically, the right coordinate position detector 65 determines whether the pixel value $P(m)$ of the pixel at the coordinate m is the pixel value of a pixel in the effective area.

More specifically, the right coordinate position detector 65 determines whether any of R (red), G (green) and B (blue) components of the pixel value is greater than the threshold value $C_{th}$ (for example, $C_{th}=25$).

If it is determined in step S152 that the relationship $P(m) > C_{th}$ holds, i.e., that the pixel value $P(m)$ of the pixel at the coordinate value m is the pixel value of a pixel in the effective area, processing proceeds to step S153.

In step S153, the right coordinate position detector 65 outputs the coordinate value m at which the relationship $P(m) > C_{th}$ holds, i.e., the pixel value $P(m)$ is the pixel value of a pixel in the effective area.

If it is determined in step S152 that the relationship $P(k) > C_{th}$ does not hold, i.e., that the pixel value $P(m)$ of the pixel at the coordinate value m is not the pixel value of a pixel in the effective area but the pixel value of a pixel in the black area, processing proceeds to step S154.

In step S154, the counter setter 62 decrements the coordinate value m by one. More specifically, a target pixel is set to be the pixel to the left of the current pixel in the horizontal line (i).

In step S155, the counter setter 62 determines whether the coordinate value m is smaller than a minimum value in the x axis, i.e., whether a relationship $m<0$ holds.

If it is determined in step S155 that the relationship $m<0$ does not hold, the horizontal line (i) still has a pixel that is to be determined as to whether the pixel is the one in the black area. Processing returns to step S152 to repeat step S152 and subsequent steps.

If it is determined in step S155 that the relationship $m<0$ holds, the determination of all pixels in the horizontal line (i) as to whether each pixel is in the black area or not is completed. Processing proceeds to step S156.

In step S156, the counter setter 62 increments the coordinate value m by one. Processing proceeds to step S153. In step S153, the right coordinate position detector 65 outputs the coordinate value $m=0$. In this case, the pixels in the horizontal line (i) are all in the black area.

In this way, the right coordinate position detector 65 determines the pixels in the horizontal line (i), starting with the right side of the screen, as to whether each pixel is in the black area or in the effective area. The right coordinate position detector 65 thus detects a right-end pixel in the effective area.

In step S154, the coordinate value m is decremented by one. The target pixel to be processed is shifted to a pixel by one pixel to the left in the horizontal line (i). The decremental step may be any number of pixels. For example, the coordinate value m may be decremented by three. In this case, the determination process is performed every three pixels. The amount of computation involved is reduced.

Returning FIG. 11, processing proceeds to step S106 subsequent to steps S104 and S105.

In step S106, the counter setter 62 increments the coordinate value i in the y axis by one. The target horizontal line (i) to be processed is downward shifted to the next line immediately therebelow.

In step S107, the counter setter 62 determines whether the coordinate value i is equal to or greater than a maximum value in the y axis, i.e., whether a relationship $i \geq COL$ holds.

If it is determined in step S107 that the relationship $i \geq COL$ does not hold, processing returns to step S103 to repeat step S103 and subsequent steps. More specifically, the effective area coordinate position determining unit 41 repeats the detection process of the left-end pixel in the effective area and the detection process of the right-end pixel in each of the horizontal lines from the top horizontal line (0) to the bottom horizontal line (COL−1).

If it is determined in step S107 that the relationship $i > COL$ holds, i.e., the bottom horizontal line is read, processing proceeds to step S108.

In step S108, the liner reader 63 reads a vertical line (j). In step S108 in a first cycle, the liner reader 63 reads a vertical line (0), namely, the leftmost vertical line on the screen. Subsequent to step S108, steps S109 and S110 are concurrently performed.

In step S109, the upper coordinate position detector 66 compares the pixel value of a pixel with a threshold value to determine whether the pixel is one in the black area. The upper coordinate position detector 66 thus detects the coordinate position of an upper-end pixel of the pixels that are determined not to be in the black area in the vertical line. The upper coordinate position detector 66 thus performs an upper coordinate position detection process.

The upper coordinate position detection process corresponding to step S109 is described below with reference to a flowchart of FIG. 14.

In step S171, the counter setter 62 initializes a counter r to zero. The counter r takes any value from a coordinate value 0 to a coordinate value COL−1 along the y axis of FIG. 10. The count of the counter r is hereinafter simply referred to as a variable "r."

In step S172, the upper coordinate position detector 66 compares the pixel value P(r) of the pixel at the coordinate value r in the y axis with the threshold value $C_{th}$ that is used to determine whether the pixel is in the effective area, thereby determining whether the relationship $P(r) > C_{th}$ holds. More specifically, the upper coordinate position detector 66 determines whether the pixel value P(r) of the pixel at the coordinate r is the pixel value of a pixel in the effective area.

More specifically, the upper coordinate position detector 66 determines whether any of R (red), G (green) and B (blue) components of the pixel value is greater than the threshold value $C_{th}$ (for example, $C_{th}=25$).

If it is determined in step S172 that the relationship $P(r) > C_{th}$ holds, i.e., that the pixel value P(r) of the pixel at the coordinate value r is the pixel value of a pixel in the effective area, processing proceeds to step S173.

In step S173, the upper coordinate position detector 66 outputs the coordinate value r at which the relationship $P(r) > C_{th}$ holds, i.e., the pixel value P(r) is the pixel value of a pixel in the effective area.

If it is determined in step S172 that the relationship $P(r) > C_{th}$ does not hold, i.e., that the pixel value P(r) of the pixel at the coordinate value r is not the pixel value of a pixel in the effective area but the pixel value of a pixel in the black area, processing proceeds to step S174.

In step S174, the counter setter 62 increments the coordinate value r by one. More specifically, a target pixel is set to be the pixel immediately below the current pixel in the vertical line (j).

In step S175, the counter setter 62 determines whether the coordinate value r is equal to or greater than a maximum value in the x axis, i.e., whether a relationship r≧COL holds.

If it is determined in step S175 that the relationship r≧COL does not hold, the vertical line (j) still has a pixel that is to be determined as to whether the pixel is the one in the black area. Processing returns to step S172 to repeat step S172 and subsequent steps.

If it is determined in step S175 that the relationship r>COL holds, the determination of all pixels in the vertical line (j) as to whether each pixel is in the black area or not is completed. Processing proceeds to step S176.

In step S176, the counter setter 62 decrements the coordinate value r by one. Processing proceeds to step S173. In step S173, the upper coordinate position detector 66 outputs the coordinate value r=COL−1. In this case, the pixels in the vertical line (j) are all in the black area.

In this way, the upper coordinate position detector 66 determines the pixels in the vertical line (j), starting with the upper side of the screen, as to whether each pixel is in the black area or in the effective area. The upper coordinate position detector 66 thus detects an upper-end pixel in the effective area.

In step S174, the coordinate value r is incremented by one. The target pixel to be processed is downward shifted to a pixel by one pixel in the vertical line (j). The incremental step may be any number of pixels. For example, the coordinate value k may be incremented by three. In this case, the determination process is performed every three pixels. The amount of computation involved is reduced.

Returning to FIG. 11, in step S110, the lower coordinate position detector 67 compares the pixel value of a pixel with the threshold value to determine whether the pixel is one in the black area. The lower coordinate position detector 67 thus detects a coordinate position of a lower-end pixel out of the pixels that are determined not to be one in the black area. More specifically, the lower coordinate position detector 67 performs a lower coordinate position detection process.

The lower coordinate position detection process corresponding to step S110 is described below with reference to a flowchart of FIG. 15.

In step S191, the counter setter 62 initializes a counter s to COL−1. The counter s takes any value from a coordinate value COL−1 to a coordinate value 0 along the y axis of FIG. 10. The count of the counter s is hereinafter simply referred to as a variable "s."

In step S192, the lower coordinate position detector 67 compares the pixel value P(s) of the pixel at the coordinate value s in the y axis with the threshold value $C_{th}$ that is used to determine whether the pixel is in the effective area, thereby determining whether the relationship $P(s) > C_{th}$ holds. More specifically, the lower coordinate position detector 67 determines whether the pixel value P(s) of the pixel at the coordinate s is the pixel value of a pixel in the effective area.

More specifically, the lower coordinate position detector 67 determines whether any of R (red), G (green) and B (blue) components of the pixel value is greater than the threshold value $C_{th}$ (for example, $C_{th}=25$).

If it is determined in step S192 that the relationship $P(s) > C_{th}$ holds, i.e., that the pixel value P(s) of the pixel at the coordinate value s is the pixel value of a pixel in the effective area, processing proceeds to step S193.

In step S193, the lower coordinate position detector 67 outputs the coordinate value at which the relationship $P(s) > C_{th}$ holds, i.e., the pixel value P(s) is the pixel value of a pixel in the effective area.

If it is determined in step S192 that the relationship $P(s) > C_{th}$ does not hold, i.e., that the pixel value P(s) of the pixel at the coordinate value s is not the pixel value of a pixel in the effective area but the pixel value of a pixel in the black area, processing proceeds to step S194.

In step S194, the counter setter 62 decrements the coordinate value s by one. More specifically, a target pixel is set to be the pixel immediately above the current pixel in the vertical line (j).

In step S195, the counter setter 62 determines whether the coordinate value s is smaller than a minimum value in the y axis, i.e., whether a relationship s<0 holds.

If it is determined in step S195 that the relationship s<0 does not hold, the vertical line (j) still has a pixel that is to be determined as to whether the pixel is the one in the black area. Processing returns to step S192 to repeat step S192 and subsequent steps.

If it is determined in step S195 that the relationship s<0 holds, the determination of all pixels in the vertical line (j) as to whether each pixel is in the black area or not is completed. Processing proceeds to step S196.

In step S196, the counter setter 62 increments the coordinate value s by one. Processing proceeds to step S193. In step S193, the lower coordinate position detector 67 outputs the coordinate value s=0. In this case, the pixels in the vertical line (j) are all in the black area.

In this way, the lower coordinate position detector 67 determines the pixels in the vertical line (j), starting with the lower side of the screen, as to whether each pixel is in the black area or in the effective area. The lower coordinate position detector 67 thus detects a lower-end pixel in the effective area.

In step S194, the coordinate value m is decremented by one. The target pixel to be processed is shifted upward to a pixel by one pixel in the vertical line (j). The decremental step may be any number of pixels. For example, the coordinate value s may be decremented by three. In this case, the determination process is performed every three pixels. The amount of computation involved is reduced.

Returning to FIG. 11, processing proceeds to step S111 subsequent to the completion of steps S109 and S110.

In step S111, the counter setter 62 increments the coordinate value j in the x axis by one. The target vertical line (j) to be processed is rightward shifted to the next line on the screen.

In step S112, the counter setter 62 determines whether the coordinate value j is equal to or greater than a maximum value in the x axis, i.e., whether a relationship J≧ROW holds.

If it is determined in step S112 that the relationship j≧ROW does not hold, processing returns to step S108 to repeat step S108 and subsequent steps. More specifically, the effective area coordinate position determining unit 41 repeats the detection process of the upper-end pixel in the effective area and the detection process of the lower-end pixel in each of the horizontal lines from the vertical line (0) to the vertical line (ROW−1).

If it is determined in step S112 that the relationship j≧ROW holds, i.e., the rightmost vertical line is read, and processing ends.

Figure 16:
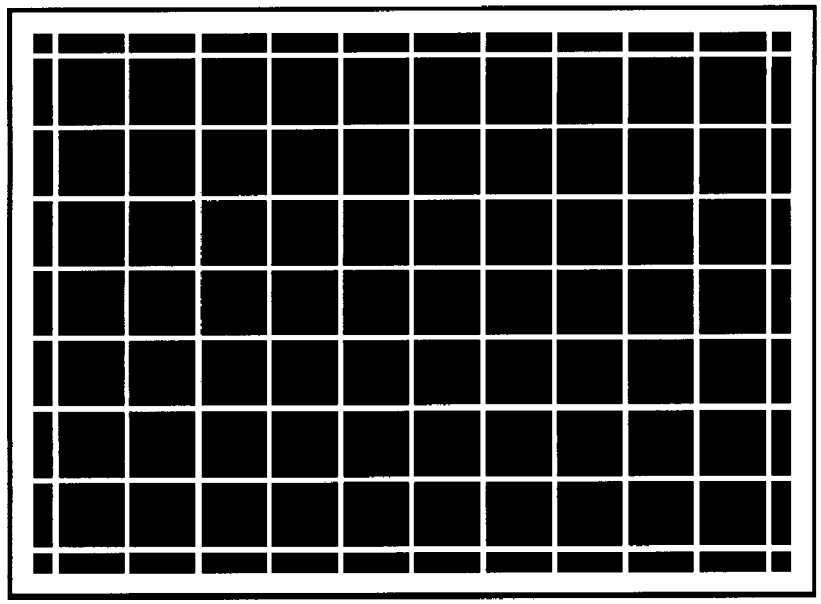
FIG. 16 illustrates an effective area detected in response to a cross-hatch signal.
Figure 17:
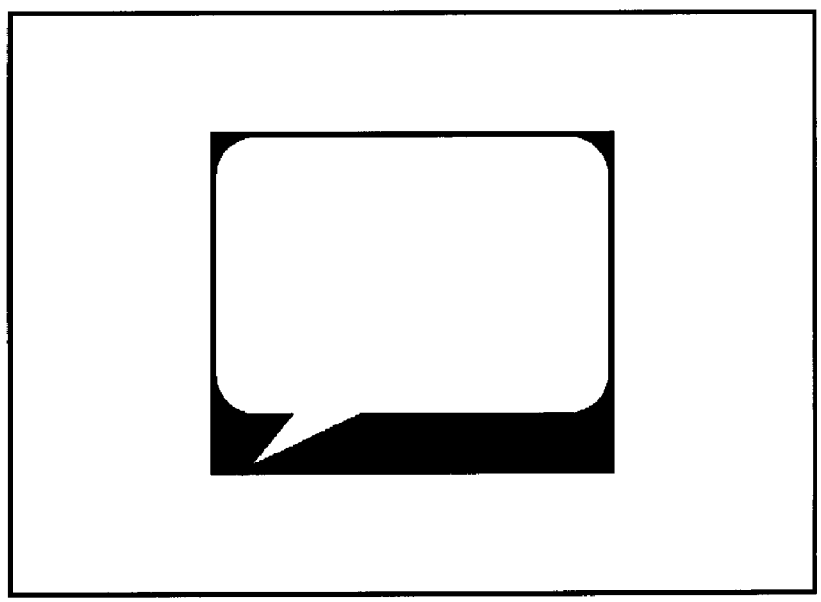
FIG. 17 illustrates a black band detected in response to a video signal containing an effective area in any shape.

The effective area detecting apparatus 1 thus detects accurately the effective area other than the black area in the image containing the black area as an ineffective area and the effective area in any shape. For example, the effective area detecting apparatus 1 accurately detects the edge portions of a cross-hatch image of FIG. 1 as shown in FIG. 16. The effective area detecting apparatus 1 also accurately detects the mouth portion of the balloon of FIG. 2 as shown in FIG. 17.

In the above discussion, the left coordinate position detection process in step S104 and the right coordinate position detection process in step S105 are performed in parallel. Alternatively, the left coordinate position detection process and the right coordinate position detection process may be performed serially with one process after the other. In this case, if the left coordinate position detection process reveals that all pixels in a predetermined horizontal line (i) are in the black area, the determination in the predetermined horizontal line (i) may be skipped in the right coordinate position detection process.

In the above discussion, the upper coordinate position detection process in step S109 and the lower coordinate position detection process in step S110 are performed in parallel. Alternatively, the upper coordinate position detection process and the lower coordinate position detection process may be performed serially with one process after the other. In this case, if the upper coordinate position detection process reveals that all pixels in a predetermined vertical line (j) are in the black area, the determination in the predetermined vertical line (j) may be skipped in the lower coordinate position detection process.

In step S106, the coordinate value i in the y axis is incremented by one, in other words, each of the horizontal lines i are processed one by one. The incremental step may be set to three. In this case, each of the left coordinate detection process and the right coordinate detection process may be performed every three horizontal lines. In step S111, the coordinate value j in the x axis is incremented by one. The incremental step may be set to three. In this case, each of the upper coordinate position detection process and the lower coordinate position detection process may be performed every three vertical lines. In this way, the amount of calculation involved is reduced.

The effective area coordinate position determining unit 41 determines the left coordinate position and the right coordinate position of the effective area in the horizontal line (i), and the upper coordinate position and the lower coordinate position in the vertical line (j). The in-frame coordinate position determining unit 12 thus determines coordinates of the effective area.

In the flowchart of FIG. 11, the horizontal line (i) is processed first. Alternatively, the vertical line (j) may be processed first. In the discussion that follows, the vertical line (j) is processed first.

Figure 18:
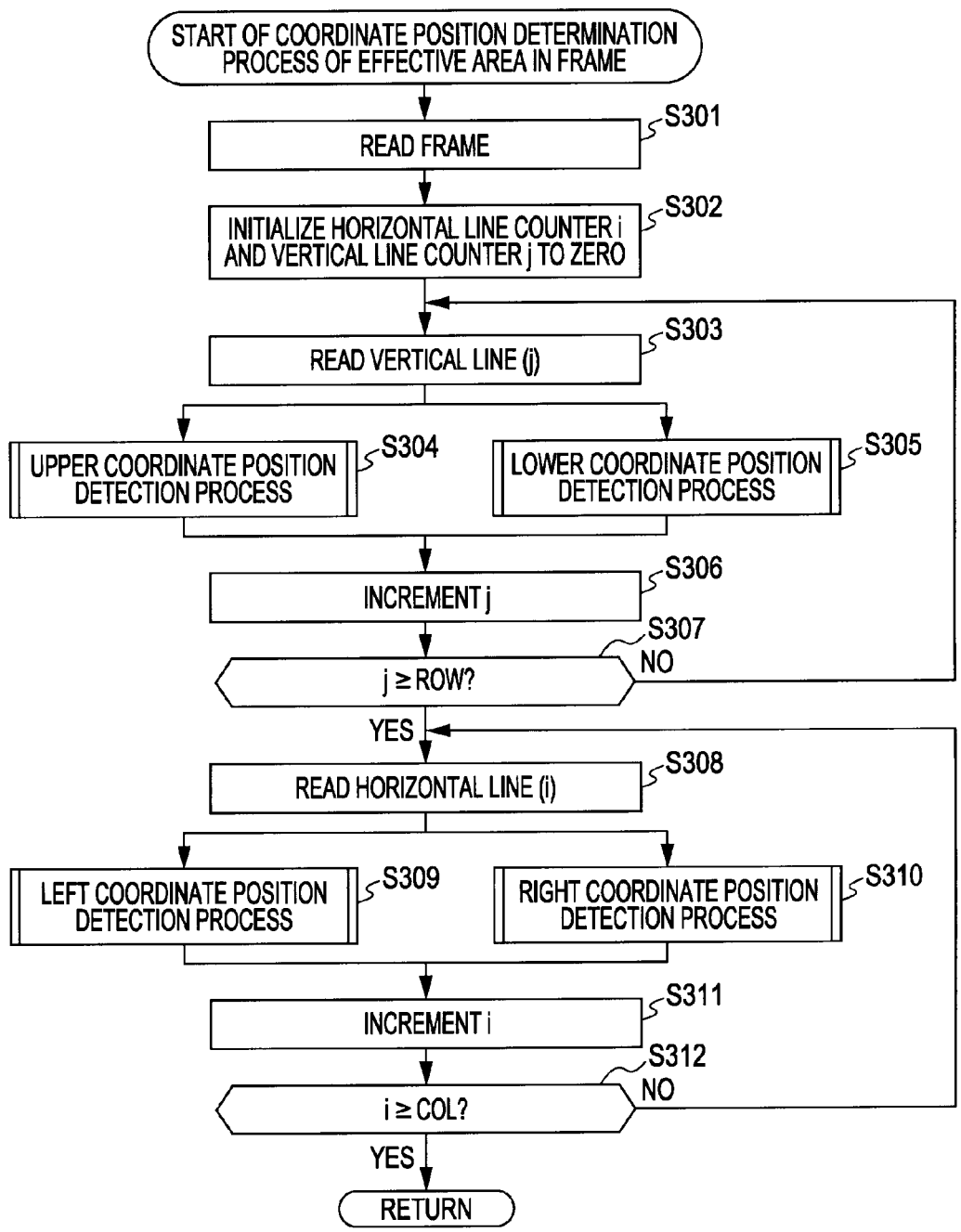
FIG. 18 is a flowchart illustrating another coordinate position determination process of determining a coordinate position in the effective area in a frame.

FIG. 18 is a flowchart illustrating another example of the in-frame effective area coordinate position determination process.

Steps S301 and S302 in the flowchart of FIG. 18 are respectively identical steps S101 and S102 in the flowchart of FIG. 11, and the discussion thereof is omitted herein. Steps S303 through S307 in the flowchart of FIG. 18 are respectively identical to steps S108 through S112 in the flowchart of FIG. 11, and the discussion thereof of omitted herein. Steps S308 through S312 in the flowchart of FIG. 18 are respectively identical to steps S103 through S107 of FIG. 11, and the discussion thereof is omitted herein.

The process shown in the flowchart of FIG. 18 is identical to the process shown in the flowchart of FIG. 11 if steps S108 through S112 are performed prior to steps S103 through S107 in FIG. 11.

In other words, the horizontal line (i) is processed first in the flowchart of FIG. 11 while the vertical line (j) is processed first in the flowchart of FIG. 18.

Another example of the in-frame effective area coordinate position determination process is described below.

In step S104 of FIG. 11, the left coordinate position detector 64 compares the pixel value of the pixel with the threshold value to determine whether the pixel is in the black area. The left coordinate position detector 64 may further compare an absolute difference between pixels of adjacent pixels with a predetermined threshold value in order to detect the coordinate position of a left-end pixel out of pixels that are determined not to be one in the black area. This process may also be performed in step S309 of FIG. 18.

A left coordinate position detection process corresponding to one of step S104 of FIG. 11 and step S309 of FIG. 18 is described below with reference to a flowchart of FIG. 19.

In step S331, the counter setter 62 initializes a counter k to zero. The counter k takes any value from a coordinate value 0 to a coordinate value ROW−1 along the x axis of FIG. 10. The count of the counter k is hereinafter simply referred to as a variable "k."

In step S332, the left coordinate position detector 64 compares the pixel value P(k) of the pixel at the coordinate value k in the x axis with the threshold value $C_{th1}$ that is used to determine whether the pixel is in the effective area, thereby determining whether the relationship $P(k)>C_{th1}$ holds. More specifically, the left coordinate position detector 64 determines whether the pixel value $P(k)$ of the pixel at the coordinate k is the pixel value of a pixel in the effective area.

More specifically, the left coordinate position detector 64 determines whether any of R (red), G (green) and B (blue) components of the pixel value is greater than the threshold value $C_{th1}$ (for example, $C_{th1}=40$).

If it is determined in step S332 that the relationship $P(k)>C_{th1}$ holds, i.e., that the pixel value $P(k)$ of the pixel at the coordinate value k is the pixel value of a pixel in the effective area, processing proceeds to step S333.

In step S333, the left coordinate position detector 64 outputs the coordinate value k at which the relationship $P(k)>C_{th1}$ holds, i.e., the pixel value $P(k)$ is the pixel value of a pixel in the effective area.

If it is determined in step S332 that the relationship $P(k)>C_{th1}$ does not hold, processing proceeds to step S334.

In step S334, the left coordinate position detector 64 compares a predetermined threshold value $C_{th2}$ with an absolute difference $|P(k)-P(k-1)|$ between pixel values of adjacent pixels in order to determine whether a relationship $|P(k)-P(k-1)|>C_{th2}$ holds.

More specifically, the left coordinate position detector 64 determines whether any of R (red), G (green) and B (blue) components of the absolute difference between the pixel values of the adjacent pixels is greater than the threshold value $C_{th2}$ (for example, $C_{th2}=10$).

If it is determined in step S334 that the relationship $|P(k)-P(k-1)|>C_{th2}$ holds, processing proceeds to step S333. The left coordinate position detector 64 outputs the coordinate value k at which the relationship $|P(k)-P(k-1)>C_{th2}$ holds.

If it is determined in step S334 that the relationship $|P(k)-P(k-1)|>C_{th2}$ does not hold, processing proceeds to step S335.

Figure 12:
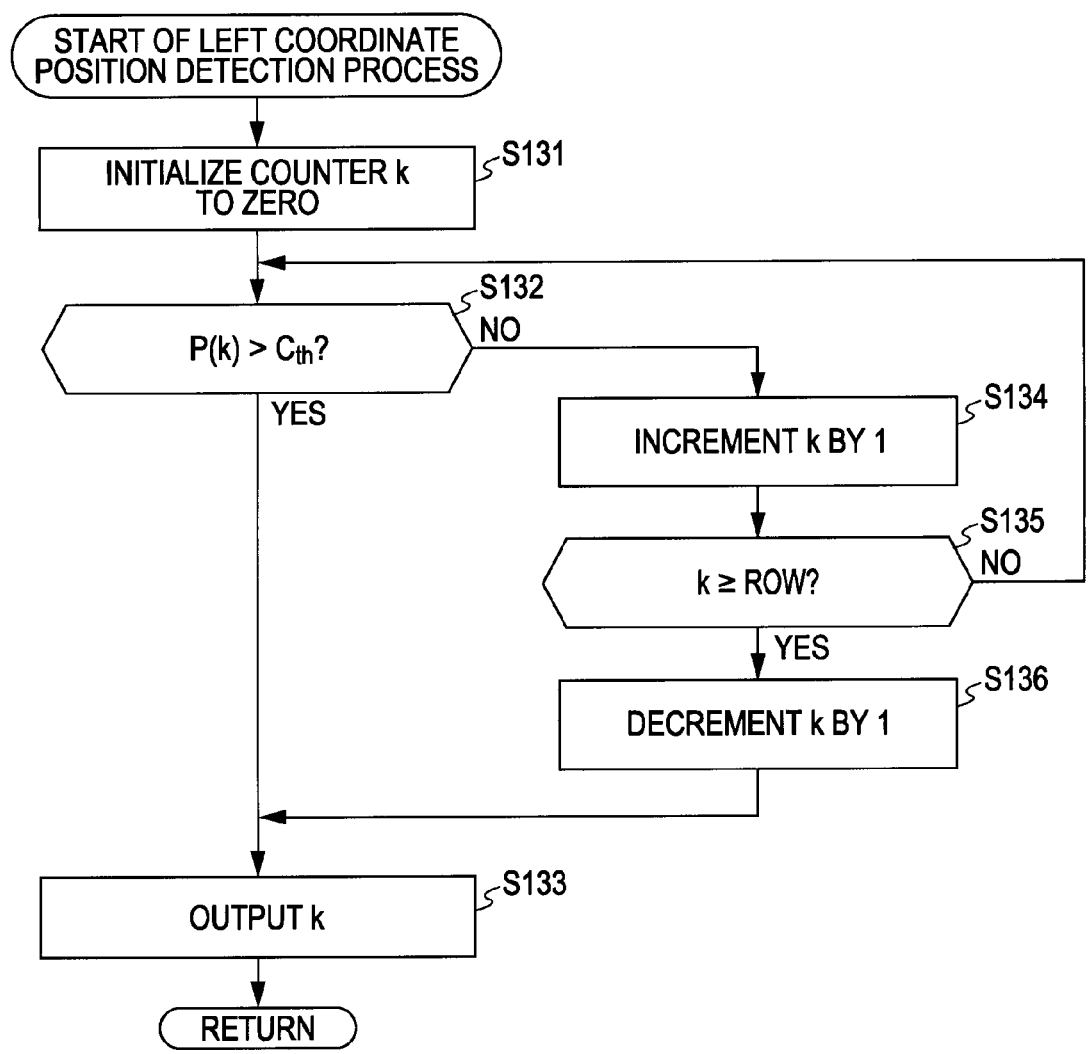
FIG. 12 is a flowchart illustrating in detail a left coordinate position detection process.
Figure 19:
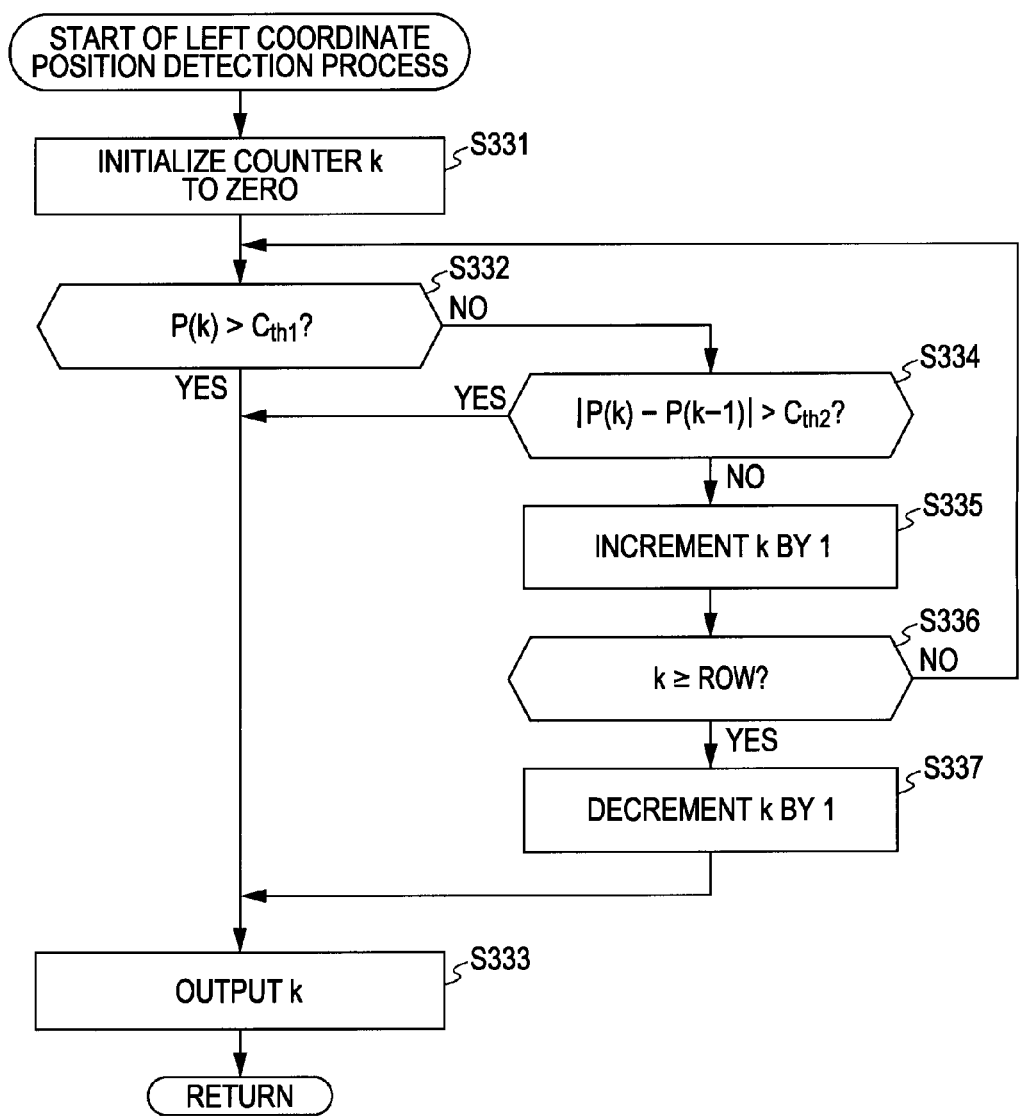
FIG. 19 is a flowchart illustrating in detail another left coordinate position detection process.

Steps S335 through S337 in the flowchart of FIG. 19 are respectively identical to steps S134 through S136 in the flowchart of FIG. 12, and the discussion thereof is omitted herein.

The left coordinate position detector 64 detects the position of the left-end pixel in the effective area by determining the pixels in the horizontal line (i) from the left side of the screen as to whether the pixel is in the black area or the effective area. The threshold value $C_{th1}$ is set to be greater than the threshold value $C_{th}$. The left coordinate position detector 64 compares the predetermined threshold value with the absolute difference between the pixel values of the adjacent pixels. Even if the pixel value of the pixel is greater than the threshold value $C_{th}$ due to the effect of noise, the left coordinate position detector 64 is prevented from erroneously detecting that pixel as a pixel in the effective area.

Similarly, in step S105 of FIG. 11, the left coordinate position detector 64 may compare the pixel value of the pixel with the threshold value to determine whether the pixel is one in the black area and compare the predetermined threshold value with the absolute difference between the pixel values of the adjacent pixels. The right coordinate position detector 65 may thus detect the coordinate position of the right-end pixel out of the pixels that are determined not to be in the black area. This process may also be performed in step S310 of FIG. 18.

A right coordinate position detection process corresponding to one of step S105 of FIG. 11 and step S310 of FIG. 18 is described in detail below with reference to a flowchart of FIG. 20.

In step S351, the counter setter 62 initializes a counter m to 0. The counter m takes any value from a coordinate value ROW−1 to a coordinate value 0 along the x axis of FIG. 10. The count of the counter m is hereinafter simply referred to as a variable "m."

In step S352, the right coordinate position detector 65 compares the pixel value $P(m)$ of the pixel at the coordinate value m in the x axis with the threshold value $C_{th1}$ that is used to determine whether the pixel is in the effective area, thereby determining whether the relationship $P(m)>C_{th1}$ holds. More specifically, the right coordinate position detector 65 determines whether the pixel value $P(m)$ of the pixel at the coordinate m is the pixel value of a pixel in the effective area.

More specifically, the right coordinate position detector 65 determines whether any of R (red), G (green) and B (blue) components of the pixel value is greater than the threshold value $C_{th1}$ (for example, $C_{th1}=40$).

If it is determined in step S352 that the relationship $P(m)>C_{th1}$ holds, i.e., that the pixel value $P(m)$ of the pixel at the coordinate value m is the pixel value of a pixel in the effective area, processing proceeds to step S353.

In step S353, the right coordinate position detector 65 outputs the coordinate value m at which the relationship $P(m)>C_{th1}$ holds, i.e., the pixel value $P(m)$ is the pixel value of a pixel in the effective area.

If it is determined in step S352 that the relationship $P(k)>C_{th}$ does not hold, processing proceeds to step S354.

In step S354, the right coordinate position detector 65 compares a predetermined threshold value $C_{th2}$ with an absolute difference $|P(m)-P(m+1)|$ between pixel values of adjacent pixels in order to determine whether a relationship $|P(m)-P(m+1)|>C_{th2}$ holds.

More specifically, the left coordinate position detector 64 determines whether any of R (red), G (green) and B (blue) components of the absolute difference between the pixel values of the adjacent pixels is greater than the threshold value $C_{th2}$ (for example, $C_{th2}=10$).

If it is determined in step S354 that the relationship $|P(m)-P(m+1)|>C_{th2}$ holds, processing proceeds to step S353. The right coordinate position detector 65 outputs the coordinate value m at which the relationship $|P(m)-P(m+1)|>C_{th2}$ holds.

If it is determined in step S354 that the relationship $|P(m)-P(m+1)|>C_{th2}$ does not hold, processing proceeds to step S355.

Figure 13:
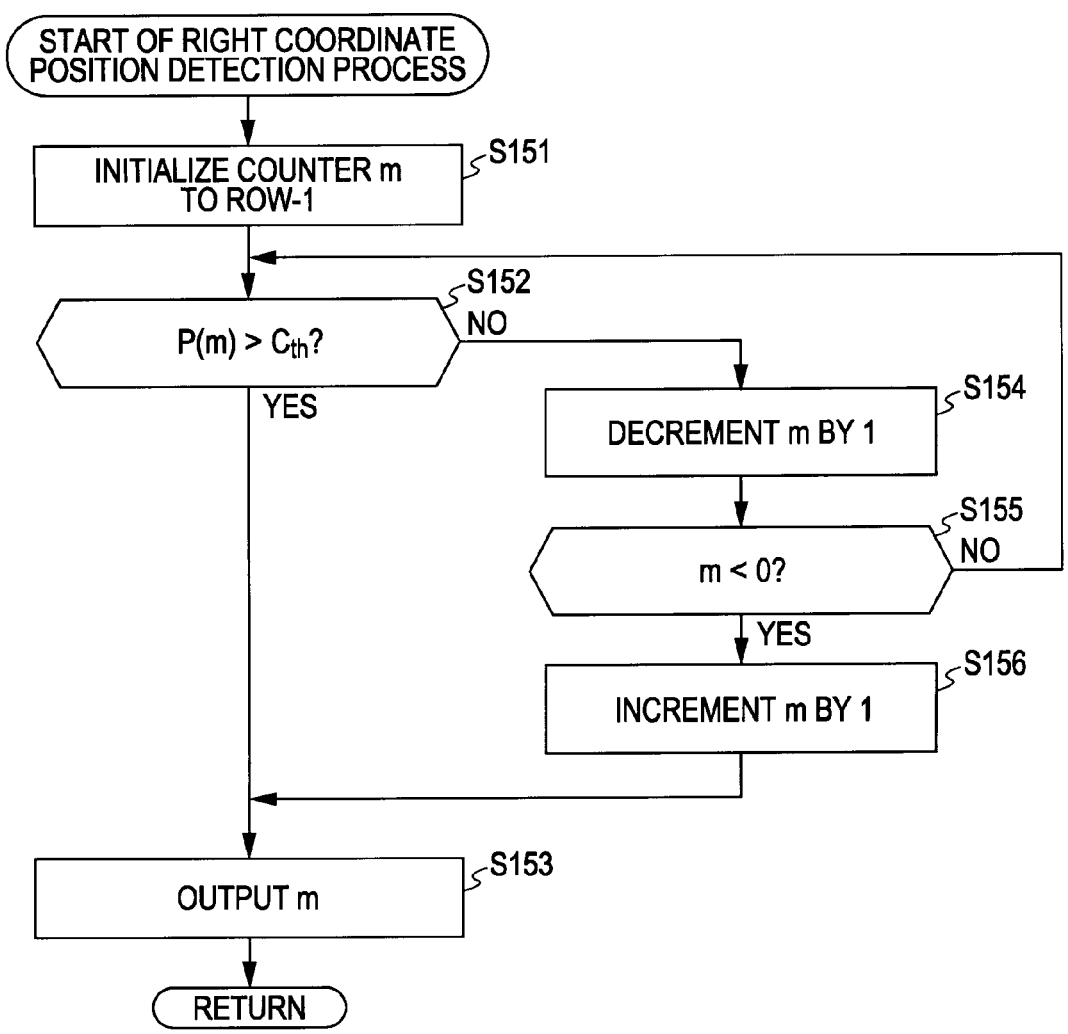
FIG. 13 is a flowchart illustrating in detail a right coordinate position detection process.
Figure 20:
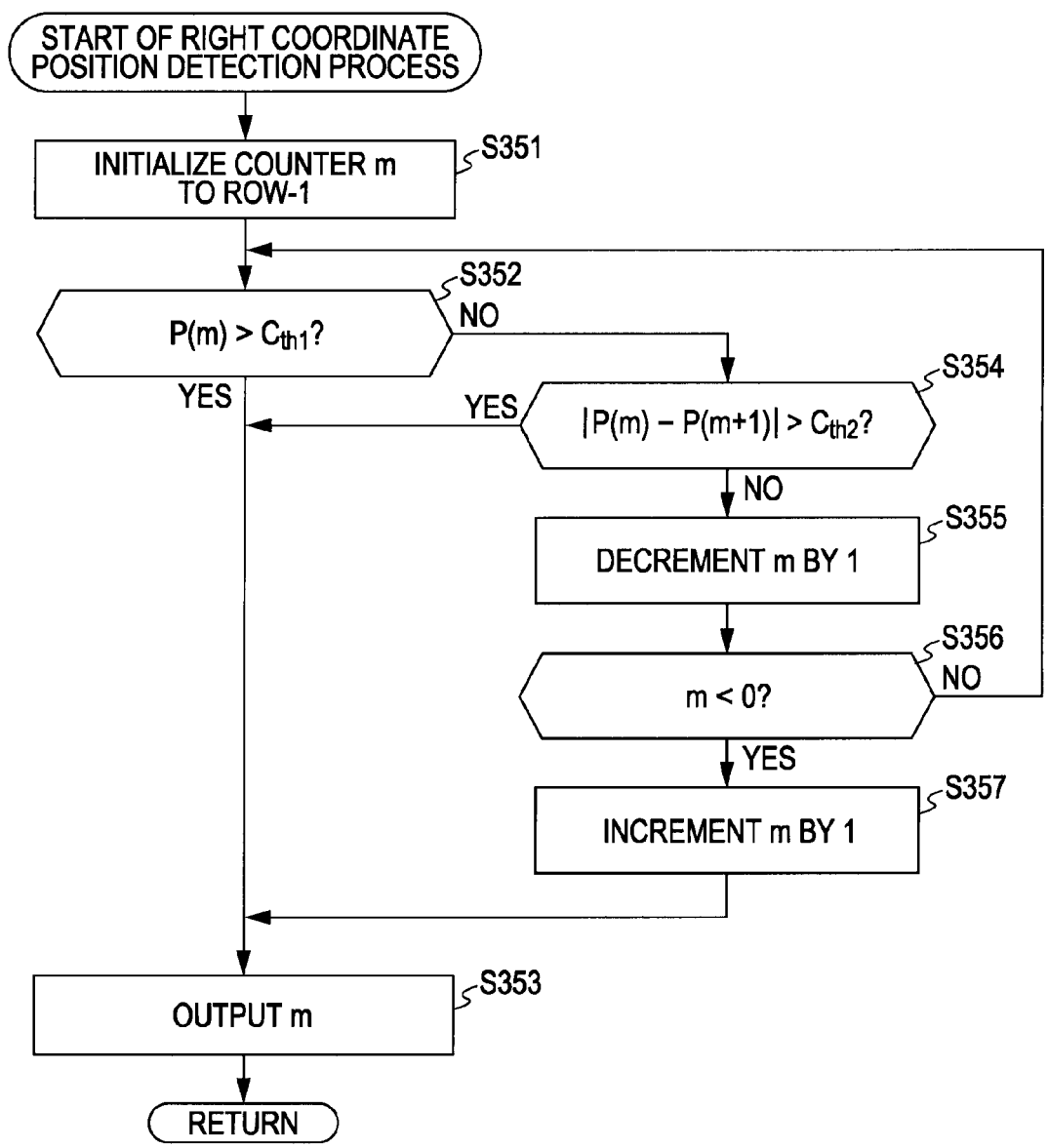
FIG. 20 is a flowchart illustrating in detail another right coordinate position detection process.

Steps S355 through S357 in the flowchart of FIG. 20 are respectively identical to steps S154 through S156 in the flowchart of FIG. 13, and the discussion thereof is omitted herein.

The right coordinate position detector 65 detects the position of the right-end pixel in the effective area by determining the pixels in the horizontal line (i) from the right side of the screen as to whether the pixel is in the black area or the effective area. The threshold value $C_{th1}$ is set to be greater than the threshold value $C_{th}$. The right coordinate position detector 65 compares the predetermined threshold value with the absolute difference between the pixel values of the adjacent pixels. Even if the pixel value of the pixel is greater than the threshold value $C_{th}$ due to the effect of noise, the right coordinate position detector 65 is prevented from erroneously detecting that pixel as a pixel in the effective area.

Similarly, in step S109 of FIG. 11, the upper coordinate position detector 66 may compare the pixel value of the pixel with the threshold value to determine whether the pixel is one in the black area and compare the predetermined threshold value with the absolute difference between the pixel values of the adjacent pixels. The upper coordinate position detector 66 may thus detect the coordinate position of the upper-end pixel out of the pixels that are determined not to be in the black area. This process may also be performed in step S304 of FIG. 18.

An upper coordinate position detection process corresponding to one of step S109 of FIG. 11 and step S304 of FIG. 18 is described in detail below with reference to a flowchart of FIG. 21.

In step S371, the counter setter 62 initializes a counter r to zero. The counter r takes any value from a coordinate value 0 to a coordinate value COL−1 along the y axis of FIG. 10. The count of the counter r is hereinafter simply referred to as a variable "r."

In step S372, the upper coordinate position detector 66 compares the pixel value P(r) of the pixel at the coordinate value r in the y axis with the threshold value $C_{th1}$ that is used to determine whether the pixel is in the effective area, thereby determining whether the relationship $P(r) > C_{th1}$ holds. More specifically, the upper coordinate position detector 66 determines whether the pixel value P(r) of the pixel at the coordinate r is the pixel value of a pixel in the effective area.

More specifically, the upper coordinate position detector 66 determines whether any of R (red), G (green) and B (blue) components of the pixel value is greater than the threshold value $C_{th1}$ (for example, $C_{th1}=40$).

If it is determined in step S372 that the relationship $P(r) > C_{th1}$ holds, i.e., that the pixel value P(r) of the pixel at the coordinate value r is the pixel value of a pixel in the effective area, processing proceeds to step S373.

In step S373, the upper coordinate position detector 66 outputs the coordinate value r at which the relationship $P(r) > C_{th1}$ holds, i.e., the pixel value P(r) is the pixel value of a pixel in the effective area.

If it is determined in step S372 that the relationship $P(r) > C_{th1}$ does not hold, processing proceeds to step S374.

In step S374, the upper coordinate position detector 66 compares a predetermined threshold value $C_{th2}$ with an absolute difference |P(r)−P(r−1)| between pixel values of adjacent pixels in order to determine whether a relationship $|P(r)-P(r-1)| > C_{th2}$ holds.

More specifically, the upper coordinate position detector 66 determines whether any of R (red), G (green) and B (blue) components of the absolute difference between the pixel values of the adjacent pixels is greater than the threshold value $C_{th2}$ (for example, $C_{th2}=10$).

If it is determined in step S374 that the relationship $|P(r)-P(r-1)| > C_{th2}$ holds, processing proceeds to step S373. The upper coordinate position detector 66 outputs the coordinate value r at which the relationship $|P(r)-P(r-1)| > C_{th2}$ holds.

If it is determined in step S374 that the relationship $|P(r)-P(r-1)| > C_{th2}$ does not hold, processing proceeds to step S375.

Figure 14:
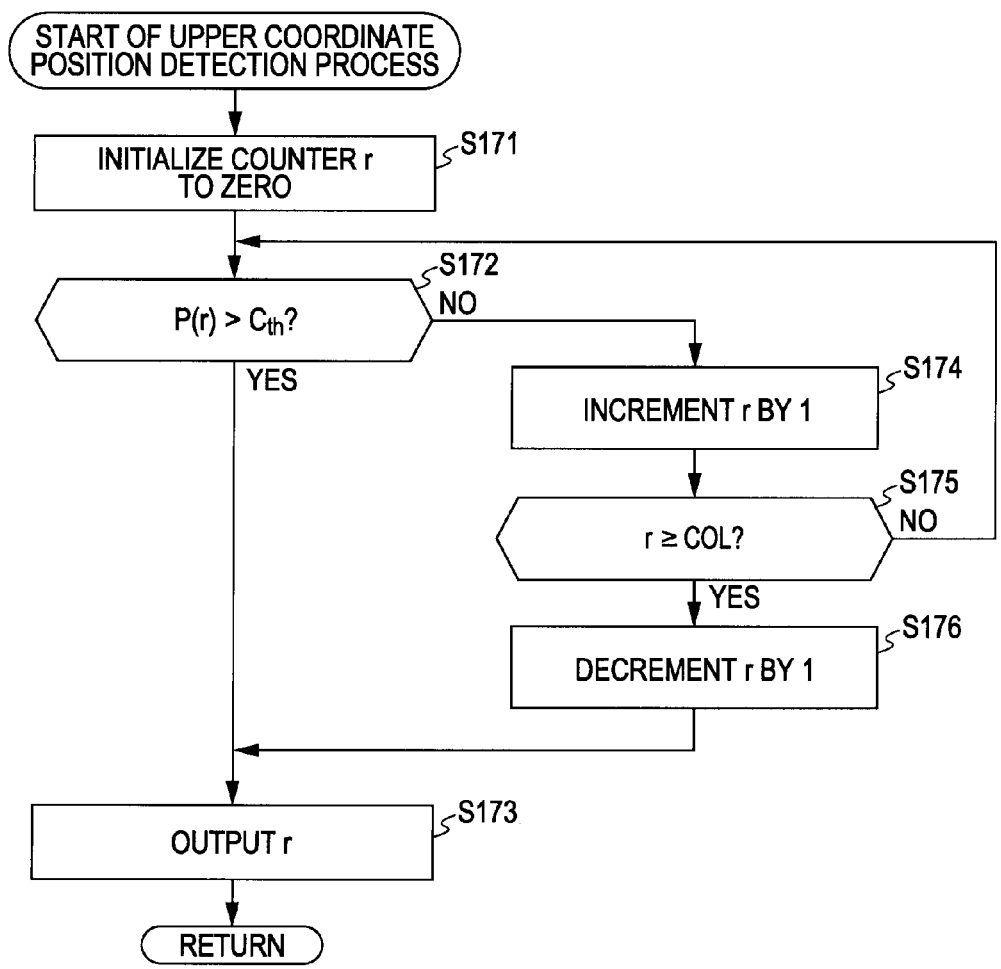
FIG. 14 is a flowchart illustrating in detail an upper coordinate position detection process.
Figure 21:
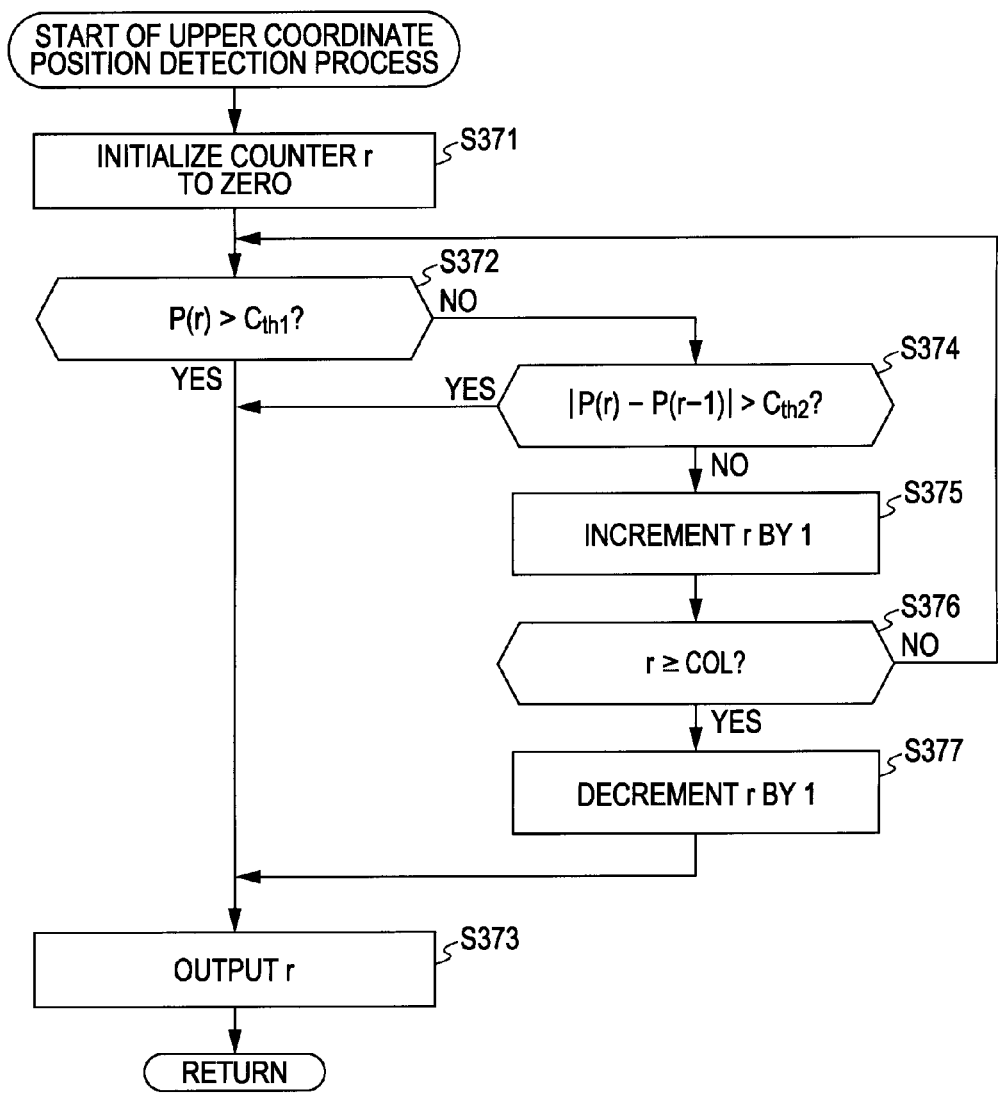
FIG. 21 is a flowchart illustrating in detail another upper coordinate position detection process.

Steps S375 through S377 in the flowchart of FIG. 21 are respectively identical to steps S174 through S176 in the flowchart of FIG. 14, and the discussion thereof is omitted herein.

The upper coordinate position detector 66 detects the position of the upper-end pixel in the effective area by determining the pixels in the vertical line (j) from the upper side of the screen as to whether the pixel is in the black area or the effective area. The threshold value $C_{th1}$ is set to be greater than the threshold value $C_{th}$. The upper coordinate position detector 66 compares the predetermined threshold value with the absolute difference between the pixel values of the adjacent pixels. Even if the pixel value of the pixel is greater than the threshold value $C_{th}$ due to the effect of noise, the upper coordinate position detector 66 is prevented from erroneously detecting that pixel as a pixel in the effective area.

Similarly, in step S110 of FIG. 11, the lower coordinate position detector 67 may compare the pixel value of the pixel with the threshold value to determine whether the pixel is one in the black area and compare the predetermined threshold value with the absolute difference between the pixel values of the adjacent pixels. The lower coordinate position detector 67 may thus detect the coordinate position of the lower-end pixel out of the pixels that are determined not to be in the black area. This process may also be performed in step S305 of FIG. 18.

A lower coordinate position detection process corresponding to one of step S110 of FIG. 11 and step S305 of FIG. 18 is described in detail below with reference to a flowchart of FIG. 22.

In step S391, the counter setter 62 initializes a counter s to zero. The counter s takes any value from a coordinate value COL−1 to a coordinate value 0 along the y axis of FIG. 10. The count of the counter s is hereinafter simply referred to as a variable "s."

In step S392, the lower coordinate position detector 67 compares the pixel value P(s) of the pixel at the coordinate value s in the y axis with the threshold value $C_{th1}$ that is used to determine whether the pixel is in the effective area, thereby determining whether the relationship $P(s) > C_{th1}$ holds. More specifically, the lower coordinate position detector 67 determines whether the pixel value P(s) of the pixel at the coordinate s is the pixel value of a pixel in the effective area.

More specifically, the lower coordinate position detector 67 determines whether any of R (red), G (green) and B (blue) components of the pixel value is greater than the threshold value $C_{th1}$ (for example, $C_{th1}=40$).

If it is determined in step S392 that the relationship $P(s) > C_{th1}$ holds, i.e., that the pixel value P(s) of the pixel at the coordinate value s is the pixel value of a pixel in the effective area, processing proceeds to step S393.

In step S393, the lower coordinate position detector 67 outputs the coordinate value s at which the relationship $P(s) > C_{th1}$ holds, i.e., the pixel value P(s) is the pixel value of a pixel in the effective area.

If it is determined in step S392 that the relationship $P(s) > C_{th1}$ does not hold, processing proceeds to step S394.

In step S394, the lower coordinate position detector 67 compares a predetermined threshold value $C_{th2}$ with an absolute difference |P(s)−P(s+1)| between pixel values of adjacent pixels in order to determine whether a relationship $|P(s)-P(s+1)| > C_{th2}$ holds.

More specifically, the lower coordinate position detector 67 determines whether any of R (red), G (green) and B (blue) components of the absolute difference between the pixel values of the adjacent pixels is greater than the threshold value $C_{th2}$ (for example, $C_{th2}=10$).

If it is determined in step S394 that the relationship $|P(s)-P(s+1)| > C_{th2}$ holds, processing proceeds to step S393. The lower coordinate position detector 67 outputs the coordinate value s at which the relationship $|P(s)-P(s+1)| > C_{th2}$ holds.

If it is determined in step S394 that the relationship $|P(s)-P(s+1)| > C_{th2}$ does not hold, processing proceeds to step S395.

Figure 15:
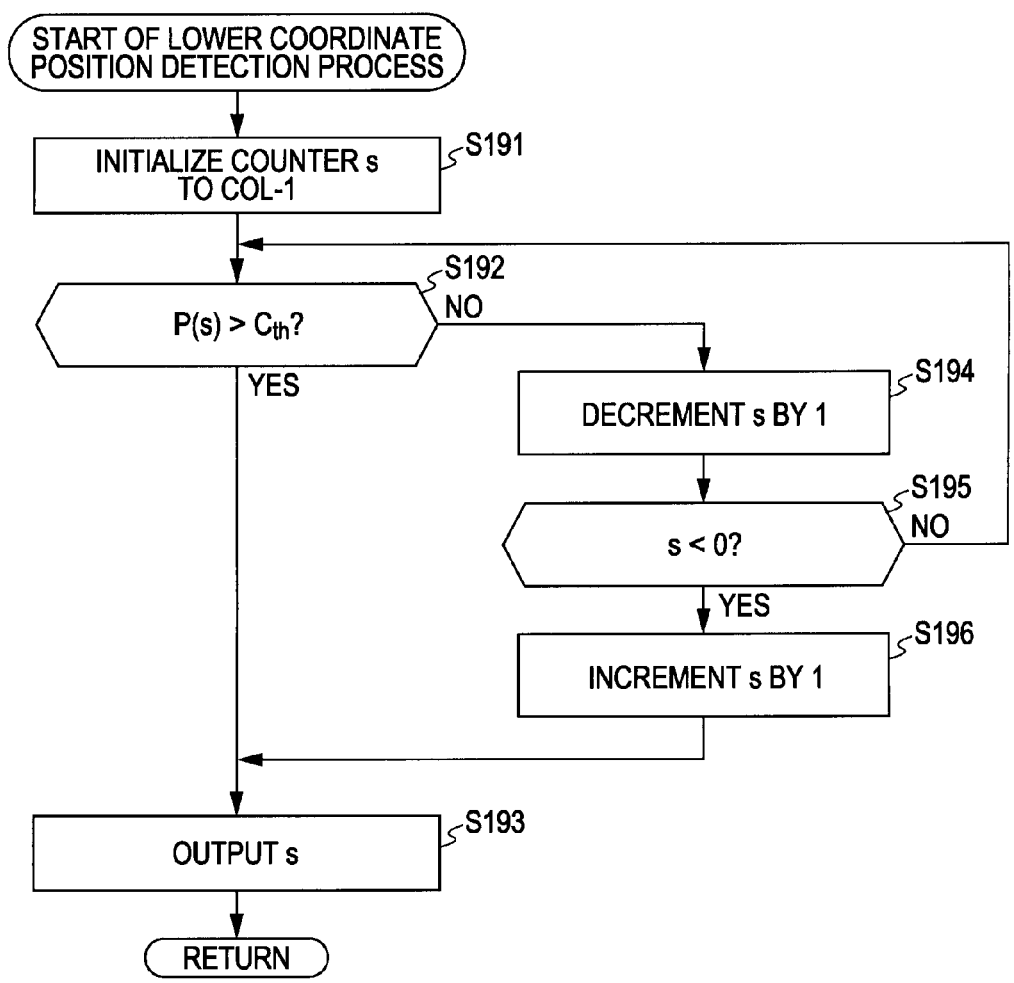
FIG. 15 is a flowchart illustrating in detail a lower coordinate position detection process.
Figure 22:
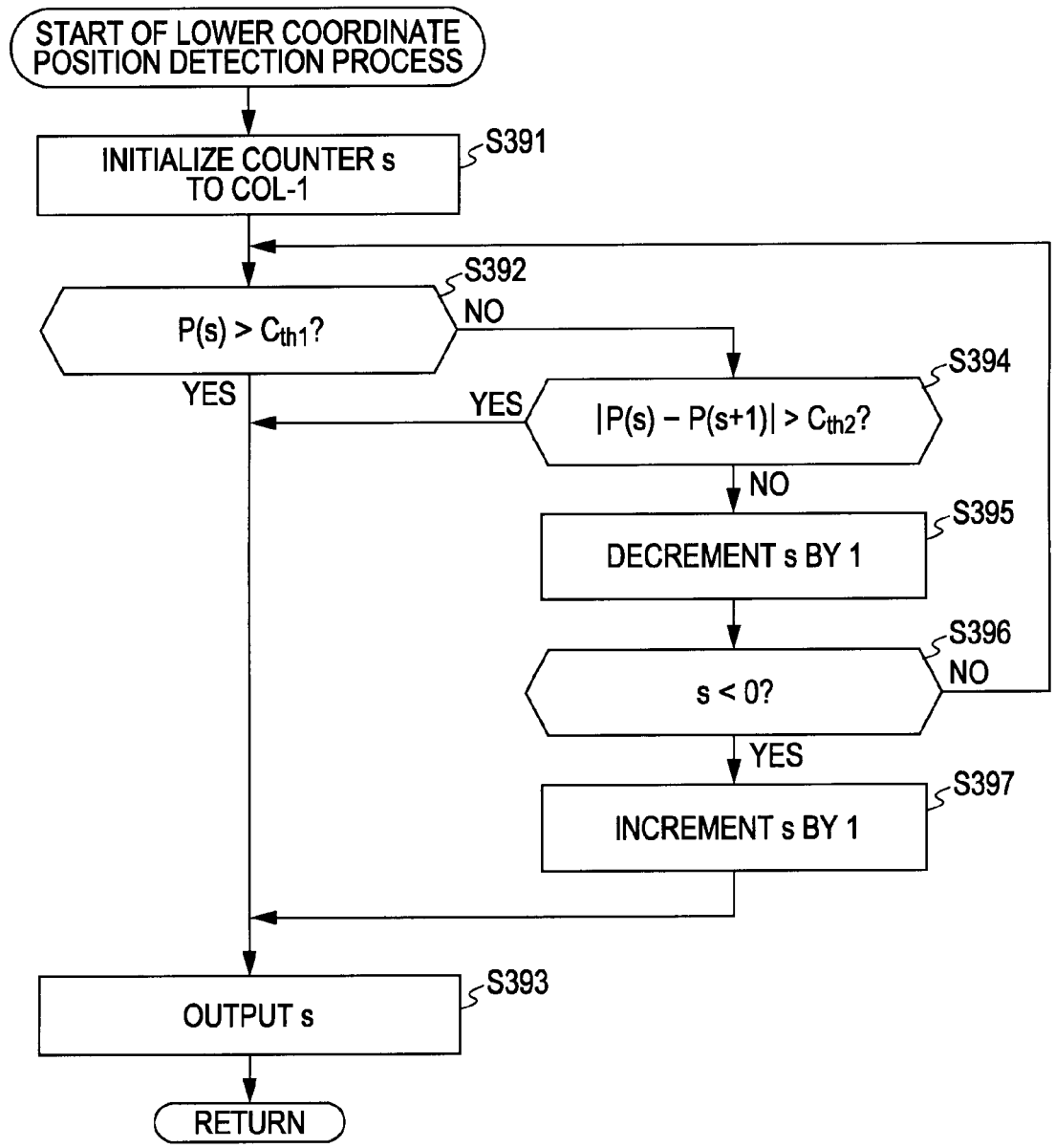
FIG. 22 is a flowchart illustrating in detail another lower coordinate position detection process.

Steps S395 through S397 in the flowchart of FIG. 22 are respectively identical to steps S194 through S196 in the flowchart of FIG. 15, and the discussion thereof is omitted herein.

The lower coordinate position detector 67 detects the position of the lower-end pixel in the effective area by determining the pixels in the vertical line (j) from the lower side of the screen as to whether the pixel is in the black area or the effective area. The threshold value $C_{th1}$ is set to be greater than the threshold value $C_{th}$. The lower coordinate position detector 67 compares the predetermined threshold value with the absolute difference between the pixel values of the adjacent pixels. Even if the pixel value of the pixel is greater than the threshold value $C_{th}$ due to the effect of noise, the lower coordinate position detector 67 is prevented from erroneously detecting that pixel as a pixel in the effective area.

In flowcharts of FIGS. 11 and 18, the horizontal line (i) and the vertical line (j) are processed serially with one process after the other. Alternatively, the horizontal line (i) and the vertical line (j) may be processed in parallel. Such a parallel process is described below.

Figure 23:
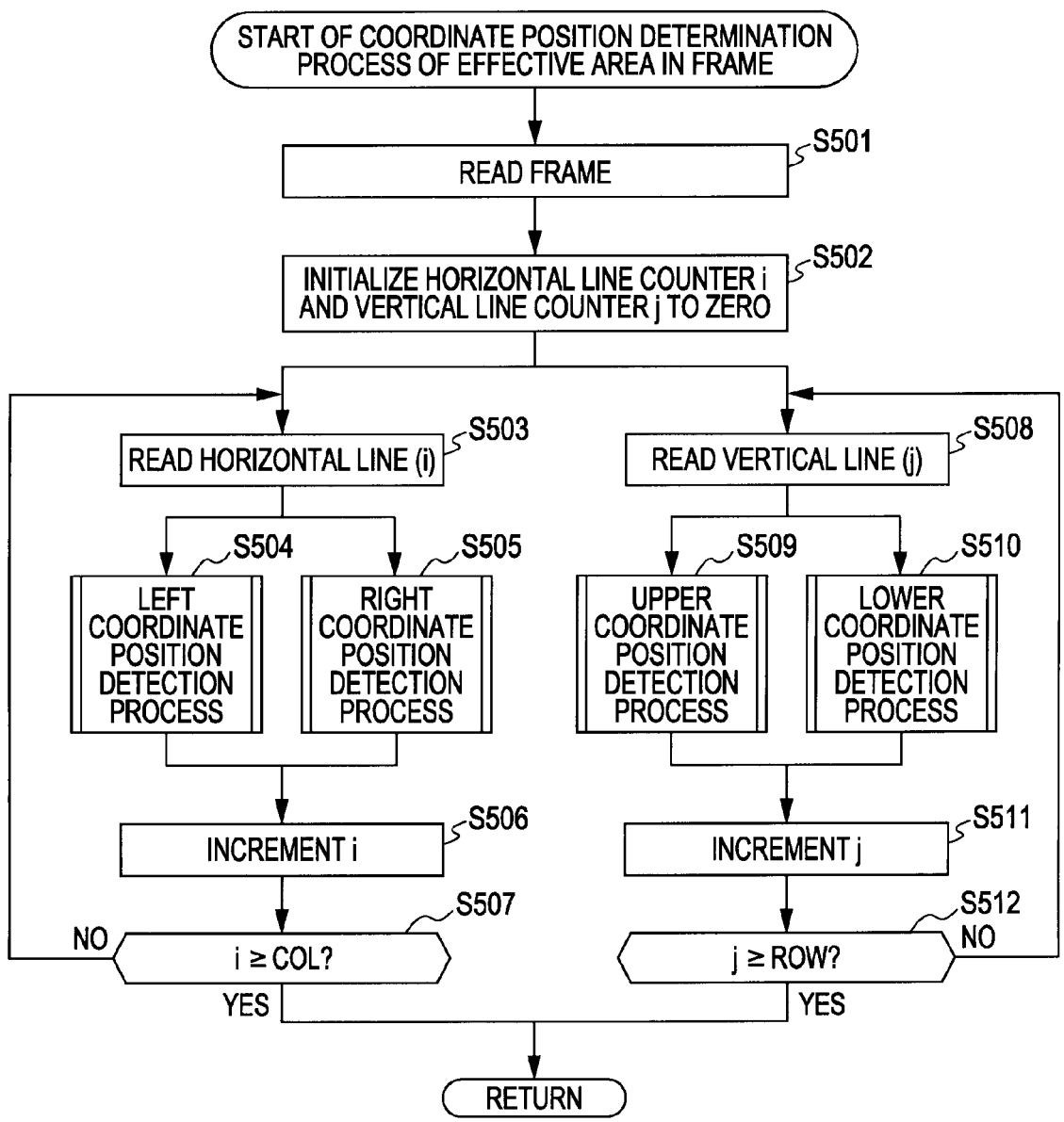
FIG. 23 is a flowchart illustrating yet another coordinate position determination process of determining a coordinate position in the effective area in a frame.

FIG. 23 is a flowchart illustrating another in-frame effective area coordinate position determination process.

Steps S501 and S502 in the flowchart of FIG. 23 are respectively identical to steps S101 and S102 in the flowchart of FIG. 11, and the discussion thereof is omitted herein. Steps S503 through S507 in the flowchart of FIG. 23 are respectively identical to steps S103 through S107 in the flowchart of FIG. 11, and the discussion thereof is omitted herein. Steps S508 through S512 in the flowchart of FIG. 23 are respectively identical to steps S108 through S112 in the flowchart of FIG. 11, and the discussion thereof is omitted herein.

A process of steps S503 through S507 and a process of steps S508 through S512 are performed in parallel in the flowchart of FIG. 23 while the process of steps S103 through S107 and the process of steps S108 through S112 are performed serially with one after the other process in the flowchart of FIG. 11.

The processes performed in steps S504, S505, S509 and S510 in the flowchart of FIG. 23 are identical to those previously discussed with reference to the flowcharts of FIGS. 12-15 and 19-22 and the discussion thereof is omitted herein.

In the processes of the flowcharts of FIG. 11 and 18, the horizontal line (i) and the vertical line (j) are processed serially one after the other. Alternatively, the horizontal line (i) and the vertical line (j) may be processed in parallel as shown in the flowchart of FIG. 23.

The in-frame coordinate position determining unit 12 performs the coordinate position determination process of the effective area having any shape in the frame, thereby determining the coordinates of the effective area.

FIG. 24 is a block diagram illustrating another example of the in-frame coordinate position determining unit 12 in the effective area detecting apparatus 1 of FIG. 5.

The in-frame coordinate position determining unit 12 of FIG. 24 includes an effective area coordinate position determining unit 41 and a rectangular effective area coordinate position determination unit 101. The rectangular effective area coordinate position determination unit 101 determines the coordinate position of a rectangular effective area based on the coordinate position of the effective area supplied from the effective area coordinate position determining unit 41.

FIG. 25 is a block diagram of the rectangular effective area coordinate position determination unit 101.

The rectangular effective area coordinate position determination unit 101 includes a leftmost coordinate position determination unit 121, a rightmost coordinate position determination unit 122, an uppermost coordinate position determination unit 123, and a lowermost coordinate position determination unit 124.

The leftmost coordinate position determination unit 121 determines a position of the leftmost pixel from among the left-end pixels, each left-end pixel detected on a per horizontal line basis.

Figure 26:
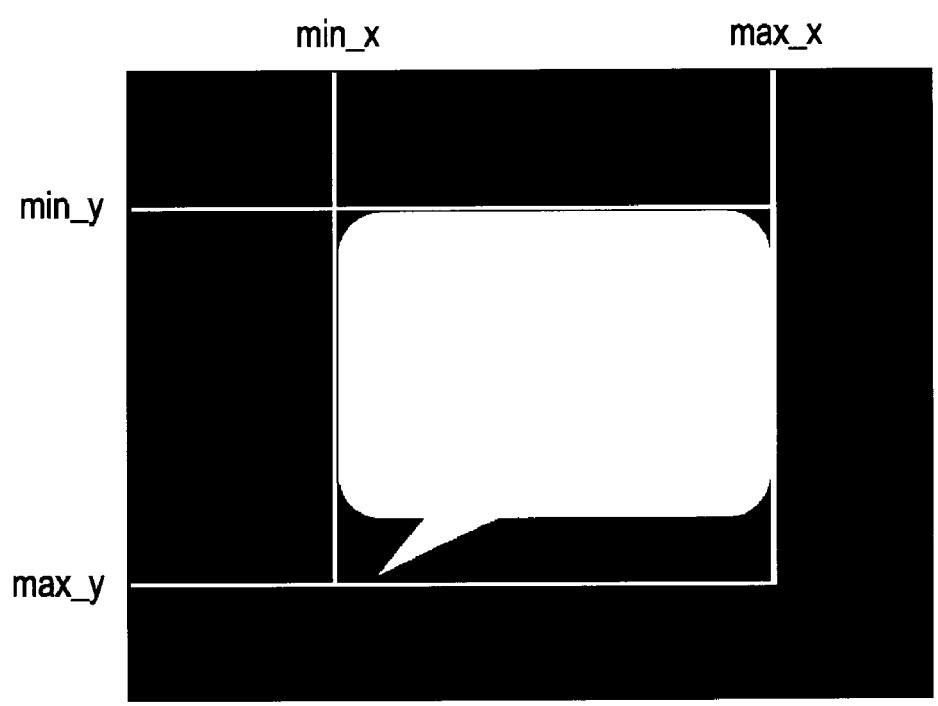
FIG. 26 illustrates a detection method of detecting a coordinate position in a rectangular effective area.

More specifically, the leftmost coordinate position determination unit 121 determines the position of the leftmost pixel, namely, a minimum coordinate value min_x in the x axis from among the left-end pixels, each left-end pixel detected on a per horizontal line (i) basis in the effective area of a speech balloon of FIG. 26.

The leftmost coordinate position determination unit 121 determines as the leftmost position the position of a second pixel from the leftmost pixel if a difference between the position of the leftmost pixel detected and the position of the second pixel from the leftmost pixel is greater than a predetermined threshold value.

The leftmost coordinate position determination unit 121 determines as the leftmost position the position of a third pixel from the leftmost pixel if a difference between the position of the thus determined leftmost pixel and the position of the third pixel from the leftmost pixel is greater than the predetermined threshold value. This operation is repeated until a difference of adjacent pixels becomes equal to or smaller than the predetermined threshold.

The rightmost coordinate position determination unit 122 determines a position of the rightmost pixel from the positions of the right-end pixels, each right-end pixel determined on a per horizontal line basis.

More specifically, the rightmost coordinate position determination unit 122 determines the position of the rightmost pixel, namely, a maximum coordinate value max_x in the x axis from among the right-end pixels, each right-end pixel detected on a per horizontal line (i) basis in the effective area of the speech balloon of FIG. 26.

The rightmost coordinate position determination unit 122 determines as the rightmost position a position of a second pixel from the rightmost pixel if a difference between the position of the rightmost pixel detected and the position of the second pixel from the rightmost pixel is greater than a predetermined threshold value.

The rightmost coordinate position determination unit 122 determines as the rightmost position a position of a third pixel from the leftmost pixel if a difference between the position of the thus determined rightmost pixel and the position of the third pixel from the rightmost pixel is greater than the predetermined threshold value. This operation is repeated until a difference between adjacent pixels becomes equal to or smaller than the predetermined threshold.

The uppermost coordinate position determination unit 123 determines the uppermost pixel from among the upper-end pixels, each upper-end pixel detected on a per vertical line basis.

More specifically, the uppermost coordinate position determination unit 123 determines the position of the uppermost pixel, namely, a minimum coordinate value min_y in the y axis from among the upper-end pixels, each upper-end pixel detected on a per vertical line (j) basis in the effective area of the speech balloon of FIG. 26.

The uppermost coordinate position determination unit 123 determines as the uppermost position a position of a second pixel from the uppermost position if a difference between the position of the uppermost pixel detected and the position of the second pixel from the uppermost pixel is greater than a predetermined threshold value.

The uppermost coordinate position determination unit 123 determines as the uppermost position a position of a third pixel from the uppermost pixel if a difference between the position of the uppermost pixel and the position of the third pixel from the uppermost pixel is greater than the predetermined threshold value. This operation is repeated until a difference between adjacent pixels becomes equal to or smaller than the predetermined threshold.

The lowermost coordinate position determination unit 124 determines a position of the lowermost pixel from the positions of the lower-end pixels, each lower-end pixel determined on a per vertical line basis.

More specifically, the lowermost coordinate position determination unit 124 determines the position of the lowermost pixel, namely, a maximum coordinate value max_y in the y axis from among the lower-end pixels, each lower-end pixel detected on a per vertical line (j) basis in the effective area of the speech balloon of FIG. 26.

The lowermost coordinate position determination unit 124 determines as the lowermost position a position of a second pixel from the lowermost pixel if a difference between the position of the lowermost pixel detected and the position of the second pixel from the lowermost pixel is greater than a predetermined threshold value.

The lowermost coordinate position determination unit 124 determines as the lowermost position a position of a third pixel from the lowermost pixel if a difference between the position of the thus detected lowermost pixel and the position of the third pixel from the lowermost pixel is greater than the predetermined threshold value. This operation is repeated until a difference between adjacent pixels becomes equal to or smaller than the predetermined threshold.

Figure 27:
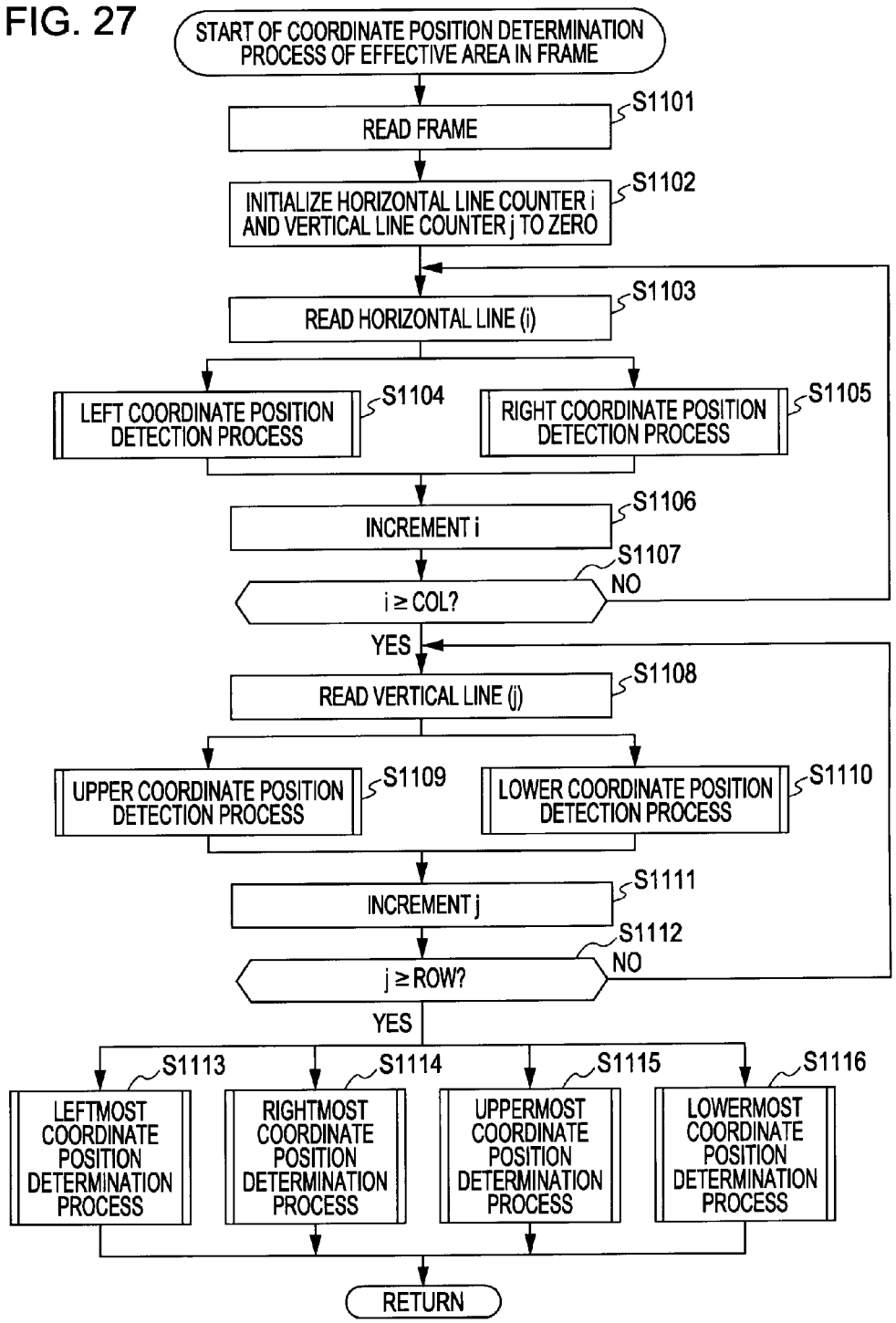
FIG. 27 is a flowchart illustrating still another coordinate position determination process of determining a coordinate position in the effective area in a frame.

FIG. 27 is a flowchart illustrating another in-frame effective area coordinate position determination process corresponding to step S2 in the flowchart of FIG. 7.

Steps S1101 through S1112 in the flowchart of FIG. 27 are respectively identical to steps S101 through S102 in the flowchart of FIG. 11, and the discussion thereof is omitted herein. Processes performed in steps S1104, S1105, S1109 and S1110 in the flowchart of FIG. 27 are identical to those previously discussed with reference to the flowcharts of FIG. 12 through 15 and FIGS. 19 through 22, and the discussion thereof is omitted herein.

At the completion of step S1112, the effective area coordinate position determining unit 41 has determined the left coordinate position and the right coordinate position of the effective area in the horizontal line (i) and the upper coordinate position and the lower coordinate position of the effective area in the vertical line (j). The effective area coordinate position determining unit 41 supplies the determined left and right coordinate positions of the effective area and the upper and lower coordinate positions of the effective area to the rectangular effective area coordinate position determination unit 101. Steps S1113 through S1116 are then performed in parallel.

In step S1113, the leftmost coordinate position determination unit 121 determines the leftmost position of the positions of the left-end pixels, each left-end pixel detected on a per horizontal line basis. In other words, the leftmost coordinate position determination unit 121 performs a leftmost coordinate position determination process.

Figure 28:
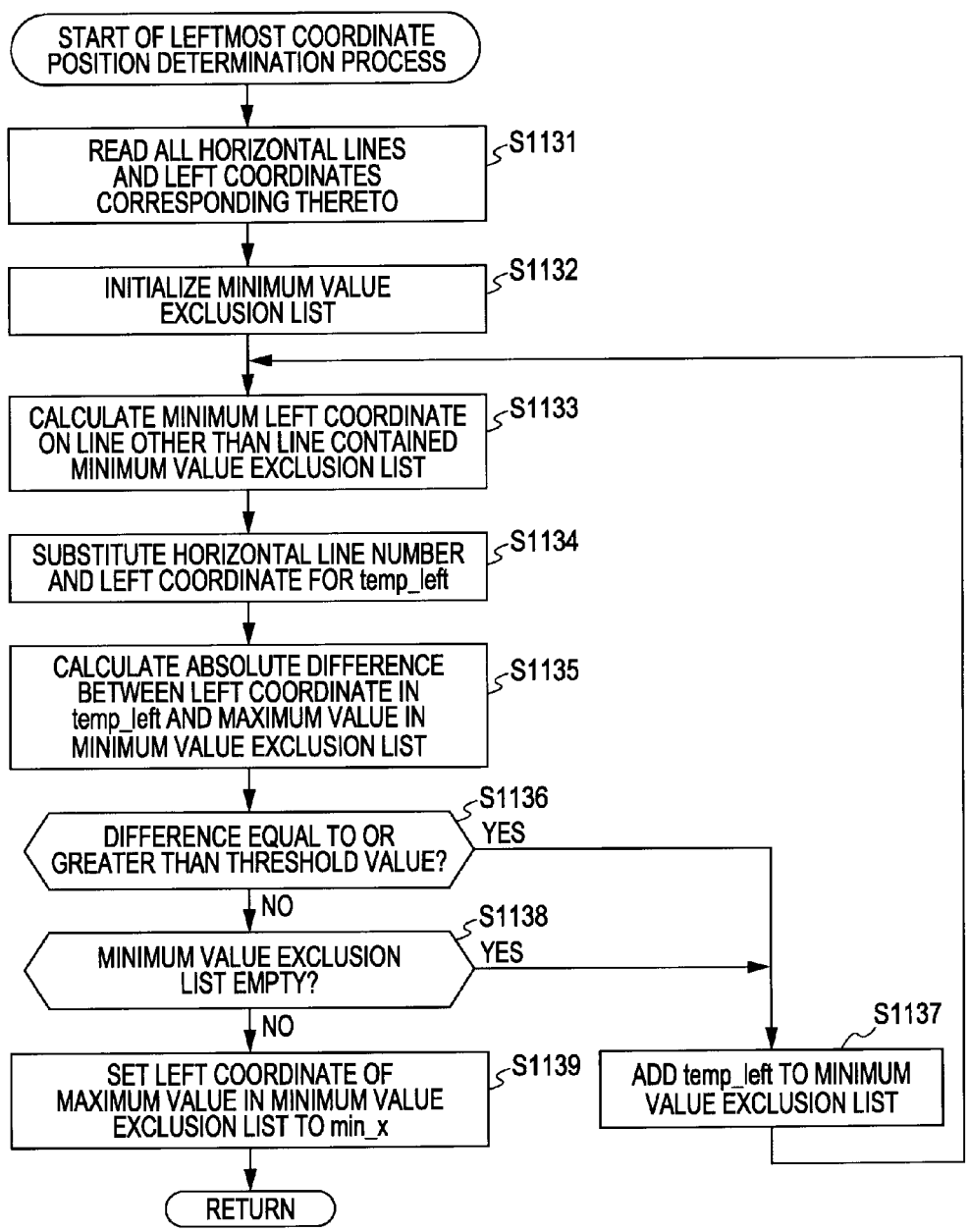
FIG. 28 is a flowchart illustrating in detail a leftmost coordinate position determination process.

The leftmost coordinate position determination process corresponding to step S1113 is described below with reference to a flowchart of FIG. 28.

In step S1131, the leftmost coordinate position determination unit 121 reads all horizontal lines (i) and left-end coordinates corresponding thereto supplied from the effective area coordinate position determining unit 41.

In step S1132, the leftmost coordinate position determination unit 121 initializes a minimum value exclusion list. The minimum value exclusion list, stored on the leftmost coordinate position determination unit 121, lists horizontal line numbers, namely, coordinate values i in the y axis in association with left-end coordinate positions in the order of magnitude from small to large.

In step S1133, the leftmost coordinate position determination unit 121 calculates a minimum left-end coordinate in a line not contained in the minimum value exclusion list.

In step S1134, the leftmost coordinate position determination unit 121 substitutes the calculated horizontal line number and left-end coordinate position for a predetermined variable temp_left. The predetermined variable temp_left temporarily contains the horizontal line number and the left-end coordinate position in association with each other.

In step S1135, the leftmost coordinate position determination unit 121 calculates an absolute difference between the left-end coordinate in the predetermined variable temp_left and a maximum value in the minimum value exclusion list. Since the minimum value exclusion list is initialized, the leftmost coordinate position determination unit 121 outputs the left-end coordinate in the predetermined variable temp_left as is in step S1135.

In step S1136, the leftmost coordinate position determination unit 121 compares the calculated absolute difference with a predetermined threshold value to determine whether the difference is equal to or greater than the threshold value.

If it is determined in step S1136 that the difference is equal to or greater than the threshold value, processing proceeds to step S1137.

In step S1137, the leftmost coordinate position determination unit 121 adds, to the minimum value exclusion list, the horizontal line number and the left coordinate in the predetermined variable temp_left. Processing returns to step S1133.

If it is determined in step S1136 that the difference is smaller than the threshold value, processing proceeds to step S1138.

In step S1138, the leftmost coordinate position determination unit 121 determines whether the minimum value exclusion list is empty.

If it is determined in step S1138 that the minimum value exclusion list is empty, processing proceeds to step S1137.

If it is determined in step S1138 that the minimum value exclusion list is not empty, processing proceeds to step S1139.

In step S1139, the leftmost coordinate position determination unit 121 sets the maximum value of left-end coordinates in the minimum value exclusion list as a minimum coordinate value min_x. Processing thus ends.

The leftmost coordinate position determination unit 121 compares the minimum left-end coordinate value with the next minimum left-end coordinate value using the minimum value exclusion list, thereby determining the position of the leftmost pixel from the left-end pixels, each left-end pixel detected on a per horizontal line (i) basis.

Returning to FIG. 27, in step S1114, the rightmost coordinate position determination unit 122 determines the position of the rightmost pixel from the positions of right-end pixels, each right-end pixel detected on a per horizontal line (i) basis. In other words, the rightmost coordinate position determination unit 122 performs a rightmost coordinate position determination process.

Figure 29:
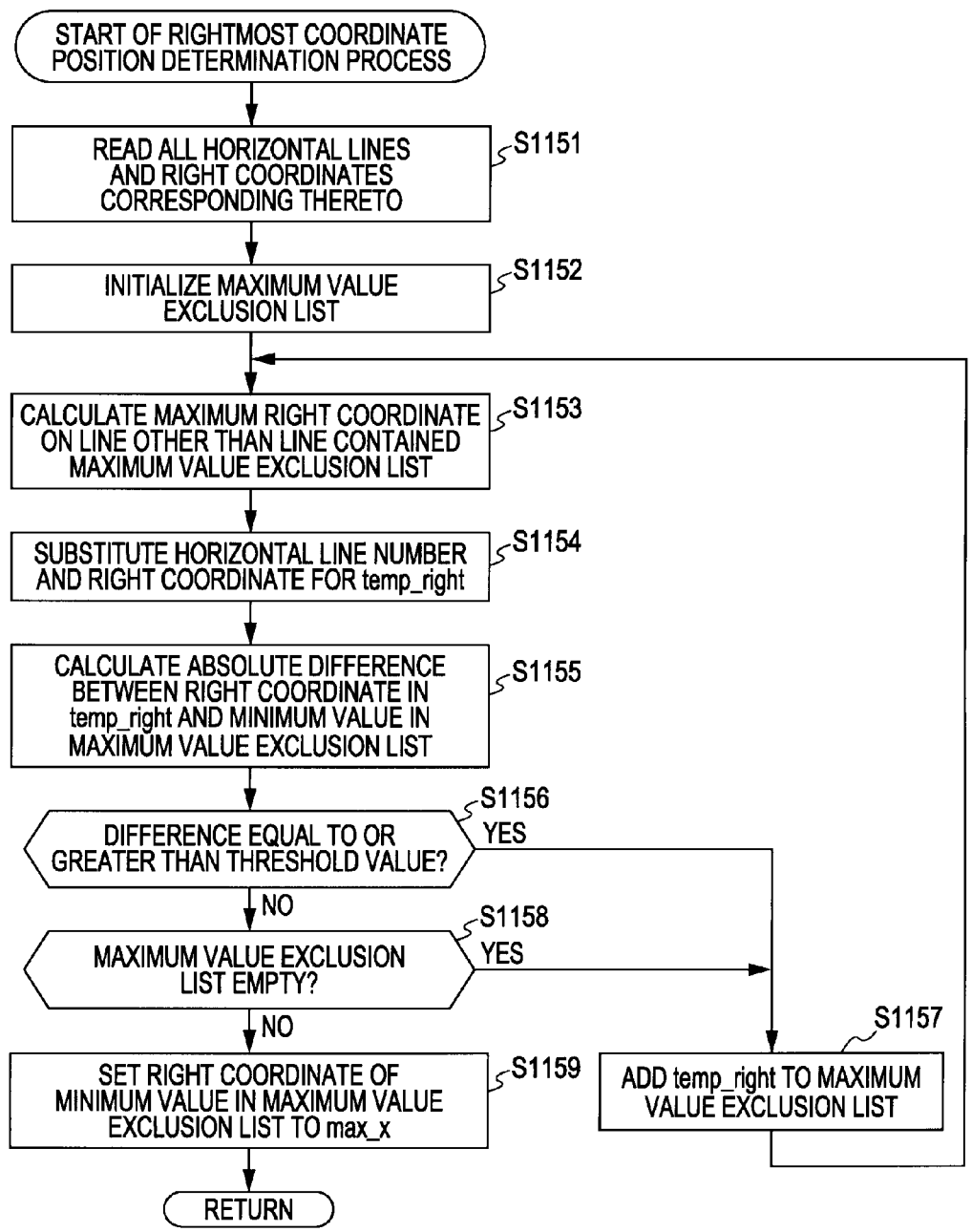
FIG. 29 is a flowchart illustrating in detail a rightmost coordinate position determination process.

The rightmost coordinate position determination process corresponding to step S1114 is described below with reference to a flowchart of FIG. 29.

In step S1151, the rightmost coordinate position determination unit 122 reads all horizontal lines (i) and right-end coordinates corresponding thereto supplied from the effective area coordinate position determining unit 41.

In step S1152, the rightmost coordinate position determination unit 122 initializes a maximum value exclusion list. The maximum value exclusion list, stored on the rightmost coordinate position determination unit 122, lists horizontal line numbers, namely, coordinate values i in the y axis in association with right-end coordinate positions in the order of magnitude from large to small.

In step S1153, the rightmost coordinate position determination unit 122 calculates a maximum right-end coordinate in a line not contained in the maximum value exclusion list.

In step S1154, the rightmost coordinate position determination unit 122 substitutes the calculated horizontal line number and right-end coordinate position for a predetermined variable temp_right. The predetermined variable temp_right temporarily contains the horizontal line number and the right-end coordinate position in association with each other.

In step S1155, the rightmost coordinate position determination unit 122 calculates an absolute difference between the right-end coordinate in the predetermined variable temp_right and a minimum value in the maximum value exclusion list. Since the maximum value exclusion list is initialized, the rightmost coordinate position determination unit 122 outputs the right-end coordinate in the predetermined variable temp_right as is in step S1155.

In step S1156, the rightmost coordinate position determination unit 122 compares the calculated absolute difference with a predetermined threshold value to determine whether the difference is equal to or greater than the threshold value.

If it is determined in step S1156 that the difference is equal to or greater than the threshold value, processing proceeds to step S1157.

In step S1157, the rightmost coordinate position determination unit 122 adds, to the maximum value exclusion list, the horizontal line number and the right coordinate in the predetermined variable temp_right. Processing returns to step S1153.

If it is determined in step S1156 that the difference is smaller than the threshold value, processing proceeds to step S1158.

In step S1158, the rightmost coordinate position determination unit 122 determines whether the maximum value exclusion list is empty.

If it is determined in step S1158 that the maximum value exclusion list is empty, processing proceeds to step S1157.

If it is determined in step S1158 that the maximum value exclusion list is not empty, processing proceeds to step S1159.

In step S1159, the rightmost coordinate position determination unit 122 sets the minimum value of right-end coordinates in the maximum value exclusion list as a maximum coordinate value max_x. Processing thus ends.

The rightmost coordinate position determination unit 122 compares the maximum right-end coordinate value with the next maximum right-end coordinate value using the maximum value exclusion list, thereby determining the position of the rightmost pixel from the right-end pixels, each right-end pixel detected on a per horizontal line (i) basis.

Returning to FIG. 27, in step S1115, the uppermost coordinate position determination unit 123 determines the position of the uppermost pixel from the positions of upper-end pixels, each upper-end pixel detected on a per vertical line (j) basis. In other words, the uppermost coordinate position determination unit 123 performs an uppermost coordinate position determination process.

Figure 30:
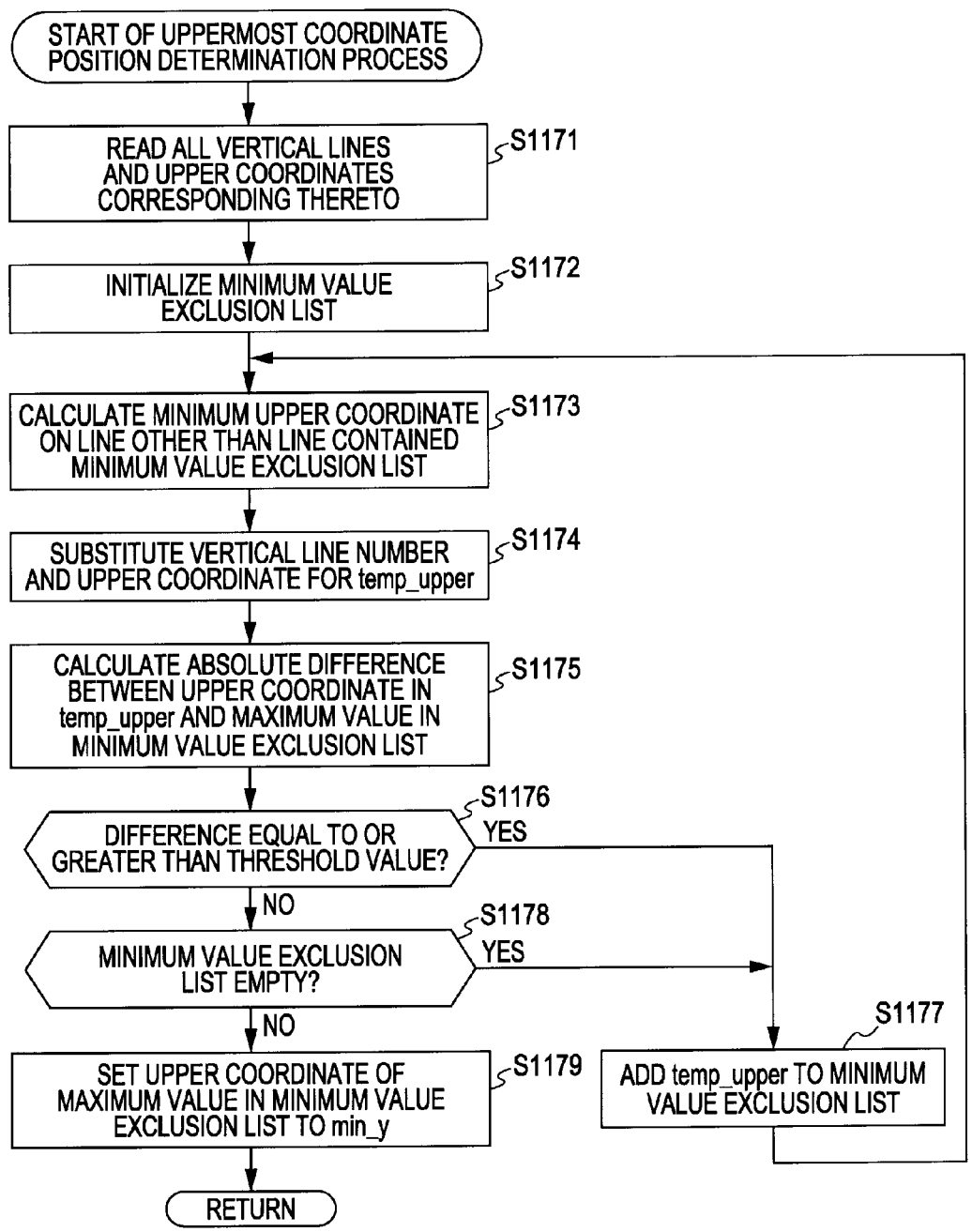
FIG. 30 is a flowchart illustrating in detail an uppermost coordinate position determination process.

The uppermost coordinate position determination process corresponding to step S1115 is described below with reference to a flowchart of FIG. 30.

In step S1171, the uppermost coordinate position determination unit 123 reads all vertical lines (j) and upper-end coordinates corresponding thereto supplied from the effective area coordinate position determining unit 41.

In step S1172, the uppermost coordinate position determination unit 123 initializes a minimum value exclusion list. The minimum value exclusion list, stored on the uppermost coordinate position determination unit 123, lists vertical line numbers, namely, coordinate values j in the x axis in association with upper-end coordinate positions in the order of magnitude from small to large.

In step S1173, the uppermost coordinate position determination unit 123 calculates a minimum upper-end coordinate in a line not contained in the minimum value exclusion list.

In step S1174, the uppermost coordinate position determination unit 123 substitutes the calculated vertical line number and upper-end coordinate position for a predetermined variable temp_upper. The predetermined variable temp_upper temporarily contains the vertical line number and the upper-end coordinate position in association with each other.

In step S1175, the uppermost coordinate position determination unit 123 calculates an absolute difference between the upper-end coordinate in the predetermined variable temp_upper and a maximum value in the minimum value exclusion list. Since the minimum value exclusion list is initialized, the uppermost coordinate position determination unit 123 outputs the upper-end coordinate in the predetermined variable temp_upper as is in step S1175.

In step S1176, the uppermost coordinate position determination unit 123 compares the calculated absolute difference with a predetermined threshold value to determine whether the difference is equal to or greater than the threshold value.

If it is determined in step S1176 that the difference is equal to or greater than the threshold value, processing proceeds to step S1177.

In step S1177, the uppermost coordinate position determination unit 123 adds, to the minimum value exclusion list, the vertical line number and the upper coordinate in the predetermined variable temp_upper. Processing returns to step S1173.

If it is determined in step S1176 that the difference is smaller than the threshold value, processing proceeds to step S1178.

In step S1178, the uppermost coordinate position determination unit 123 determines whether the minimum value exclusion list is empty.

If it is determined in step S1178 that the minimum value exclusion list is empty, processing proceeds to step S1177.

If it is determined in step S1178 that the minimum value exclusion list is not empty, processing proceeds to step S1179.

In step S1179, the uppermost coordinate position determination unit 123 sets the maximum value of upper-end coordinates in the minimum value exclusion list as a minimum coordinate value min_y in the y axis. Processing thus ends.

The uppermost coordinate position determination unit 123 compares the minimum upper-end coordinate value with the next minimum upper-end coordinate value using the minimum value exclusion list, thereby determining the position of the uppermost pixel from the upper-end pixels, each upper-end pixel detected on a per vertical line (j) basis.

Returning to FIG. 27, in step S1116, the lowermost coordinate position determination unit 124 determines the position of the uppermost pixel from the positions of upper-end pixels, each upper-end pixel detected on a per vertical line (j) basis. In other words, the lowermost coordinate position determination unit 124 performs a lowermost coordinate position determination process.

Figure 31:
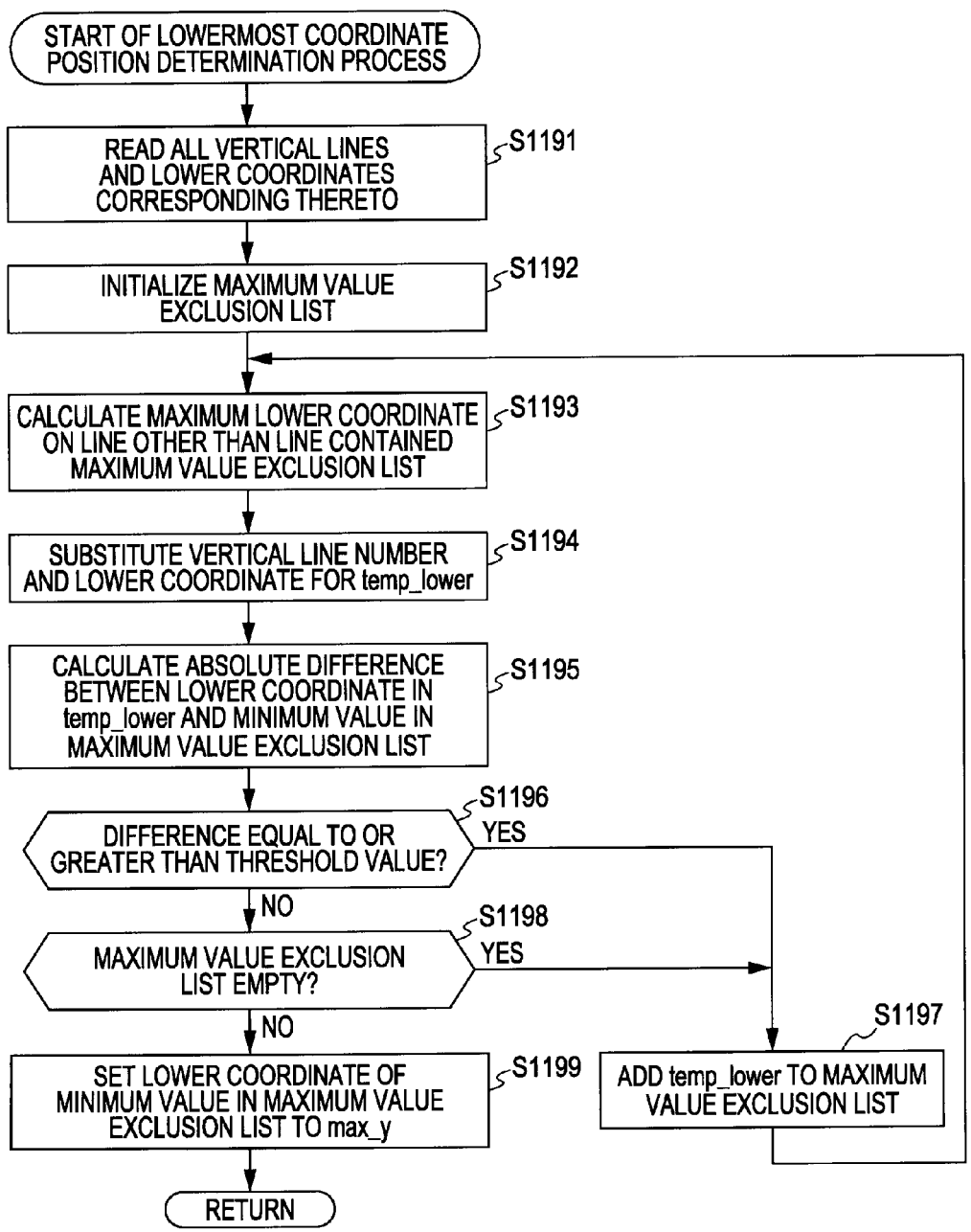
FIG. 31 is a flowchart illustrating in detail a lowermost coordinate position determination process.

The lowermost coordinate position determination process corresponding to step S1116 is described below with reference to a flowchart of FIG. 31.

In step S1191, the lowermost coordinate position determination unit 124 reads all vertical lines (j) and lower-end coordinates corresponding thereto supplied from the effective area coordinate position determining unit 41.

In step S1192, the lowermost coordinate position determination unit 124 initializes a maximum value exclusion list. The maximum value exclusion list, stored on the lowermost coordinate position determination unit 124, lists vertical line numbers, namely, coordinate values j in the x axis in association with lower-end coordinate positions in the order of magnitude from large to small.

In step S1193, the lowermost coordinate position determination unit 124 calculates a maximum lower-end coordinate in a line not contained in the maximum value exclusion list.

In step S1194, the lowermost coordinate position determination unit 124 substitutes the calculated vertical line number and lower-end coordinate position for a predetermined variable temp_lower. The predetermined variable temp_lower temporarily contains the vertical line number and the lower-end coordinate position in association with each other.

In step S1195, the lowermost coordinate position determination unit 124 calculates an absolute difference between the lower-end coordinate in the predetermined variable temp_lower and a minimum value in the maximum value exclusion list. Since the maximum value exclusion list is initialized, the lowermost coordinate position determination unit 124 outputs the lower-end coordinate in the predetermined variable temp_lower as is in step S1195.

In step S1196, the lowermost coordinate position determination unit 124 compares the calculated absolute difference with a predetermined threshold value to determine whether the difference is equal to or greater than the threshold value.

If it is determined in step S1196 that the difference is equal to or greater than the threshold value, processing proceeds to step S1197.

In step S1197, the lowermost coordinate position determination unit 124 adds, to the maximum value exclusion list, the vertical line number and the lower coordinate in the predetermined variable temp_lower. Processing returns to step S1193.

If it is determined in step S1196 that the difference is smaller than the threshold value, processing proceeds to step S1198.

In step S1198, the lowermost coordinate position determination unit 124 determines whether the maximum value exclusion list is empty.

If it is determined in step S1198 that the maximum value exclusion list is empty, processing proceeds to step S1197.

If it is determined in step S1198 that the maximum value exclusion list is not empty, processing proceeds to step S1199.

In step S1199, the lowermost coordinate position determination unit 124 sets the minimum value of lower-end coordinates in the maximum value exclusion list as a maximum coordinate value max_y in the y axis. Processing thus ends.

The lowermost coordinate position determination unit 124 compares the maximum lower-end coordinate value with the next maximum lower-end coordinate value using the maximum value exclusion list, thereby determining the position of the lowermost pixel from the lower-end pixels, each lower-end pixel detected on a per vertical line (j) basis.

The rectangular effective area coordinate position determination unit 101 thus determines the coordinate positions of the rectangular effective area based on the coordinate positions of the effective area.

The horizontal line (i) is processed first in the flowchart of FIG. 27. Alternatively, the vertical line (j) may be processed first. Such a process is described below.

Figure 32:
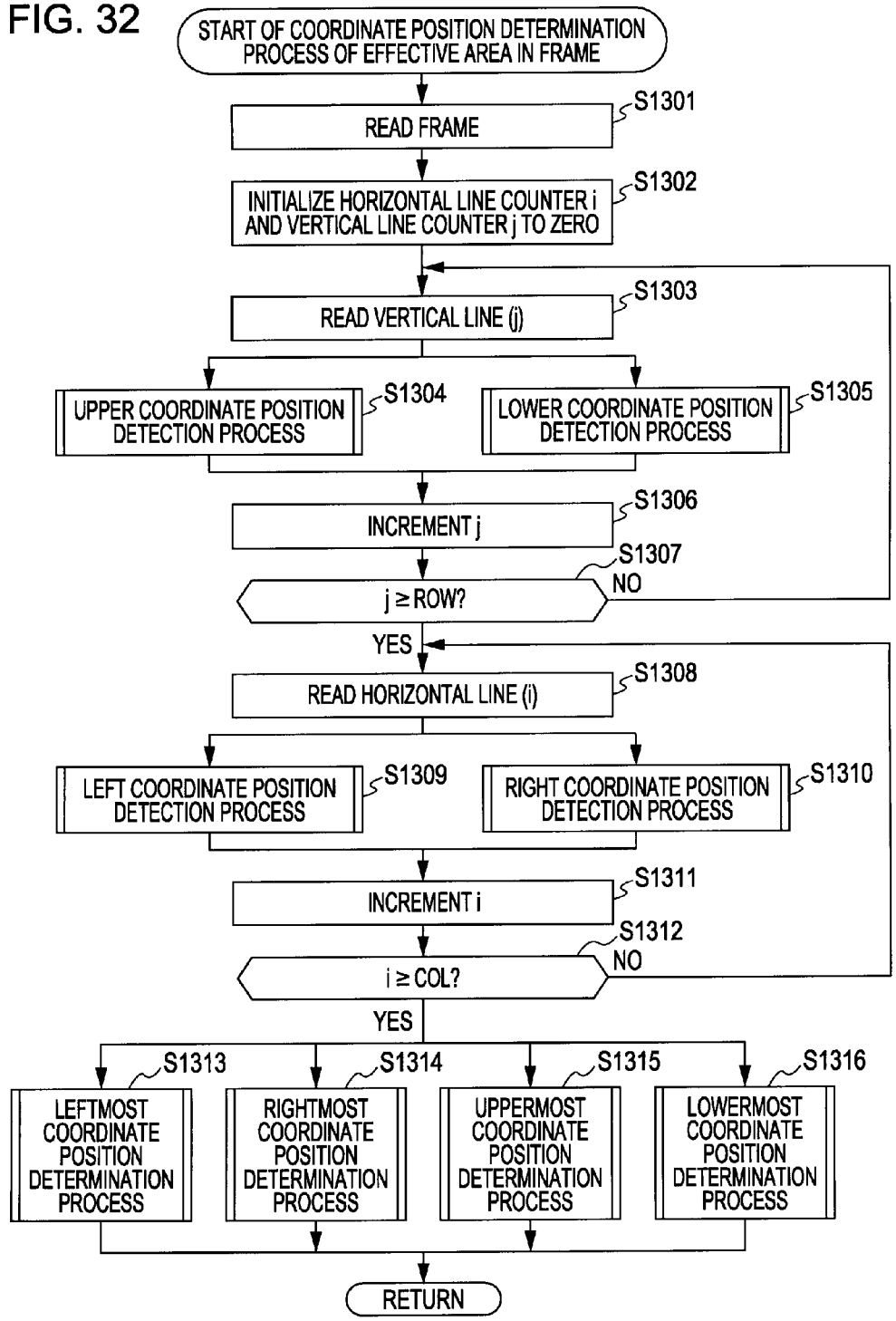
FIG. 32 is a flowchart illustrating still another coordinate position determination process of determining a coordinate position in the effective area in a frame.

FIG. 32 illustrates another in-frame effective area coordinate position determination process.

Steps S1301 through S1312 in the flowchart of FIG. 32 are respectively identical to steps in S301 through S312 in the flowchart of FIG. 18, and the discussion thereof is omitted herein. Processes performed in steps S1304, S1305, S1309 and S1310 in the flowchart of FIG. 32 are identical to those previously discussed with reference to the flowcharts of FIGS. 12 through 15, and the flowcharts of FIGS. 19 through 22, and the discussion thereof is omitted herein.

Steps S1313 through S1316 in the flowchart of FIG. 32 are respectively identical to step S1113 through S1116 in the flowchart of FIG. 27, and the discussion thereof is omitted herein.

The vertical line (j) is processed first in the flowchart of FIG. 32 while the horizontal line (i) is processed first in the flowchart of FIG. 27.

Furthermore, the horizontal line (i) and the vertical line (j) are serially performed with one after the other process in the flowcharts of FIGS. 27 and 32. Alternatively, the horizontal line (i) and the vertical line (j) may be performed in parallel. Such a process is described below.

Figure 33:
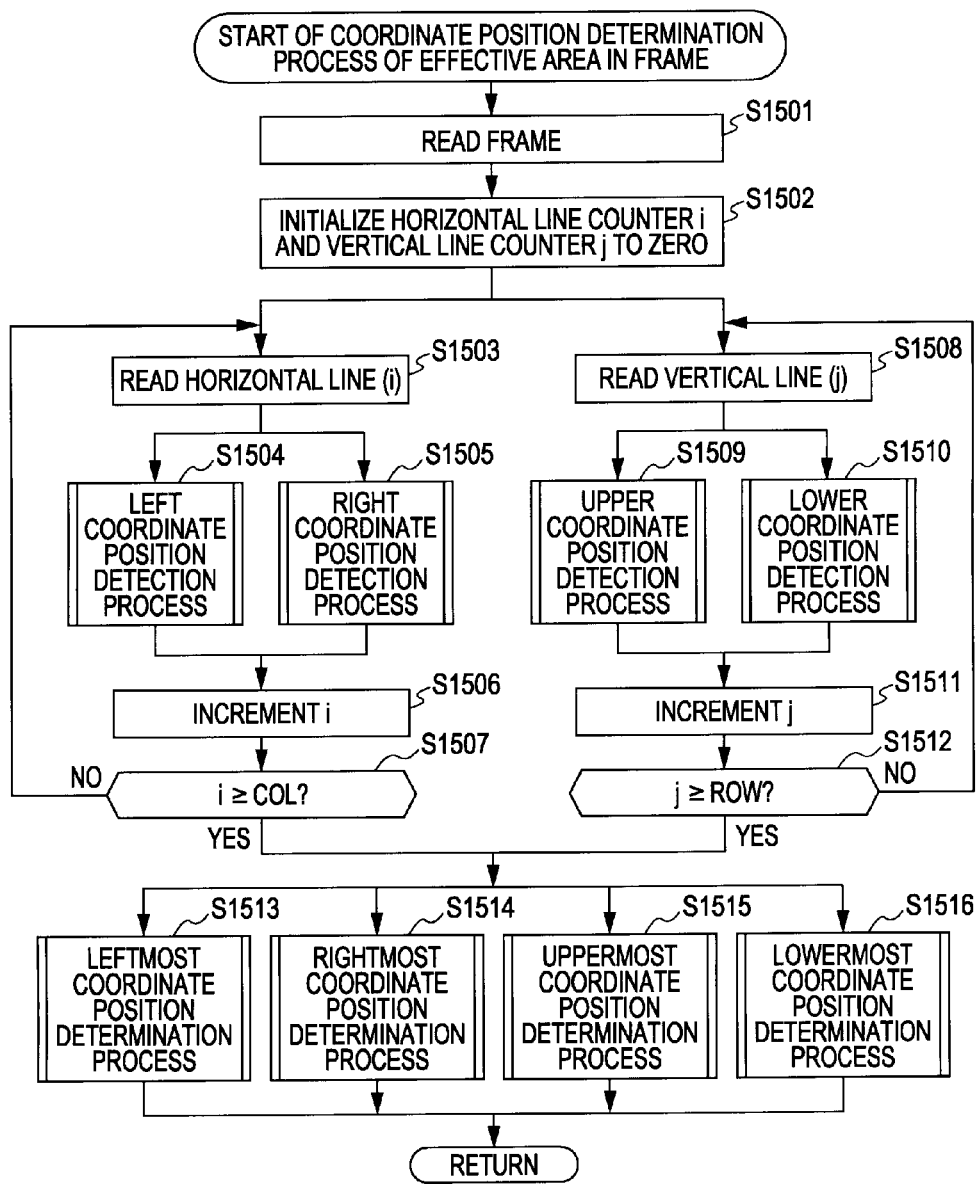
FIG. 33 is a flowchart illustrating still another coordinate position determination process of determining a coordinate position in the effective area in a frame.

FIG. 33 is a flowchart illustrating another in-frame effective area coordinate position determination process.

Steps S1501 through S1512 in the flowchart of FIG. 33 are identical to steps S501 through S512 in the flowchart of FIG. 23, and the discussion thereof is omitted herein. Processes performed in steps S1504, S1505, S1509 and S1510 in the flowchart of FIG. 33 are identical to those previously discussed with reference to the flowcharts of FIGS. 12 through 15, and the flowcharts of FIGS. 19 through 22, and the discussion thereof is omitted herein.

Steps S1513 through S1516 in the flowchart of FIG. 33 are respectively identical to step S1113 through S1116 in the flowchart of FIG. 27, and the discussion thereof is omitted herein.

Furthermore, the horizontal line (i) and the vertical line (j) are serially performed with one after the other process in the flowcharts of FIGS. 27 and 32. Alternatively, the horizontal line (i) and the vertical line (j) may be performed in parallel as shown in FIG. 33.

The in-frame coordinate position determining unit 12 performs the coordinate determination process of the effective area having any shape in the frame, and then the coordinate position determination process of the rectangular effective area. The coordinate positions of the rectangular effective area are thus determined.

The in-frame coordinate position determining unit 12 of FIG. 24 may have a low-pass filter arranged before the effective area coordinate position determining unit 41 to detect the coordinate position of the effective area in a manner free from the effect of noise. The coordinate positions of the rectangular effective area determined through steps S1113 through S1116 in the flowchart of FIG. 27 are simply determined by the leftmost coordinate position, the rightmost coordinate position, the uppermost coordinate position and the lowermost coordinate position.

Figure 34:
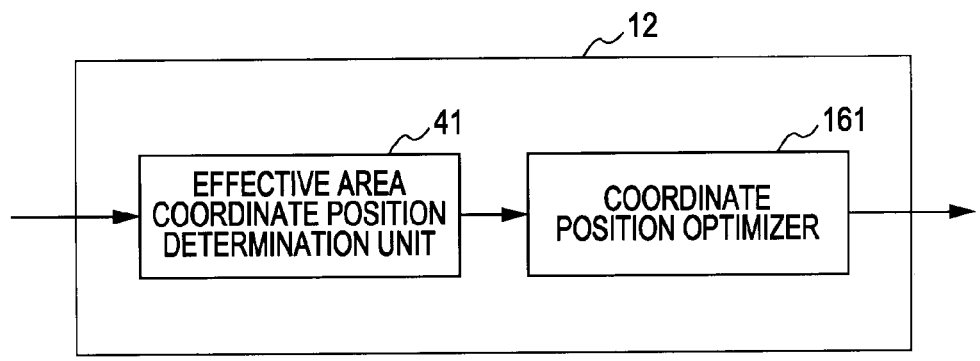
FIG. 34 is a block diagram illustrating yet another example of the in-frame coordinate position determining unit of FIG. 5.

FIG. 34 is a block diagram illustrating another example of the in-frame coordinate position determining unit 12 in the effective area detecting apparatus 1.

The in-frame coordinate position determining unit 12 of FIG. 34 includes the effective area coordinate position determining unit 41 and a coordinate position optimizer 161. The coordinate position optimizer 161 assigns appropriate coordinate positions to the coordinate positions of the effective area supplied from the effective area coordinate position determining unit 41, namely, to the left-end coordinate position and the right-end coordinate position of the effective area in each horizontal line (i) and the upper-end coordinate position and the lower-end coordinate position of the effective area in each vertical line (j).

Figure 35:
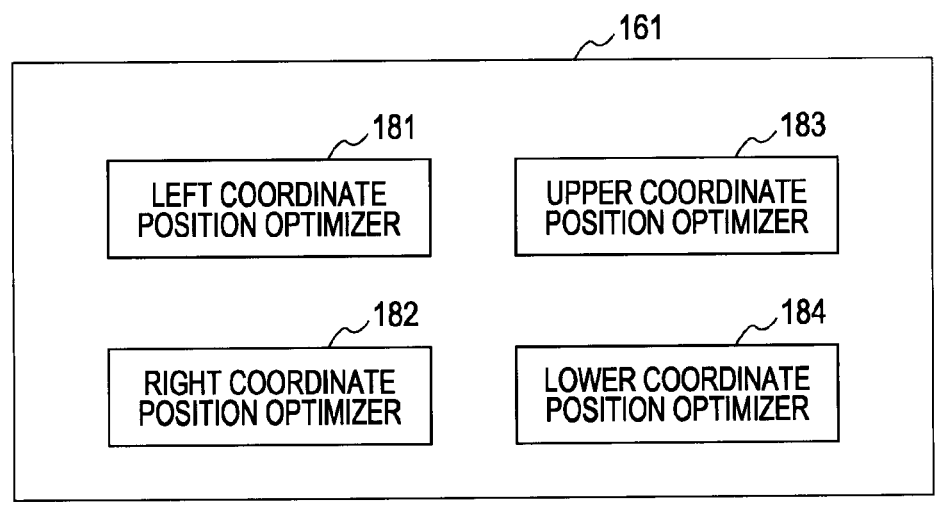
FIG. 35 is a block diagram of a coordinate position optimizer of FIG. 34.

FIG. 35 is a block diagram illustrating the coordinate position optimizer 161.

The coordinate position optimizer 161 includes a left coordinate position optimizer 181, a right coordinate position optimizer 182, an upper coordinate position optimizer 183, and a lower coordinate position optimizer 184.

If a difference between the position of the leftmost pixel and the position of the second pixel from the leftmost pixel is greater than a predetermined threshold value, from among the positions of the left-end pixels, each left-end pixel detected on a per horizontal line (i) basis, the left coordinate position optimizer 181 sets as the leftmost position the mean value of the positions of the left-end pixels in horizontal lines (i−1) and (i+1) adjacent to the horizontal line (i) from which the leftmost pixel is detected. If a difference between the position of the second pixel from the leftmost pixel and the position of the third pixel from the leftmost pixel is greater than the predetermined threshold, the left coordinate position optimizer 181 sets as the second leftmost position the mean value of the positions of the left-end pixels in horizontal lines (i−1) and (i+1) adjacent to the horizontal line (i) from which the second pixel from the leftmost pixel is detected. This process is repeated until a difference between pixels becomes equal to or smaller than the predetermined threshold.

If a difference between the position of the rightmost pixel and the position of the second pixel from the rightmost pixel is greater than a predetermined threshold value, from among the positions of the left-end pixels, each left-end pixel detected on a per horizontal line (i) basis, the left coordinate position optimizer 181 sets as the rightmost position the mean value of the positions of the left-end pixels in horizontal lines (i−1) and (i+1) adjacent to the horizontal line (i) from which the rightmost pixel is detected. If a difference between the position of the second pixel from the rightmost pixel and the position of the third pixel from the rightmost pixel is greater than the predetermined threshold, the left coordinate position optimizer 181 sets as the second rightmost position the mean value of the positions of the left-end pixels in horizontal lines (i−1) and (i+1) adjacent to the horizontal line (i) from which the second pixel from the rightmost pixel is detected. This process is repeated until a difference between pixels becomes equal to or smaller than the predetermined threshold.

Figure 36:
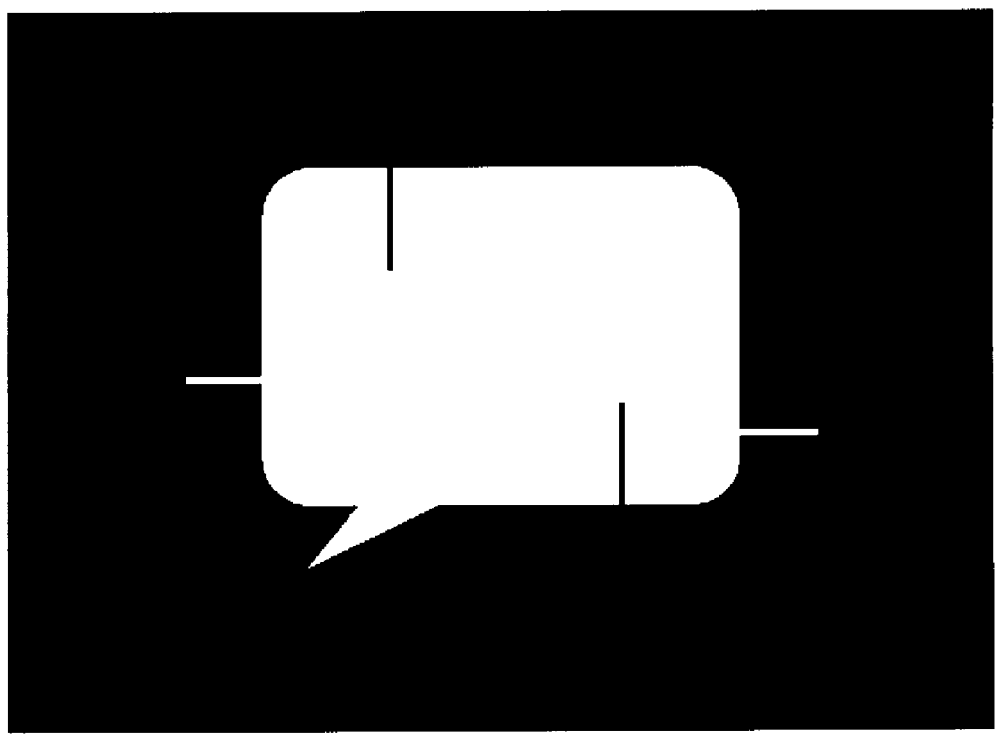
FIG. 36 illustrates an optimizing process of optimizing a coordinate position in the effective area.

For example, pixels affected by a noise component might be present outside an effective area of a speech balloon on the left-hand side thereof as shown in FIG. 36. The left coordinate position optimizer 181 then assigns to a coordinate position of the noise-affected pixel the mean value of coordinate positions of the left-end pixels in horizontal lines above and below the horizontal line from which the noise-affected pixel is detected. Pixels affected by a noise component might be present in the left-hand side portion of an effective area of a speech balloon (not shown). The left coordinate position optimizer 181 also performs a similar process in this case, i.e., optimizes a left coordinate position.

If a difference between the position of the leftmost pixel and the position of the second pixel from the leftmost pixel is greater than a predetermined threshold value, from among the positions of the right-end pixels, each right-end pixel detected on a per horizontal line (i) basis, the right coordinate position optimizer 182 sets as the leftmost position the mean value of the positions of the right-end pixels in horizontal lines (i−1) and (i+1) adjacent to the horizontal line (i) from which the leftmost pixel is detected. If a difference between the position of the second pixel from the leftmost pixel and the position of the third pixel from the leftmost pixel is greater than the predetermined threshold, the right coordinate position optimizer 182 sets as the second leftmost position the mean value of the positions of the right-end pixels in horizontal lines (i−1) and (i+1) adjacent to the horizontal line (i) from which the second pixel from the leftmost pixel is detected. This process is repeated until a difference between pixels becomes equal to or smaller than the predetermined threshold.

If a difference between the position of the rightmost pixel and the position of the second pixel from the rightmost pixel is greater than a predetermined threshold value, from among the positions of the right-end pixels, each right-end pixel detected on a per horizontal line (i) basis, the right coordinate position optimizer 182 sets as the rightmost position the mean value of the positions of the right-end pixels in horizontal lines (i−1) and (i+1) adjacent to the horizontal line (i) from which the rightmost pixel is detected. If a difference between the position of the second pixel from the rightmost pixel and the position of the third pixel from the rightmost pixel is greater than the predetermined threshold, the right coordinate position optimizer 182 sets as the second rightmost position the mean value of the positions of the right-end pixels in horizontal lines (i−1) and (i+1) adjacent to the horizontal line (i) from which the second pixel from the rightmost pixel is detected. This process is repeated until a difference between pixels becomes equal to or smaller than the predetermined threshold.

For example, pixels affected by a noise component might be present outside an effective area of a speech balloon on the right-hand side thereof as shown in FIG. 36. The right coordinate position optimizer 182 then assigns to a coordinate position of the noise-affected pixel the mean value of coordinate positions of the right-end pixels in horizontal lines above and below the horizontal line from which the noise-affected pixel is detected. Pixels affected by a noise component might be present in the right-hand side portion of an effective area of a speech balloon (not shown). The right coordinate position optimizer 182 also performs a similar process in this case, i.e., optimizes a right coordinate position.

If a difference between the position of the uppermost pixel and the position of the second pixel from the uppermost pixel is greater than a predetermined threshold value, from among the positions of the upper-end pixels, each upper-end pixel detected on a per vertical line (j) basis, the upper coordinate position optimizer 183 sets as the uppermost position the mean value of the positions of the upper-end pixels in vertical lines (j−1) and (j+1) adjacent to the vertical line (j) from which the uppermost pixel is detected. If a difference between the position of the second pixel from the uppermost pixel and the position of the third pixel from the uppermost pixel is greater than the predetermined threshold, the upper coordinate position optimizer 183 sets as the second uppermost position the mean value of the positions of the upper-end pixels in vertical lines (j−1) and (j+1) adjacent to the vertical line (j) from which the second pixel from the uppermost pixel is detected. This process is repeated until a difference between pixels becomes equal to or smaller than the predetermined threshold.

If a difference between the position of the lowermost pixel and the position of the second pixel from the lowermost pixel is greater than a predetermined threshold value, from among the positions of the upper-end pixels, each upper-end pixel detected on a per vertical line (j) basis, the upper coordinate position optimizer 183 sets as the lowermost position the mean value of the positions of the upper-end pixels in vertical lines (j−1) and (j+1) adjacent to the vertical line (j) from which the lowermost pixel is detected. If a difference between the position of the second pixel from the lowermost pixel and the position of the third pixel from the lowermost pixel is greater than the predetermined threshold, the upper coordinate position optimizer 183 sets as the second lowermost position the mean value of the positions of the upper-end pixels in vertical lines (j−1) and (j+1) adjacent to the vertical line (j) from which the second pixel from the lowermost pixel is detected. This process is repeated until a difference between pixels becomes equal to or smaller than the predetermined threshold.

For example, pixels affected by a noise component might be present outside the effective area of the speech balloon on the upper side thereof as shown in FIG. 36. The upper coordinate position optimizer 183 then assigns to a coordinate position of the noise-affected pixel the mean value of coordinate positions of the upper-end pixels in vertical lines to the left and right of the vertical line from which the noise-affected pixel is detected. Pixels affected by a noise component might be present in the upper portion of an effective area of a speech balloon (not shown). The upper coordinate position optimizer 183 also performs a similar process in this case, i.e., optimizes an upper coordinate position.

If a difference between the position of the uppermost pixel and the position of the second pixel from the uppermost pixel is greater than a predetermined threshold value, from among the positions of the lower-end pixels, each lower-end pixel detected on a per vertical line (j) basis, the lower coordinate position optimizer 184 sets as the uppermost position the mean value of the positions of the lower-end pixels in vertical lines (j−1) and (j+1) adjacent to the vertical line (j) from which the uppermost pixel is detected. If a difference between the position of the second pixel from the uppermost pixel and the position of the third pixel from the uppermost pixel is greater than the predetermined threshold, the lower coordinate position optimizer 184 sets as the second uppermost position the mean value of the positions of the lower-end pixels in vertical lines (j−1) and (j+1) adjacent to the vertical line (j) from which the second pixel from the uppermost pixel is detected. This process is repeated until a difference between pixels becomes equal to or smaller than the predetermined threshold.

If a difference between the position of the lowermost pixel and the position of the second pixel from the lowermost pixel is greater than a predetermined threshold value, from among the positions of the lower-end pixels, each lower-end pixel detected on a per vertical line (j) basis, the lower coordinate position optimizer 184 sets as the lowermost position the mean value of the positions of the lower-end pixels in vertical lines (j−1) and (j+1) adjacent to the vertical line (j) from which the lowermost pixel is detected. If a difference between the position of the second pixel from the lowermost pixel and the position of the third pixel from the lowermost pixel is greater than the predetermined threshold, the lower coordinate position optimizer 184 sets as the second lowermost position the mean value of the positions of the lower-end pixels in vertical lines (j−1) and (j+1) adjacent to the vertical line (j) from which the second pixel from the lowermost pixel is detected. This process is repeated until a difference between pixels becomes equal to or smaller than the predetermined threshold.

For example, pixels affected by a noise component might be present outside the effective area of the speech balloon on the lower side thereof as shown in FIG. 36. The lower coordinate position optimizer 184 then assigns to a coordinate position of the noise-affected pixel the mean value of coordinate positions of the lower-end pixels in vertical lines to the left and right of the vertical line from which the noise-affected pixel is detected. Pixels affected by a noise component might be present in the lower portion of an effective area of a speech balloon (not shown). The lower coordinate position optimizer 184 also performs a similar process in this case, i.e., optimizes a lower coordinate position.

Figure 37:
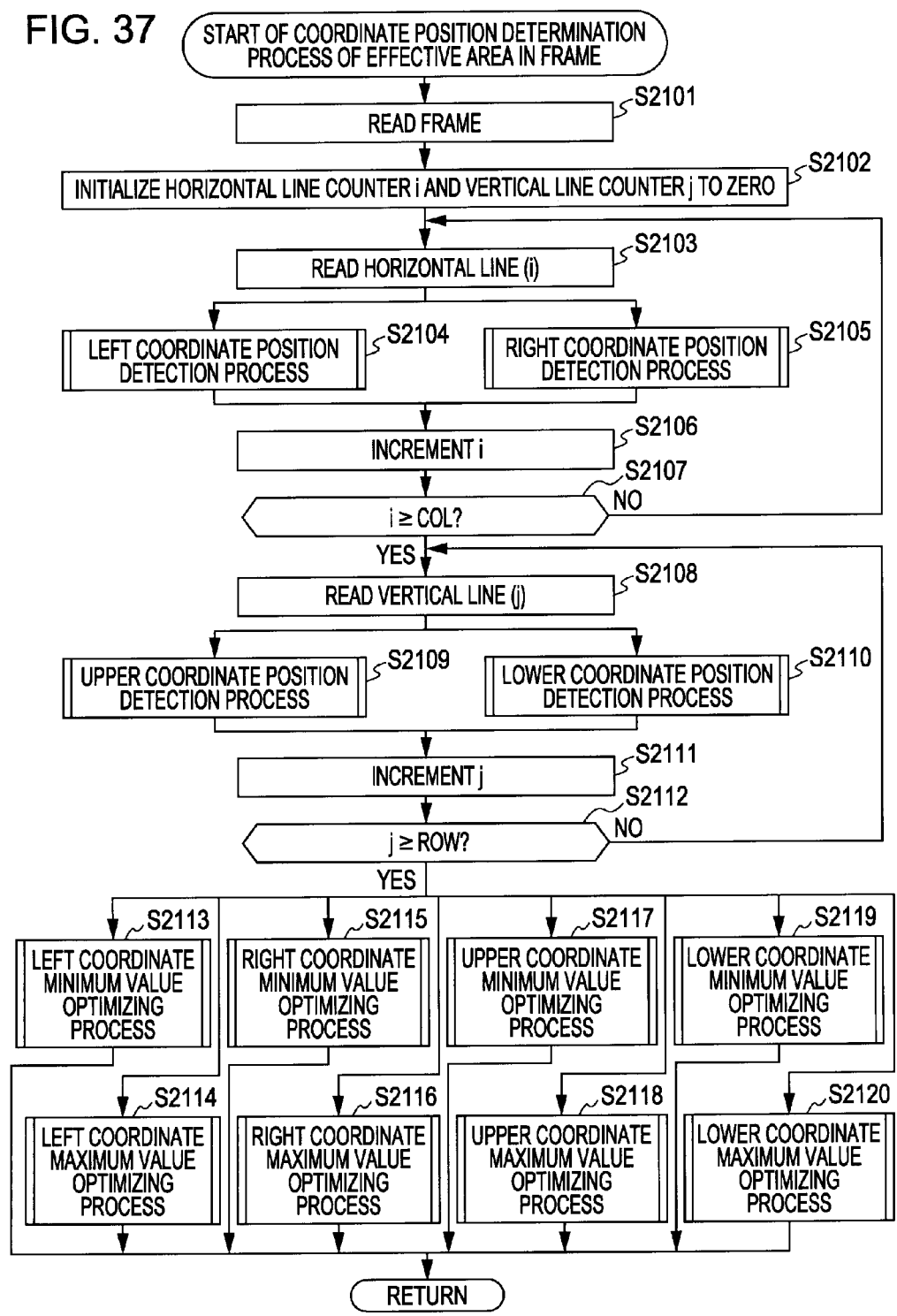
FIG. 37 is a flowchart illustrating still another coordinate position determination process of determining a coordinate position in the effective area in a frame.

FIG. 37 is a flowchart illustrating another in-frame effective area coordinate position determination process corresponding to step S2 in the flowchart of FIG. 7.

Steps S2101 through S2112 in the flowchart of FIG. 37 are respectively identical to steps S101 through S112 in the flowchart of FIG. 11 and the discussion thereof is omitted herein. Processes performed in steps S2104, S2105, S2109 and S2110 in the flowchart of FIG. 37 are identical to those previously discussed with reference to the flowcharts of FIGS. 12 through 15, and the flowcharts of FIGS. 19 through 22, and the discussion thereof is omitted herein.

At the completion of step S2112, the effective area coordinate position determining unit 41 has determined the left coordinate position and the right coordinate position of the effective area in the horizontal line (i) and the upper coordinate position and the lower coordinate position of the effective area in the vertical line (j). The effective area coordinate position determining unit 41 supplies the determined left and right coordinate positions of the effective area and the upper and lower coordinate positions of the effective area to the coordinate position optimizer 161. Steps S2113 through S2120 are then performed in parallel.

In step S2113, the left coordinate position optimizer 181 sets as the leftmost position the mean value of the left-end pixels in the horizontal lines (i−1) and (i+1) adjacent to the horizontal line (i) from which the leftmost pixel is detected, if the difference between the position of the leftmost pixel and the position of the second pixel from the leftmost pixel is greater than the predetermined threshold from among the left-end pixels, each left-end pixel detected on a per horizontal line (i) basis. More specifically, the left coordinate position optimizer 181 optimizes the position of the leftmost pixel of the left-end pixels, namely, the position of the left-end pixel having a minimum value.

A left coordinate minimum value optimizing process corresponding to step S2113 is described below with reference to a flowchart of FIG. 38.

In step S2131, the left coordinate position optimizer 181 reads all horizontal lines (i) and left-end coordinates corresponding thereto supplied from the effective area coordinate position determining unit 41.

In step S2132, the left coordinate position optimizer 181 excludes from all read horizontal lines (i) any line having the entire length thereof falling within the black area.

More specifically, the left coordinate position optimizer 181 excludes a line having a left coordinate position at a maximum value, namely, having the coordinate value k in the x axis being BOW−1 of FIG. 10 as the coordinate value calculated in accordance with the flowchart of FIG. 12 or FIG. 19. The left coordinate position optimizer 181 may exclude consecutive lines in the black area. As shown in FIG. 26, an area above the minimum coordinate position min_y in the y axis and an area below the maximum coordinate position max_y in the y axis may be excluded. In this case, even if an entire line is in the black area between the minimum coordinate position min_y in the y axis and the maximum coordinate position max_y in the y axis is present, that entire line is not excluded.

In step S2133, the left coordinate position optimizer 181 initializes a minimum value exclusion list. The minimum value exclusion list, stored on the left coordinate position optimizer 181, lists horizontal line numbers, namely, coordinate values i in the y axis in association with left-end coordinate positions in the order of magnitude from small to large.

In step S2134, the left coordinate position optimizer 181 calculates a minimum left-end coordinate in a line not contained in the minimum value exclusion list.

In step S2135, the left coordinate position optimizer 181 substitutes the calculated horizontal line number and left-end coordinate position for a predetermined variable temp_left. The predetermined variable temp_left temporarily contains the horizontal line number and the left-end coordinate position in association with each other.

In step S2136, the left coordinate position optimizer 181 calculates an absolute difference between the left-end coordinate in the predetermined variable temp_left and a maximum value in the minimum value exclusion list. Since the minimum value exclusion list is initialized, the left coordinate position optimizer 181 outputs the left-end coordinate in the predetermined variable temp_left as is in step S2136.

In step S2137, the left coordinate position optimizer 181 compares the calculated absolute difference with a predetermined threshold value to determine whether the difference is equal to or greater than the threshold value.

If it is determined in step S2137 that the difference is equal to or greater than the threshold value, processing proceeds to step S2138.

In step S2138, the left coordinate position optimizer 181 assigns, to the left-end coordinate of the line corresponding to the maximum value in the minimum value exclusion list, the mean value of the left-end pixels in lines above and below the line. Since the minimum value exclusion list is initialized, nothing is performed in step S2138 in a first cycle.

In step S2139, the left coordinate position optimizer 181 adds, to the minimum value exclusion list, the horizontal line number and the left coordinate in the predetermined variable temp_left. Processing returns to step S2134.

If it is determined in step S2137 that the difference is smaller than the threshold value, processing proceeds to step S2140.

In step S2140, the left coordinate position optimizer 181 determines whether the minimum value exclusion list is empty.

If it is determined in step S2140 that the minimum value exclusion list is empty, processing proceeds to step S2139.

If it is determined in step S2140 that the minimum value exclusion list is not empty, processing ends.

The left coordinate position optimizer 181 compares the minimum left-end coordinate value with the next minimum left-end coordinate value using the minimum value exclusion list, thereby optimizing the position of the leftmost pixel from the left-end pixels, namely, the position of the left-end pixel having a minimum coordinate value.

Returning to FIG. 37, in step S2114, the left coordinate position optimizer 181 sets as the rightmost position the mean value of the left-end pixels in the horizontal lines (i−1) and (i+1) adjacent to the horizontal line (i) from which the leftmost pixel is detected, if the difference between the position of the rightmost pixel and the position of the second pixel from the rightmost pixel is greater than the predetermined threshold from among the left-end pixels, each left-end pixel detected on a horizontal line (i) basis. More specifically, the left coordinate position optimizer 181 optimizes the position of the rightmost pixel of the left-end pixels, namely, the position of the left-end pixel having a maximum value.

A left coordinate maximum value optimizing process corresponding to step S2114 is described below with reference to a flowchart of FIG. 39.

Figure 38:
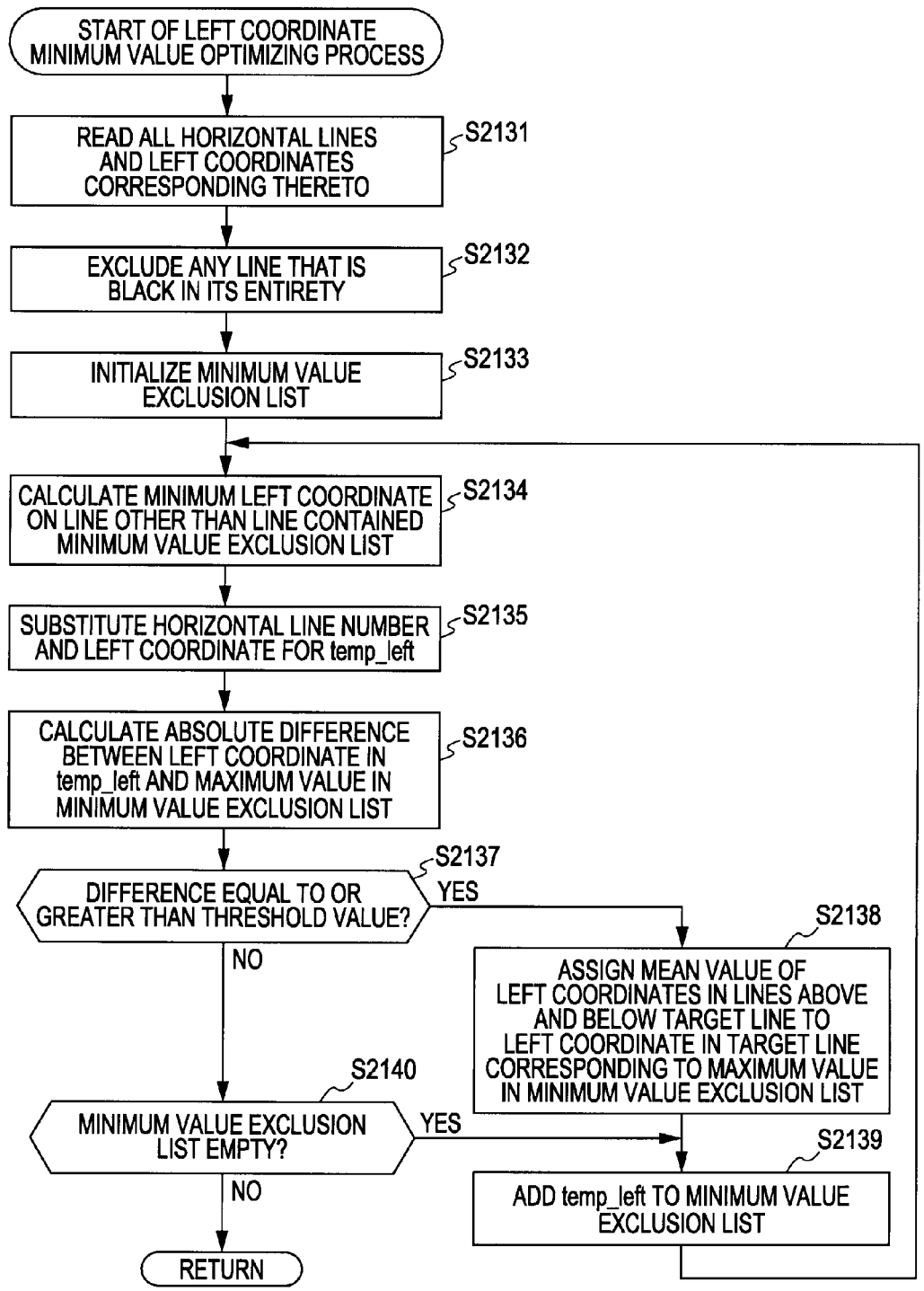
FIG. 38 is a flowchart illustrating in detail an optimizing process of optimizing a left coordinate minimum value.
Figure 39:
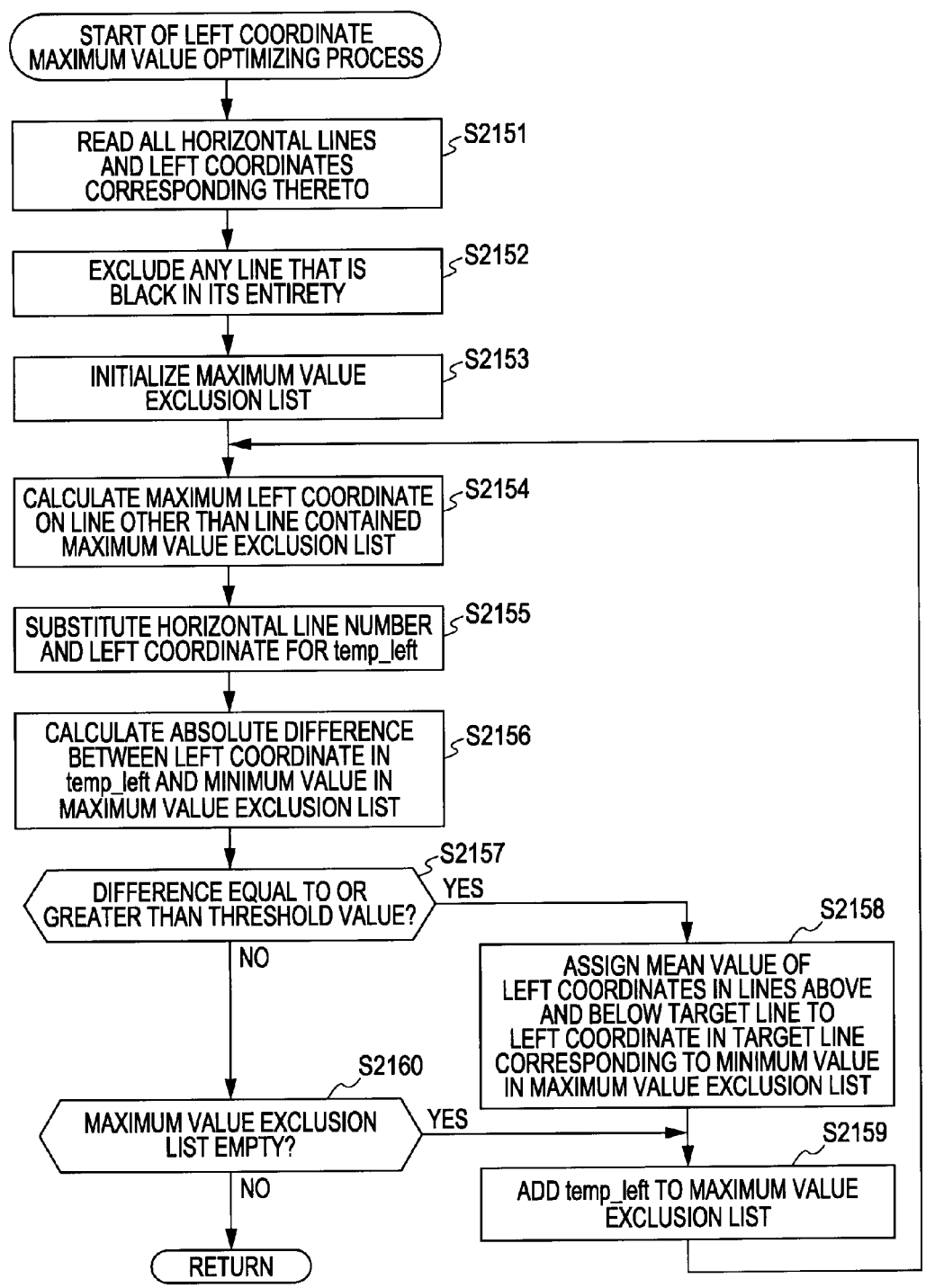
FIG. 39 is a flowchart illustrating in detail an optimizing process of optimizing a left coordinate maximum value.

Steps S2151 and S2152 in the flowchart of FIG. 39 are respectively identical to steps S2131 and S2132 in the flowchart of FIG. 38 and the discussion thereof is omitted herein.

In step S2153, the left coordinate position optimizer 181 initializes a maximum value exclusion list. The maximum value exclusion list, stored on the left coordinate position optimizer 181, lists horizontal line numbers, namely, coordinate values i in the y axis in association with left-end coordinate positions in the order of magnitude from large to small.

In step S2154, the left coordinate position optimizer 181 calculates a maximum left-end coordinate in a line not contained in the maximum value exclusion list.

In step S2155, the left coordinate position optimizer 181 substitutes the calculated horizontal line number and left-end coordinate position for a predetermined variable temp_left. The predetermined variable temp_left temporarily contains the horizontal line number and the left-end coordinate position in association with each other.

In step S2156, the left coordinate position optimizer 181 calculates an absolute difference between the left-end coordinate in the predetermined variable temp_left and a minimum value in the maximum value exclusion list. Since the maximum value exclusion list is initialized, the left coordinate position optimizer 181 outputs the left-end coordinate in the predetermined variable temp_left as is in step S2156.

In step S2157, the left coordinate position optimizer 181 compares the calculated absolute difference with a predetermined threshold value to determine whether the difference is equal to or greater than the threshold value.

If it is determined in step S2157 that the difference is equal to or greater than the threshold value, processing proceeds to step S2158.

In step S2158, the left coordinate position optimizer 181 assigns, to the left-end coordinate of the line corresponding to the minimum value in the maximum value exclusion list, the mean value of the left-end pixels in lines above and below the line. Since the maximum value exclusion list is initialized, nothing is performed in step S2158 in a first cycle.

In step S2159, the left coordinate position optimizer 181 adds, to the maximum value exclusion list, the horizontal line number i and the left coordinate in the predetermined variable temp_left. Processing returns to step S2154.

If it is determined in step S2157 that the difference is smaller than the threshold value, processing proceeds to step S2160.

In step S2160, the left coordinate position optimizer 181 determines whether the maximum value exclusion list is empty.

If it is determined in step S2160 that the maximum value exclusion list is empty, processing proceeds to step S2159.

If it is determined in step S2160 that the maximum value exclusion list is not empty, processing ends.

The left coordinate position optimizer 181 compares the maximum left-end coordinate value with the next maximum left-end coordinate value using the maximum value exclusion list, thereby optimizing the position of the rightmost pixel from the left-end pixels, namely, the position of the left-end pixel having a maximum coordinate value.

Returning to FIG. 37, in step S2115, the right coordinate position optimizer 182 sets as the leftmost position the mean value of the right-end pixels in the horizontal lines (i−1) and (i+1) adjacent to the horizontal line (i) from which the leftmost pixel is detected, if the difference between the position of the leftmost pixel and the position of the second pixel from the leftmost pixel is greater than the predetermined threshold from among the right-end pixels, each right-end pixel detected on a per horizontal line (i) basis. More specifically, the right coordinate position optimizer 182 optimizes the position of the leftmost pixel of the right-end pixels, namely, the position of the right-end pixel having a minimum value.

A right coordinate minimum value optimizing process corresponding to step S2113 is described below with reference to a flowchart of FIG. 40.

In step S2171, the right coordinate position optimizer 182 reads all horizontal lines (i) and right-end coordinates corresponding thereto supplied from the effective area coordinate position determining unit 41.

In step S2172, the right coordinate position optimizer 182 excludes from all read horizontal lines (i) any line having the entire length thereof falling within the black area.

More specifically, the right coordinate position optimizer 182 excludes a line having a left coordinate position at a minimum value, namely, having the coordinate value m in the x axis being zero of FIG. 10 as the coordinate value calculated in accordance with the flowchart of FIG. 13 or FIG. 20. The right coordinate position optimizer 182 may exclude consecutive lines in the black area. As shown in FIG. 26, an area above the minimum coordinate position min_y in the y axis and an area below the maximum coordinate position max_y in the y axis may be excluded. In this case, even if an entire line is in the black area between the minimum coordinate position min_y in the y axis and the maximum coordinate position max_y in the y axis is present, that entire line is not excluded.

In step S2173, the right coordinate position optimizer 182 initializes a minimum value exclusion list. The minimum value exclusion list, stored on the right coordinate position optimizer 182, lists horizontal line numbers, namely, coordinate values i in the y axis in association with right-end coordinate positions in the order of magnitude from small to large.

In step S2174, the right coordinate position optimizer 182 calculates a minimum right-end coordinate in a line not contained in the minimum value exclusion list.

In step S2175, the right coordinate position optimizer 182 substitutes the calculated horizontal line number and right-end coordinate position for a predetermined variable temp_right. The predetermined variable temp_right temporarily contains the horizontal line number and the right-end coordinate position in association with each other.

In step S2176, the right coordinate position optimizer 182 calculates an absolute difference between the right-end coordinate in the predetermined variable temp_right and a maximum value in the minimum value exclusion list. Since the minimum value exclusion list is initialized, the right coordinate position optimizer 182 outputs the right-end coordinate in the predetermined variable temp_right as is in step S2176.

In step S2177, the right coordinate position optimizer 182 compares the calculated absolute difference with a predetermined threshold value to determine whether the difference is equal to or greater than the threshold value.

If it is determined in step S2177 that the difference is equal to or greater than the threshold value, processing proceeds to step S2178.

In step S2178, the right coordinate position optimizer 182 assigns, to the right-end coordinate of the line corresponding to the maximum value in the minimum value exclusion list, the mean value of the right-end pixels in lines above and below the line. Since the minimum value exclusion list is initialized, nothing is performed in step S2178 in a first cycle.

In step S2179, the right coordinate position optimizer 182 adds, to the minimum value exclusion list, the horizontal line number and the left coordinate in the predetermined variable temp_right. Processing returns to step S2174.

If it is determined in step S2177 that the difference is smaller than the threshold value, processing proceeds to step S2180.

In step S2180, the right coordinate position optimizer 182 determines whether the minimum value exclusion list is empty.

If it is determined in step S2180 that the minimum value exclusion list is empty, processing proceeds to step S2179.

If it is determined in step S2180 that the minimum value exclusion list is not empty, processing ends.

The right coordinate position optimizer 182 compares the minimum right-end coordinate value with the next minimum right-end coordinate value using the minimum value exclusion list, thereby optimizing the position of the leftmost pixel from the right-end pixels, namely, the position of the right-end pixel having a minimum coordinate value.

Returning to FIG. 37, in step S2116, the right coordinate position optimizer 182 sets as the rightmost position the mean value of the right-end pixels in the horizontal lines (i−1) and (i+1) adjacent to the horizontal line (i) from which the rightmost pixel is detected, if the difference between the position of the rightmost pixel and the position of the second pixel from the rightmost pixel is greater than the predetermined threshold from among the right-end pixels, each right-end pixel detected on a per horizontal line (i) basis. More specifically, the right coordinate position optimizer 182 optimizes the position of the rightmost pixel of the right-end pixels, namely, the position of the right-end pixel having a maximum coordinate value.

A right coordinate maximum value optimizing process corresponding to step S2116 is described below with reference to a flowchart of FIG. 41.

Figure 40:
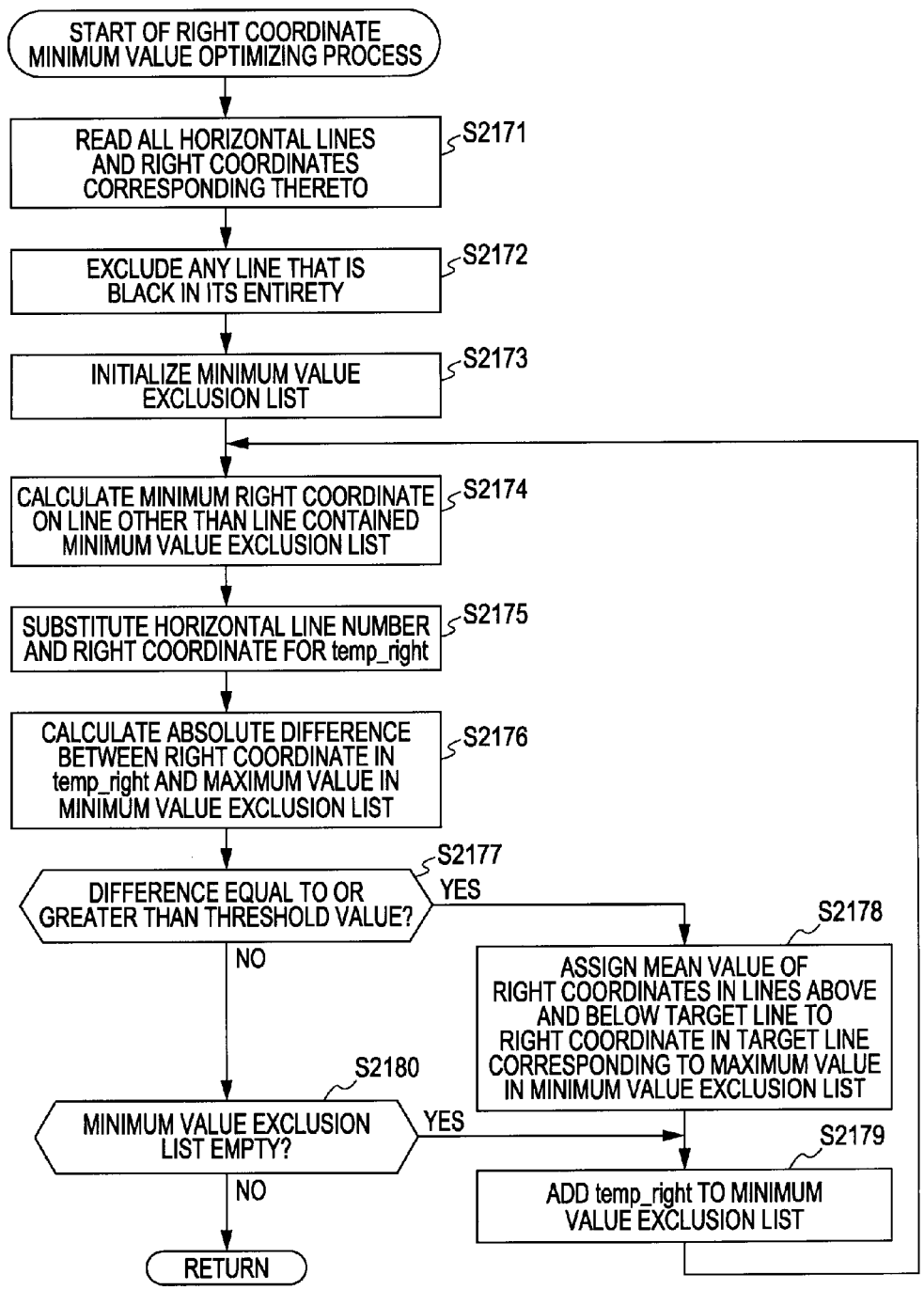
FIG. 40 is a flowchart illustrating in detail an optimizing process of optimizing a right coordinate minimum value.
Figure 41:
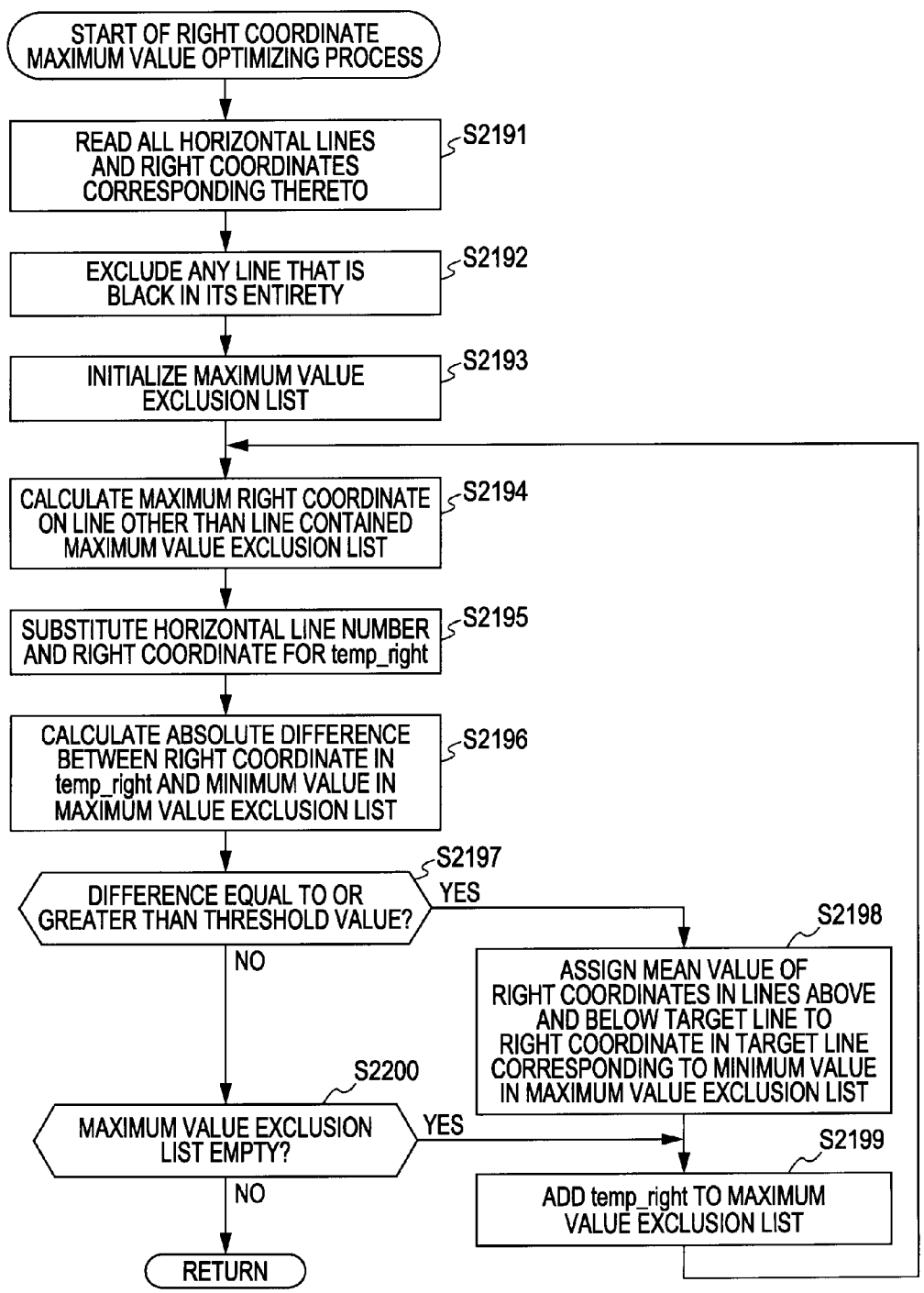
FIG. 41 is a flowchart illustrating in detail an optimizing process of optimizing a right coordinate maximum value.

Steps S2191 and S2192 in the flowchart of FIG. 41 are respectively identical to steps S2171 and S2172 in the flowchart of FIG. 40 and the discussion thereof is omitted herein.

In step S2193, the right coordinate position optimizer 182 initializes a maximum value exclusion list. The maximum value exclusion list, stored on the right coordinate position optimizer 182, lists horizontal line numbers, namely, coordinate values i in the y axis in association with right-end coordinate positions in the order of magnitude from large to small.

In step S2194, the right coordinate position optimizer 182 calculates a maximum right-end coordinate in a line not contained in the maximum value exclusion list.

In step S2195, the right coordinate position optimizer 182 substitutes the calculated horizontal line number and right-end coordinate position for a predetermined variable temp_right. The predetermined variable temp_right temporarily contains the horizontal line number and the right-end coordinate position in association with each other.

In step S2196, the right coordinate position optimizer 182 calculates an absolute difference between the right-end coordinate in the predetermined variable temp_right and a minimum value in the maximum value exclusion list. Since the maximum value exclusion list is initialized, the right coordinate position optimizer 182 outputs the right-end coordinate in the predetermined variable temp_right as is in step S2196.

In step S2197, the right coordinate position optimizer 182 compares the calculated absolute difference with a predetermined threshold value to determine whether the difference is equal to or greater than the threshold value.

If it is determined in step S2197 that the difference is equal to or greater than the threshold value, processing proceeds to step S2198.

In step S2198, the right coordinate position optimizer 182 assigns, to the right-end coordinate of the line corresponding to the minimum value in the maximum value exclusion list, the mean value of the right-end pixels in lines above and below the line. Since the maximum value exclusion list is initialized, nothing is performed in step S2198 in a first cycle.

In step S2199, the right coordinate position optimizer 182 adds, to the maximum value exclusion list, the horizontal line number i and the right coordinate in the predetermined variable temp_right. Processing returns to step S2194.

If it is determined in step S2197 that the difference is smaller than the threshold value, processing proceeds to step S2200.

In step S2200, the right coordinate position optimizer 182 determines whether the maximum value exclusion list is empty.

If it is determined in step S2200 that the maximum value exclusion list is empty, processing proceeds to step S2199.

If it is determined in step S2200 that the maximum value exclusion list is not empty, processing ends.

The right coordinate position optimizer 182 compares the maximum right-end coordinate value with the next maximum right-end coordinate value using the maximum value exclusion list, thereby optimizing the position of the rightmost pixel from the right-end pixels, namely, the position of the right-end pixel having a maximum coordinate value.

Returning to FIG. 37, in step S2117, the upper coordinate position optimizer 183 sets as the uppermost position the mean value of the upper-end pixels in the vertical lines (j−1) and (j+1) adjacent to the vertical line (j) from which the uppermost pixel is detected, if the difference between the position of the uppermost pixel and the position of the second pixel from the uppermost pixel is greater than the predetermined threshold from among the upper-end pixels, each upper-end pixel detected on a per vertical line (j) basis. More specifically, the upper coordinate position optimizer 183 optimizes the position of the uppermost pixel of the upper-end pixels, namely, the position of the upper-end pixel having a minimum coordinate value.

An upper coordinate minimum value optimizing process corresponding to step S2117 is described below with reference to a flowchart of FIG. 42.

In step S2211, the upper coordinate position optimizer 183 reads all vertical lines (j) and upper-end coordinates corresponding thereto supplied from the effective area coordinate position determining unit 41.

In step S2212, the upper coordinate position optimizer 183 excludes from all read vertical lines (j) any line having the entire length thereof falling within the black area.

More specifically, the upper coordinate position optimizer 183 excludes a line having an upper coordinate position at a maximum value, namely, having the coordinate value r in the y axis being COL−1 of FIG. 10 as the coordinate value calculated in accordance with the flowchart of FIG. 14 or FIG. 21. The upper coordinate position optimizer 183 may exclude consecutive lines in the black area. As shown in FIG. 26, an area to the left of the minimum coordinate position min_x in the x axis and an area to the right of the maximum coordinate position max_x in the x axis may be excluded. In this case, even if an entire line is in the black area between the minimum coordinate position min_x in the x axis and the maximum coordinate position max_x in the x axis is present, that entire line is not excluded.

In step S2213, the upper coordinate position optimizer 183 initializes a minimum value exclusion list. The minimum value exclusion list, stored on the upper coordinate position optimizer 183, lists vertical line numbers, namely, coordinate values j in the x axis in association with upper-end coordinate positions in the order of magnitude from small to large.

In step S2214, the upper coordinate position optimizer 183 calculates a minimum upper-end coordinate in a line not contained in the minimum value exclusion list.

In step S2215, the upper coordinate position optimizer 183 substitutes the calculated vertical line number and upper-end coordinate position for a predetermined variable temp_upper. The predetermined variable temp_upper temporarily contains the vertical line number and the upper-end coordinate position in association with each other.

In step S2216, the upper coordinate position optimizer 183 calculates an absolute difference between the upper-end coordinate in the predetermined variable temp_upper and a maximum value in the minimum value exclusion list. Since the minimum value exclusion list is initialized, the upper coordinate position optimizer 183 outputs the upper-end coordinate in the predetermined variable temp_upper as is in step S2216.

In step S2217, the upper coordinate position optimizer 183 compares the calculated absolute difference with a predetermined threshold value to determine whether the difference is equal to or greater than the threshold value.

If it is determined in step S2217 that the difference is equal to or greater than the threshold value, processing proceeds to step S2218.

In step S2218, the upper coordinate position optimizer 183 assigns, to the upper-end coordinate of the line corresponding to the maximum value in the minimum value exclusion list, the mean value of the upper-end pixels in lines to the left and right of the line. Since the minimum value exclusion list is initialized, nothing is performed in step S2218 in a first cycle.

In step S2219, the upper coordinate position optimizer 183 adds, to the minimum value exclusion list, the vertical line number and the upper coordinate in the predetermined variable temp_upper. Processing returns to step S2214.

If it is determined in step S2217 that the difference is smaller than the threshold value, processing proceeds to step S2220.

In step S2220, the upper coordinate position optimizer 183 determines whether the minimum value exclusion list is empty.

If it is determined in step S2220 that the minimum value exclusion list is empty, processing proceeds to step S2219.

If it is determined in step S2220 that the minimum value exclusion list is not empty, processing ends.

The upper coordinate position optimizer 183 compares the minimum upper-end coordinate value with the next minimum upper-end coordinate value using the minimum value exclusion list, thereby optimizing the position of the uppermost pixel from the upper-end pixels, namely, the position of the upper-end pixel having a minimum coordinate value.

Returning to FIG. 37, in step S2118, the upper coordinate position optimizer 183 sets as the lowermost position the mean value of the upper-end pixels in the vertical lines (j−1) and (i+1) adjacent to the vertical line (j) from which the lowermost pixel is detected, if the difference between the position of the lowermost pixel and the position of the second pixel from the lowermost pixel is greater than the predetermined threshold from among the upper-end pixels, each upper-end pixel detected on a per vertical line (j) basis. More specifically, the upper coordinate position optimizer 183 optimizes the position of the lowermost pixel of the upper-end pixels, namely, the position of the upper-end pixel having a maximum coordinate value.

An upper coordinate maximum value optimizing process corresponding to step S2118 is described below with reference to a flowchart of FIG. 43.

Figure 42:
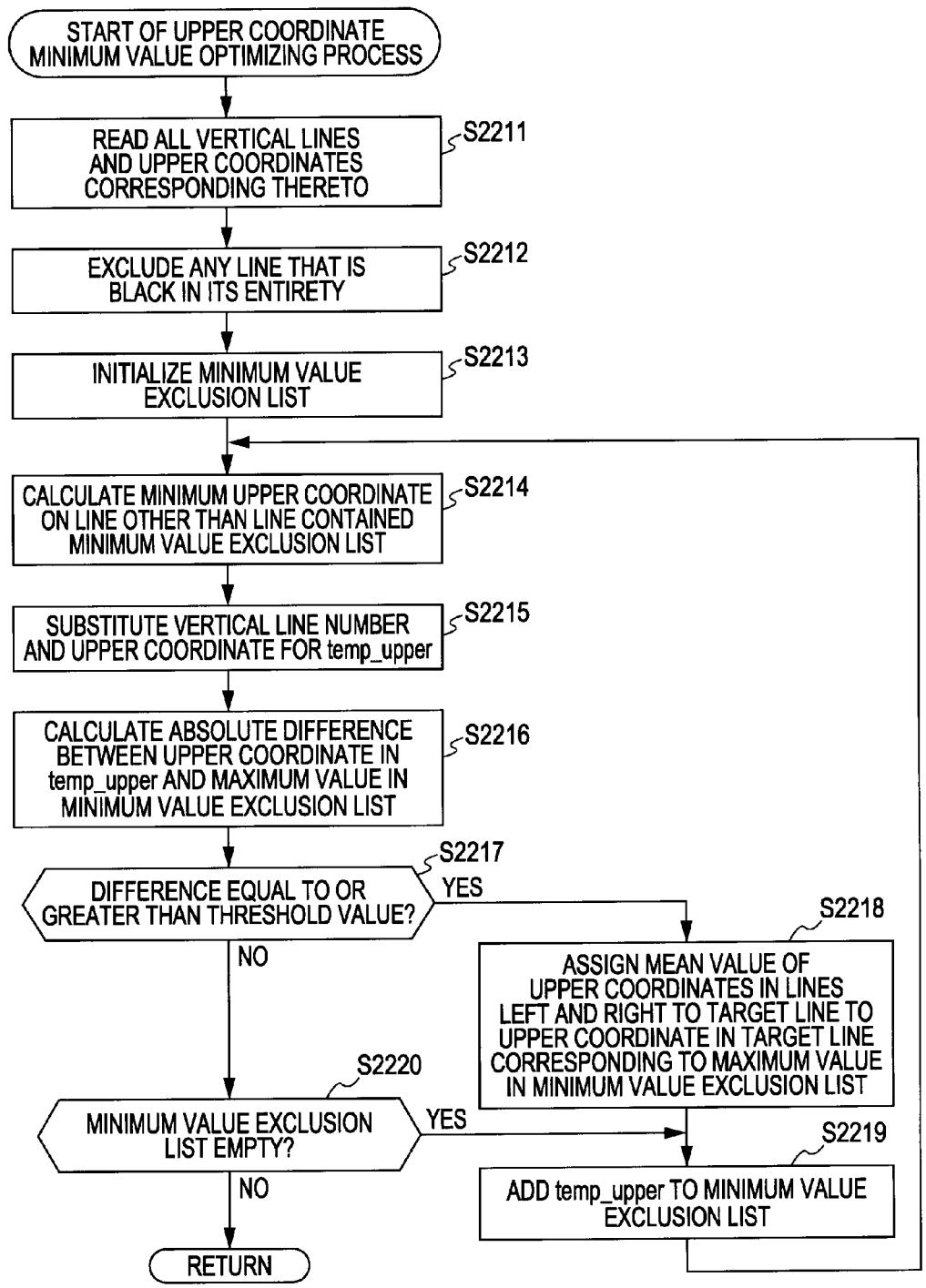
FIG. 42 is a flowchart illustrating in detail an optimizing process of optimizing an upper coordinate minimum value.
Figure 43:
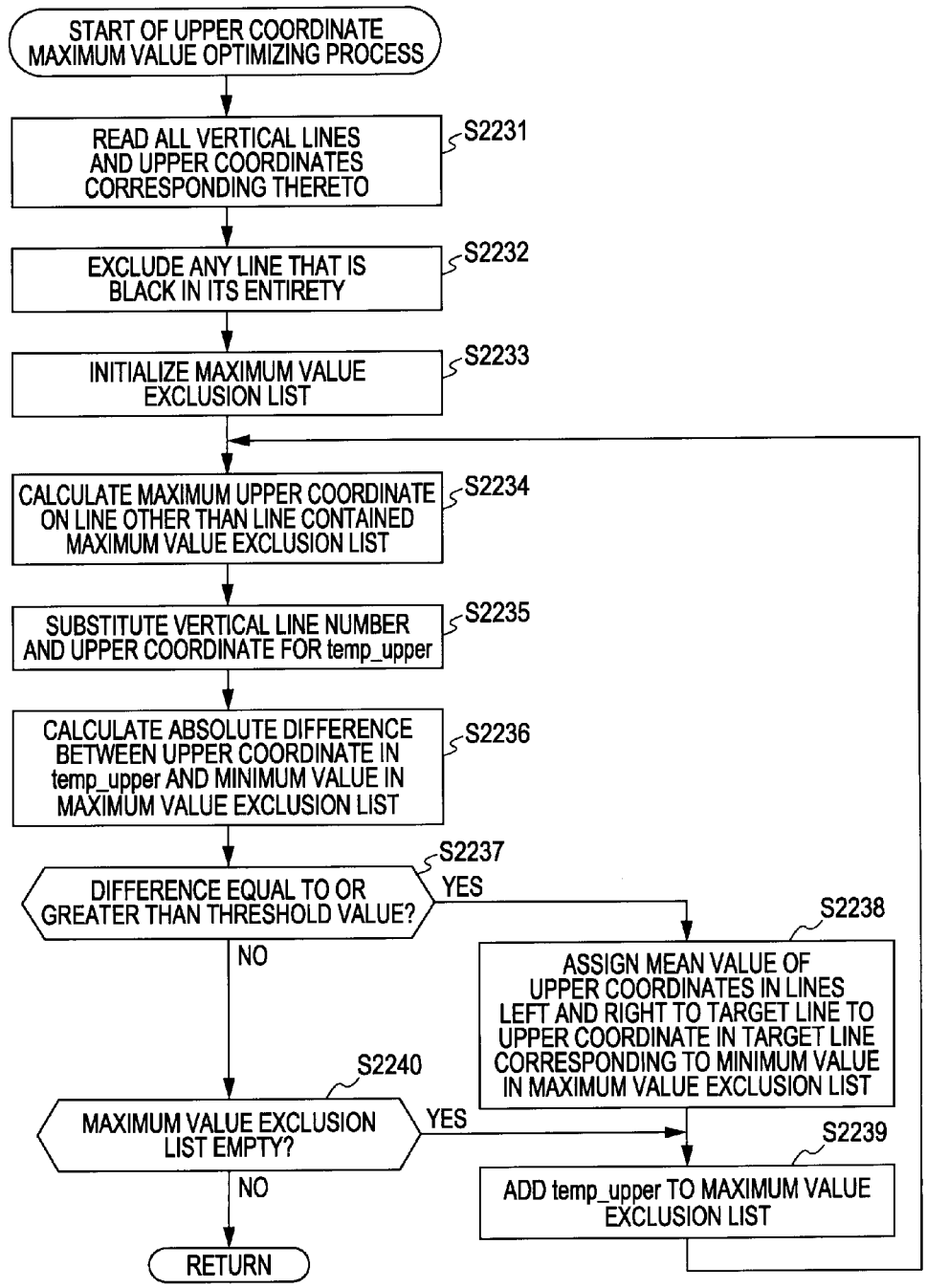
FIG. 43 is a flowchart illustrating in detail an optimizing process of optimizing an upper coordinate maximum value.

Steps S2231 and S2232 in the flowchart of FIG. 43 are respectively identical to steps S2211 and S2212 in the flowchart of FIG. 42 and the discussion thereof is omitted herein.

In step S2233, the upper coordinate position optimizer 183 initializes a maximum value exclusion list. The maximum value exclusion list, stored on the upper coordinate position optimizer 183, lists vertical line numbers, namely, coordinate values j in the x axis in association with upper-end coordinate positions in the order of magnitude from large to small.

In step S2234, the upper coordinate position optimizer 183 calculates a maximum upper-end coordinate in a line not contained in the maximum value exclusion list.

In step S2235, the upper coordinate position optimizer 183 substitutes the calculated vertical line number and upper-end coordinate position for a predetermined variable temp_upper. The predetermined variable temp_upper temporarily contains the vertical line number and the upper-end coordinate position in association with each other.

In step S2236, the upper coordinate position optimizer 183 calculates an absolute difference between the upper-end coordinate in the predetermined variable temp_upper and a minimum value in the maximum value exclusion list. Since the maximum value exclusion list is initialized, the upper coordinate position optimizer 183 outputs the upper-end coordinate in the predetermined variable temp_upper as is in step S2236.

In step S2237, the upper coordinate position optimizer 183 compares the calculated absolute difference with a predetermined threshold value to determine whether the difference is equal to or greater than the threshold value.

If it is determined in step S2237 that the difference is equal to or greater than the threshold value, processing proceeds to step S2238.

In step S2238, the upper coordinate position optimizer 183 assigns, to the upper-end coordinate of the line corresponding to the minimum value in the maximum value exclusion list, the mean value of the upper-end pixels in lines to the left and right of the line. Since the maximum value exclusion list is initialized, nothing is performed in step S2238 in a first cycle.

In step S2239, the upper coordinate position optimizer 183 adds, to the maximum value exclusion list, the vertical line number and the upper coordinate in the predetermined variable temp_upper. Processing returns to step S2234.

If it is determined in step S2237 that the difference is smaller than the threshold value, processing proceeds to step S2240.

In step S2240, the upper coordinate position optimizer 183 determines whether the maximum value exclusion list is empty.

If it is determined in step S2240 that the maximum value exclusion list is empty, processing proceeds to step S2239.

If it is determined in step S2240 that the maximum value exclusion list is not empty, processing ends.

The upper coordinate position optimizer 183 compares the maximum upper-end coordinate value with the next maximum upper-end coordinate value using the maximum value exclusion list, thereby optimizing the position of the lowermost pixel from the upper-end pixels, namely, the position of the upper-end pixel having a maximum coordinate value.

Returning to FIG. 37, in step S2119, the lower coordinate position optimizer 184 sets as the uppermost position the mean value of the lower-end pixels in the vertical lines (j−1) and (j+1) adjacent to the vertical line (j) from which the uppermost pixel is detected, if the difference between the position of the uppermost pixel and the position of the second pixel from the uppermost pixel is greater than the predetermined threshold from among the lower-end pixels, each lower-end pixel detected on a per vertical line (j) basis. More specifically, the lower coordinate position optimizer 184 optimizes the position of the uppermost pixel of the lower-end pixels, namely, the position of the lower-end pixel having a minimum coordinate value.

A lower coordinate minimum value optimizing process corresponding to step S2119 is described below with reference to a flowchart of FIG. 44.

In step S2251, the lower coordinate position optimizer 184 reads all vertical lines (j) and lower-end coordinates corresponding thereto supplied from the effective area coordinate position determining unit 41.

In step S2252, the lower coordinate position optimizer 184 excludes from all read vertical lines (j) any line having the entire length thereof falling within the black area.

More specifically, the lower coordinate position optimizer 184 excludes a line having a lower coordinate position at a minimum value, namely, having the coordinate value s in the y axis being zero of FIG. 10 as the coordinate value calculated in accordance with the flowchart of FIG. 15 or FIG. 22. The lower coordinate position optimizer 184 may exclude consecutive lines in the black area. As shown in FIG. 26, an area to the left of the minimum coordinate position min_x in the x axis and an area to the right of the maximum coordinate position max_x in the x axis may be excluded. In this case, even if an entire line is in the black area between the minimum coordinate position min_x in the x axis and the maximum coordinate position max_x in the x axis is present, that entire line is not excluded.

In step S2253, the lower coordinate position optimizer 184 initializes a minimum value exclusion list. The minimum value exclusion list, stored on the lower coordinate position optimizer 184, lists vertical line numbers, namely, coordinate values j in the x axis in association with lower-end coordinate positions in the order of magnitude from small to large.

In step S2254, the lower coordinate position optimizer 184 calculates a minimum lower-end coordinate in a line not contained in the minimum value exclusion list.

In step S2255, the lower coordinate position optimizer 184 substitutes the calculated vertical line number and lower-end coordinate position for a predetermined variable temp_lower. The predetermined variable temp_lower temporarily contains the vertical line number and the lower-end coordinate position in association with each other.

In step S2256, the lower coordinate position optimizer 184 calculates an absolute difference between the lower-end coordinate in the predetermined variable temp_lower and a maximum value in the minimum value exclusion list. Since the minimum value exclusion list is initialized, the lower coordinate position optimizer 184 outputs the lower-end coordinate in the predetermined variable temp_lower as is in step S2256.

In step S2257, the lower coordinate position optimizer 184 compares the calculated absolute difference with a predetermined threshold value to determine whether the difference is equal to or greater than the threshold value.

If it is determined in step S2257 that the difference is equal to or greater than the threshold value, processing proceeds to step S2258.

In step S2258, the lower coordinate position optimizer 184 assigns, to the lower-end coordinate of the line corresponding to the maximum value in the minimum value exclusion list, the mean value of the lower-end pixels in lines to the left and right of the line. Since the minimum value exclusion list is initialized, nothing is performed in step S2258 in a first cycle.

In step S2259, the lower coordinate position optimizer 184 adds, to the minimum value exclusion list, the vertical line number and the lower coordinate in the predetermined variable temp_lower. Processing returns to step S2254.

If it is determined in step S2257 that the difference is smaller than the threshold value, processing proceeds to step S2260.

In step S2260, the lower coordinate position optimizer 184 determines whether the minimum value exclusion list is empty.

If it is determined in step S2260 that the minimum value exclusion list is empty, processing proceeds to step S2259.

If it is determined in step S2260 that the minimum value exclusion list is not empty, processing ends.

The lower coordinate position optimizer 184 compares the minimum lower-end coordinate value with the next minimum lower-end coordinate value using the minimum value exclusion list, thereby optimizing the position of the uppermost pixel from the lower-end pixels, namely, the position of the lower-end pixel having a minimum coordinate value.

Returning to FIG. 37, in step S2120, the lower coordinate position optimizer 184 sets as the lowermost position the mean value of the lower-end pixels in the vertical lines (j−1) and (j+1) adjacent to the vertical line (j) from which the lowermost pixel is detected, if the difference between the position of the lowermost pixel and the position of the second pixel from the lowermost pixel is greater than the predetermined threshold from among the lower-end pixels, each lower-end pixel detected on a per vertical line (j) basis. More specifically, the lower coordinate position optimizer 184 optimizes the position of the lowermost pixel of the lower-end pixels, namely, the position of the lower-end pixel having a maximum coordinate value.

A lower coordinate maximum value optimizing process corresponding to step S2120 is described below with reference to a flowchart of FIG. 45.

Steps S2271 and S2272 in the flowchart of FIG. 45 are respectively identical to steps S2251 and S2252 in the flowchart of FIG. 44 and the discussion thereof is omitted herein.

In step S2273, the lower coordinate position optimizer 184 initializes a maximum value exclusion list. The maximum value exclusion list, stored on the lower coordinate position optimizer 184, lists vertical line numbers, namely, coordinate values j in the x axis in association with lower-end coordinate positions in the order of magnitude from large to small.

In step S2274, the lower coordinate position optimizer 184 calculates a maximum lower-end coordinate in a line not contained in the maximum value exclusion list.

In step S2275, the lower coordinate position optimizer 184 substitutes the calculated vertical line number and lower-end coordinate position for a predetermined variable temp_lower. The predetermined variable temp_lower temporarily contains the vertical line number and the lower-end coordinate position in association with each other.

In step S2276, the lower coordinate position optimizer 184 calculates an absolute difference between the lower-end coordinate in the predetermined variable temp_lower and a minimum value in the maximum value exclusion list. Since the maximum value exclusion list is initialized, the lower coordinate position optimizer 184 outputs the lower-end coordinate in the predetermined variable temp_lower as is in step S2276.

In step S2277, the lower coordinate position optimizer 184 compares the calculated absolute difference with a predetermined threshold value to determine whether the difference is equal to or greater than the threshold value.

If it is determined in step S2277 that the difference is equal to or greater than the threshold value, processing proceeds to step S2278.

In step S2278, the lower coordinate position optimizer 184 assigns, to the lower-end coordinate of the line corresponding to the minimum value in the maximum value exclusion list, the mean value of the lower-end pixels in lines to the left and right of the line. Since the maximum value exclusion list is initialized, nothing is performed in step S2278 in a first cycle.

In step S2279, the lower coordinate position optimizer 184 adds, to the maximum value exclusion list, the vertical line number and the lower coordinate in the predetermined variable temp_lower. Processing returns to step S2274.

If it is determined in step S2277 that the difference is smaller than the threshold value, processing proceeds to step S2280.

In step S2280, the lower coordinate position optimizer 184 determines whether the maximum value exclusion list is empty.

If it is determined in step S2280 that the maximum value exclusion list is empty, processing proceeds to step S2279.

If it is determined in step S2280 that the maximum value exclusion list is not empty, processing ends.

The lower coordinate position optimizer 184 compares the maximum lower-end coordinate value with the next maximum lower-end coordinate value using the maximum value exclusion list, thereby optimizing the position of the lowermost pixel from the lower-end pixels, namely, the position of the lower-end pixel having a maximum coordinate value.

The coordinate position optimizer 161 thus assigns the appropriate coordinate positions to the coordinate positions of the effective area supplied from the effective area coordinate position determining unit 41, namely, the left and right coordinate positions of the effective area in each horizontal line (i) and the upper and lower coordinate positions of the effective area in each vertical line (j).

Returning to FIG. 37, steps S2113 through S2120 are thus completed.

The in-frame coordinate position determining unit 12 performs the coordinate position determination process of determining an effective area having any shape in a frame, and further performs the coordinate position optimizing process. Even when an image is affected by noise, the coordinate position of the effective area is accurately determined.

In another in-frame coordinate position coordinate determination process, the process in steps S2101 through S2112 in the flowchart of FIG. 37 may be performed in the same manner as described in steps S301 through S312 in the flowchart of FIG. 18 or in steps S501 through S512 in the flowchart of FIG. 23.

In the flowcharts of FIGS. 38 through 45, the coordinate position optimizer 161 excludes one line which is entirely black in the entirety thereof. This process may be performed by the effective area coordinate position determining unit 41. Alternatively, this process may be performed subsequent to the detection of the effective area performed on each line.

The optimizing process of the coordinate position in steps S2113 through S2120 in the flowchart of FIG. 37 is performed when a single noise occurs in a single direction in a single coordinate as shown in FIG. 36. For example, a predetermined number of noises, for example, eight or less noises may happen in the same direction in the same strength. In that case, coordinate positions of pixels protruding as a result of the noises are detected, and then averaged using coordinate positions of pixels in lines in the effective area close to the noisy pixels. The coordinate positions are thus optimized.

The eight coordinate position optimizing processes are performed in steps S2113 through S2120 in the flowchart of FIG. 37. The coordinate position optimizing process may be performed on only the area surrounding the effective area. In other words, only four processes, i.e., the left coordinate minimum value optimizing process, right coordinate maximum optimizing process, upper coordinate minimum value optimizing process and lower coordinate maximum value optimizing process may be performed.

In each coordinate position optimizing process, the position of the target pixel is represented by the mean value of coordinate positions of pixels in two lines above and below or to the left and right of the target pixel. Alternatively, the position of the target pixel may be represented by coordinate positions in prior and subsequent frames, a center value of coordinate positions of pixels in a plurality of lines above and below or to the left and right of the target pixel, or a coordinate value of a pixel in one of a line above and a line below or in one of a line to the left and a line to the right of the target pixel. It is important that the coordinate position optimizer 161 performs the optimizing process using a reliable coordinate value predicted from the close area surrounding the target pixel to be optimized.

In the above discussion, the ineffective area is an area displayed in black. The ineffective area may be any one where an image therewithin is meaningless. For example, the ineffective area may be a white area where only white is displayed or an area where only a particular color is displayed (such as a blue area used in chroma key synthesis).

In the above-described embodiments, the image to be processed is displayed in two-dimension. Alternatively, the image to be processed may be displayed in n-dimensions. For example, a three-dimensional image holographically displayed in space may be processed.

The image composed of the effective area as a meaningful area and an ineffective area as the remaining area is input and processed as described above. The coordinate position of the left-end pixel of the pixels that are determined to be out of the ineffective area from among pixels arranged in a horizontal line in the image is detected by comparing a pixel value of each pixel with a first threshold value to determine whether the pixel falls within the ineffective area. The coordinate position of the right-end pixel of the pixels that are determined to be out of the ineffective area from among pixels arranged in a horizontal line in the image is detected by comparing a pixel value of each pixel with the first threshold value. The coordinate position of the upper-end pixel of the pixels that are determined to be out of the ineffective area from among pixels arranged in a vertical line in the image is detected by comparing a pixel value of each pixel with the first threshold value. The coordinate position of the lower-end pixel of pixels that are determined to be out of the ineffective area from among pixels arranged in a vertical line in the image is detected by comparing a pixel value of each pixel with the first threshold value.

The above-referenced series of process steps may be performed using hardware or software. If the process steps are performed using software, a program of the software may be installed from a recording medium onto a computer built in dedicated hardware or a general-purpose personal computer enabled to perform a variety of functions with a variety of programs installed thereon.

FIG. 46 illustrates a personal computer in accordance with one embodiment of the present invention. The personal computer performs the function of the effective area detecting apparatus 1 of FIG. 5 using software. A central processing unit (CPU) 301 of the personal computer controls the entire personal computer. The CPU 301 receives an instruction from a user via an input unit 306 composed a keyboard, a mouse, etc. via a bus 304 and an input-output interface 305. In response, the CPU 301 executes a program stored read-only memory (ROM) 310. The CPU 301 also executes a program that is read a removable medium 311 such as a magnetic disk, an optical disk, a magneto-optical disk, or a semiconductor memory, connected to a drive 310, installed on a storage unit 308, and then loaded on a random-access memory (RAM) 303. The function of the effective area detecting apparatus 1 of FIG. 5 is thus performed using the software. The CPU 301 controls the communication unit 309, thereby communicating with the outside to exchange data.

As shown in FIG. 46, a recording medium records the program installed and executed on the computer. The recording media include a removable medium 311, such as one of a magnetic disk (including a flexible disk), an optical disk (such as compact disk read-only memory (CD-ROM)), or digital versatile disk (DVD)), a magneto-optical disk (such as minidisk (MD®), and a semiconductor memory. The recording media also include the ROM 302 or a hard disk forming the storage unit 308, each permanently or temporarily storing the program. The storage of the program onto the program recording medium may be performed via a wired communication medium or a wireless communication medium using the communication unit 309 such as an interface including a router or a modem, and a local area network, the Internet, or a digital broadcasting satellite.

The process steps describing the program stored on the recording medium may be performed in the time-series order sequence as previously stated. Alternatively, the process steps may be performed in parallel or separately.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus for processing an image composed of an effective area as a meaningful area and an ineffective area as a remaining area, comprising:
   left coordinate position detecting means for detecting a coordinate position of a left-end pixel of pixels that are determined to be out of the ineffective area from among pixels arranged in a horizontal line in the image by comparing a pixel value of each pixel with a first threshold value;
   right coordinate position detecting means for detecting a coordinate position of a right-end pixel of pixels that are determined to be out of the ineffective area from among pixels arranged in a horizontal line in the image by comparing a pixel value of each pixel with the first threshold value;
   upper coordinate position detecting means for detecting a coordinate position of an upper-end pixel of pixels that are determined to be out of the ineffective area from among pixels arranged in a vertical line in the image by comparing a pixel value of each pixel with the first threshold value; and
   lower coordinate position detecting means for detecting a coordinate position of a lower-end pixel of pixels that are determined to be out of the ineffective area from among pixels arranged in a vertical line in the image by comparing a pixel value of each pixel with the first threshold value.

2. The image processing apparatus according to claim 1, further comprising effective area coordinate position determining means for determining a coordinate position of the effective area in the image from the coordinate position of the left-end pixel and the coordinate position of the right-end pixel in each horizontal line, and the coordinate position of the upper-end pixel and the coordinate position of the lower-end pixel in each vertical line.

3. The image processing apparatus according to claim 1, wherein the left coordinate position detecting means detects the coordinate position of the left-end pixel of the pixels that are determined to be out of the ineffective area from among the pixels arranged in the horizontal line in the image by comparing the pixel value of each pixel with the first threshold value and comparing an absolute difference between pixel values of adjacent pixels with a second threshold value;
  wherein the right coordinate position detecting means detects the coordinate position of the right-end pixel of the pixels that are determined to be out of the ineffective area from among the pixels arranged in the horizontal line in the image by comparing the pixel value of each pixel with the first threshold value, and comparing an absolute difference between pixel values of adjacent pixels with the second threshold value;
  wherein the upper coordinate position detecting means detects the coordinate position of the upper-end pixel of the pixels that are determined to be out of the ineffective area from among the pixels arranged in the vertical line in the image by comparing the pixel value of each pixel with the first threshold value and comparing an absolute difference between pixel values of adjacent pixels with the second threshold value; and
  wherein the lower coordinate position detecting means detects the coordinate position of the lower-end pixel of the pixels that are determined to be out of the ineffective area from among the pixels arranged in the vertical line in the image by comparing the pixel value of each pixel with the first threshold value and comparing an absolute difference between pixel values of adjacent pixels with the second threshold value.

4. The image processing apparatus according to claim 1, further comprising:
  leftmost coordinate position determining means for determining a position of the leftmost pixel from the positions of the left-end pixels, each left-end pixel detected on a per horizontal line basis;
  rightmost coordinate position determining means for determining a position of the rightmost pixel from the positions of the right-end pixels, each right-end pixel detected on a per horizontal line basis;
  uppermost coordinate position determining means for determining a position of the uppermost pixel from the positions of the upper-end pixels, each upper-end pixel detected on a per vertical line basis;
  lowermost coordinate position determining means for determining a position of the lowermost pixel from the positions of the lower-end pixels, each lower-end pixel detected on a per vertical line basis; and
  rectangular effective area coordinate determining means for determining the effective area having a rectangular shape in the image from the position of the leftmost pixel, the position of the rightmost pixel, the position of the uppermost pixel, and the position of the lowermost pixel.

5. The image processing apparatus according to claim 4, wherein the leftmost coordinate position determining means determines as a leftmost position a position of a second pixel from the leftmost pixel if a difference between the position of the leftmost pixel and the position of the second pixel from the leftmost pixel is greater than a second threshold value;
  wherein the rightmost coordinate position determining means determines as a rightmost position a position of a second pixel from the rightmost pixel if a difference between the position of the rightmost pixel and the position of the second pixel from the rightmost pixel is greater than the second threshold value;
  wherein the uppermost coordinate position determining means determines as an uppermost position a position of a second pixel from the uppermost pixel if a difference between the position of the uppermost pixel and the position of the second pixel from the uppermost pixel is greater than the second threshold value; and
  wherein the lowermost coordinate position determining means determines as a lowermost position a position of a second pixel from the lowermost pixel if a difference between the position of the lowermost pixel and the position of the second pixel from the lowermost pixel is greater than the second threshold value.

6. The image processing apparatus according to claim 1, further comprising:
  left coordinate position optimizing means for setting, as a leftmost position of positions of left-end pixels, each left-end pixel detected on per a horizontal line basis, the mean value of positions of two left-end pixels in two respective horizontal lines adjacent to the horizontal line from which a leftmost pixel is detected if a difference between the position of the leftmost pixel and the position of the second pixel from the leftmost pixel is greater than a second threshold, and setting, as a rightmost position of the positions of the left-end pixels, the mean value of positions of two left-end pixels in two respective horizontal lines adjacent to the horizontal line from which a rightmost pixel is detected if a difference between the position of the rightmost pixel and the position of the second pixel from the rightmost pixel is greater than the second threshold;
  right coordinate position optimizing means for setting, as a leftmost position of positions of right-end pixels, each right-end pixel detected on per a horizontal line basis, the mean value of positions of two right-end pixels in two respective horizontal lines adjacent to the horizontal line from which a leftmost pixel is detected if a difference between the position of the leftmost pixel and the position of the second pixel from the leftmost pixel is greater than the second threshold, and setting, as a rightmost position of the positions of the right-end pixels, the mean value of positions of two right-end pixels in two respective horizontal lines adjacent to the horizontal line from which a rightmost pixel is detected if a difference between the position of the rightmost pixel and the position of the second pixel from the rightmost pixel is greater than the second threshold;
  upper coordinate position optimizing means for setting, as an uppermost position of positions of upper-end pixels, each upper-end pixel detected on per a vertical line basis, the mean value of positions of two upper-end pixels in two respective vertical lines adjacent to the vertical line from which an uppermost pixel is detected if a difference between the position of the uppermost pixel and the position of the second pixel from the uppermost pixel is greater than the second threshold, and setting, as a lowermost position of the positions of the upper-end pixels, the mean value of positions of two upper-end pixels in two respective vertical lines adjacent to the vertical line from which a lowermost pixel is detected if a difference between the position of the lowermost pixel and the position of the second pixel from the lowermost pixel is greater than the second threshold; and
  lower coordinate position optimizing means for setting, as an uppermost position of positions of lower-end pixels, each lower-end pixel detected on per a vertical line basis, the mean value of positions of two lower-end pixels in two respective vertical lines adjacent to the vertical line from which an uppermost pixel is detected if a difference between the position of the uppermost pixel and the position of the second pixel from the uppermost pixel is greater than the second threshold, and setting, as a lowermost position of the positions of lower-end pixels, the mean value of positions of two lower-end pixels in two respective vertical lines adjacent to the vertical line from which a lowermost pixel is detected if a difference between the position of the lowermost pixel and the position of the second pixel from the lowermost pixel is greater than the second threshold.

7. An information processing method for processing, by a processing unit, an image composed of an effective area as a meaningful area and an ineffective area as a remaining area, the method comprising:

detecting, by the processing unit, a coordinate position of a left-end pixel of pixels that are determined to be out of the ineffective area from among pixels arranged in a horizontal line in the image by comparing a pixel value of each pixel with a first threshold value;

detecting, by the processing unit, a coordinate position of a right-end pixel of pixels that are determined to be out of the ineffective area from among pixels arranged in a horizontal line in the image by comparing a pixel value of each pixel with the first threshold value;

detecting, by the processing unit, a coordinate position of an upper-end pixel of pixels that are determined to be out of the ineffective area from among pixels arranged in a vertical line in the image by comparing a pixel value of each pixel with the first threshold value; and detecting, by the processing unit, a coordinate position of a lower-end pixel of pixels that are determined to be out of the ineffective area from among pixels arranged in a vertical line in the image by comparing a pixel value of each pixel with the first threshold value.

8. A recording medium including a computer program for causing a computer to process an image composed of an effective area as a meaningful area and an ineffective area as a remaining area, the process comprising:

detecting a coordinate position of a left-end pixel of pixels that are determined to be out of the ineffective area from among pixels arranged in a horizontal line in the image by comparing a pixel value of each pixel with a first threshold value;

detecting a coordinate position of a right-end pixel of pixels that are determined to be out of the ineffective area from among pixels arranged in a horizontal line in the image by comparing a pixel value of each pixel with the first threshold value;

detecting a coordinate position of an upper-end pixel of pixels that are determined to be out of the ineffective area from among pixels arranged in a vertical line in the image by comparing a pixel value of each pixel with the first threshold value; and detecting a coordinate position of a lower-end pixel of pixels that are determined to be out of the ineffective area from among pixels arranged in a vertical line in the image by comparing a pixel value of each pixel with the first threshold value.

9. An image processing apparatus for processing an image composed of an effective area as a meaningful area and an ineffective area as a remaining area, comprising:

a left coordinate position detecting unit detecting a coordinate position of a left-end pixel of pixels that are determined to be out of the ineffective area from among pixels arranged in a horizontal line in the image by comparing a pixel value of each pixel with a first threshold value;

a right coordinate position detecting unit detecting a coordinate position of a right-end pixel of pixels that are determined to be out of the ineffective area from among pixels arranged in a horizontal line in the image by comparing a pixel value of each pixel with the first threshold value;

an upper coordinate position detecting unit for detecting a coordinate position of an upper-end pixel of pixels that are determined to be out of the ineffective area from among pixels arranged in a vertical line in the image by comparing a pixel value of each pixel with the first threshold value; and a lower coordinate position detecting unit detecting a coordinate position of a lower-end pixel of pixels that are determined to be out of the ineffective area from among pixels arranged in a vertical line in the image by comparing a pixel value of each pixel with the first threshold value.

* * * * *